United States Patent [19]
Itoh

[11] Patent Number: 5,249,174
[45] Date of Patent: Sep. 28, 1993

[54] TIME-DIVISION COMMUNICATION METHOD FOR MOBILE BODIES AND SYSTEM USING SAID METHOD

[75] Inventor: Sadao Itoh, Kanagawa, Japan

[73] Assignee: Iwatsu Electric Co., Ltd., Tokyo, Japan

[21] Appl. No.: 665,084

[22] Filed: Mar. 6, 1991

[30] Foreign Application Priority Data
Mar. 6, 1990 [JP] Japan .................................. 2-54380
Apr. 5, 1990 [JP] Japan .................................. 2-90548

[51] Int. Cl.⁵ .............................................. H04J 3/00
[52] U.S. Cl. ........................................ 370/7; 370/109; 455/72
[58] Field of Search .................... 370/7, 50, 95.1, 109; 379/59, 63; 455/43, 44, 56.1, 72

[56] References Cited

U.S. PATENT DOCUMENTS

| | | | |
|---|---|---|---|
| 3,678,390 | 7/1972 | Iwasaki et al. | 455/43 |
| 4,817,192 | 3/1989 | Phillips et al. | 375/97 |
| 4,893,347 | 1/1990 | Eastmond et al. | 455/72 |
| 4,907,217 | 3/1990 | Leveque | 370/7 |
| 5,058,202 | 10/1991 | Leveque | 370/7 |
| 5,121,391 | 6/1992 | Paneth et al. | 370/109 |

OTHER PUBLICATIONS

B. D. Holbrook and J. T. Dixon, "Load Rating Theory for Multi-Channel Amplifiers," *BSTJ*, 18, Oct. 1939, pp. 624-644.

C. B. Feldman and W. R. Bennett, "Band Width and Transmission Performance," *BSTJ*, Jul. 1949, pp. 490-595.

*Primary Examiner*—Douglas W. Olms
*Assistant Examiner*—Melvin Marcelo
*Attorney, Agent, or Firm*—Oblon, Spivak, McClelland, Maier & Neustadt

[57] ABSTRACT

A mobile body communication method using a gateway exchanging unit for exchanging a communication between a radio base station and a plurality of mobile radio units, the radio station constituting a service area covering a plurality of zones, the mobile radio units moving across the plurality of zones and using a radio channel to communicate with the radio base station, the radio channel carrying time-division time-compressed signals in time slots constituting a frame, the method comprising the steps of, determining a level of a radio signal to be used in a communication between the radio base station and the mobile radio unit based on a non-simultaneous load advantage obtained by the time-division time-compressed signals, transmitting a signal to be transmitted while causing an amplitude distribution thereof to be compressed within a desired range by a syllabic compressor, and subjecting a received signal to an amplitude distribution recovering process by a syllabic expander.

5 Claims, 32 Drawing Sheets

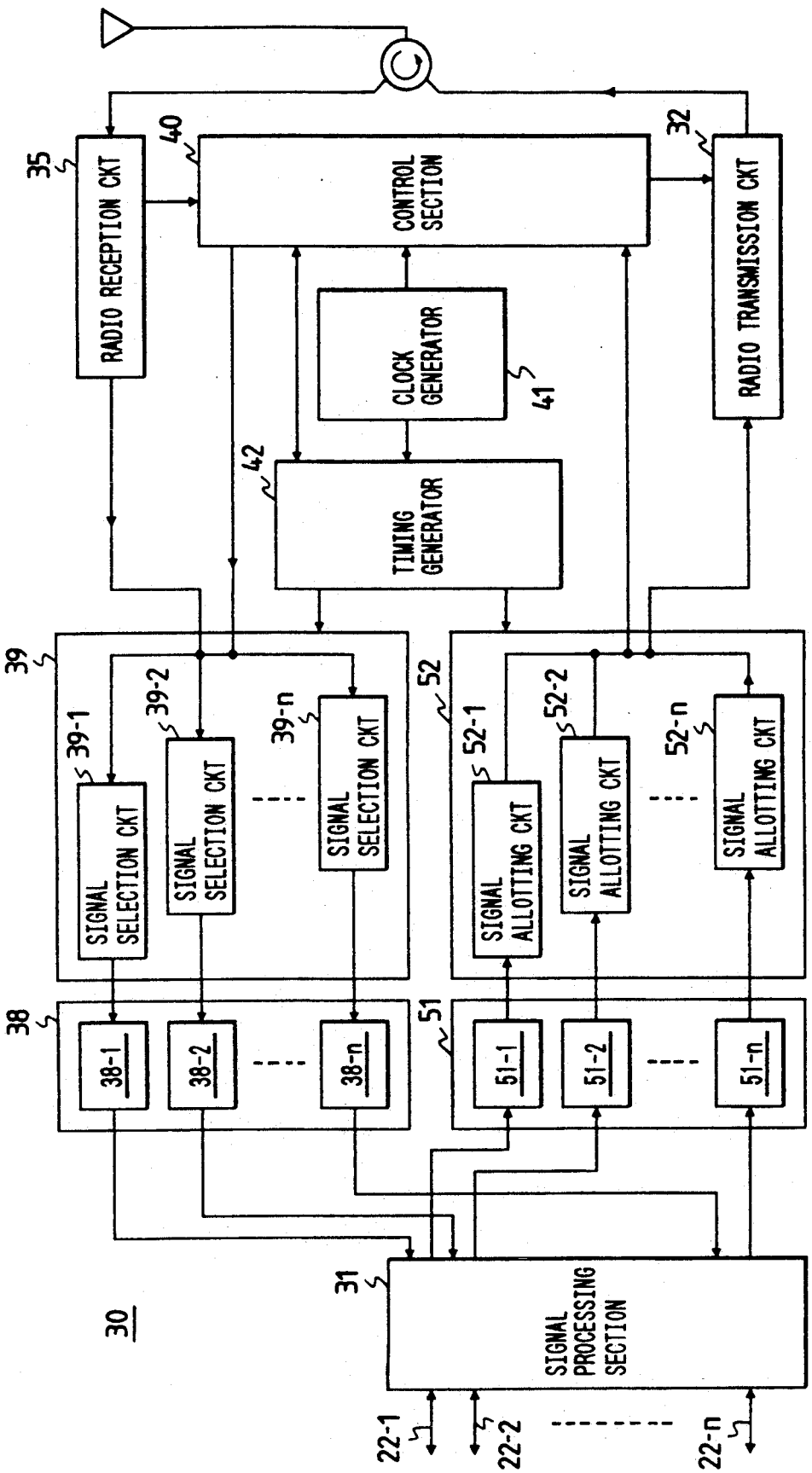

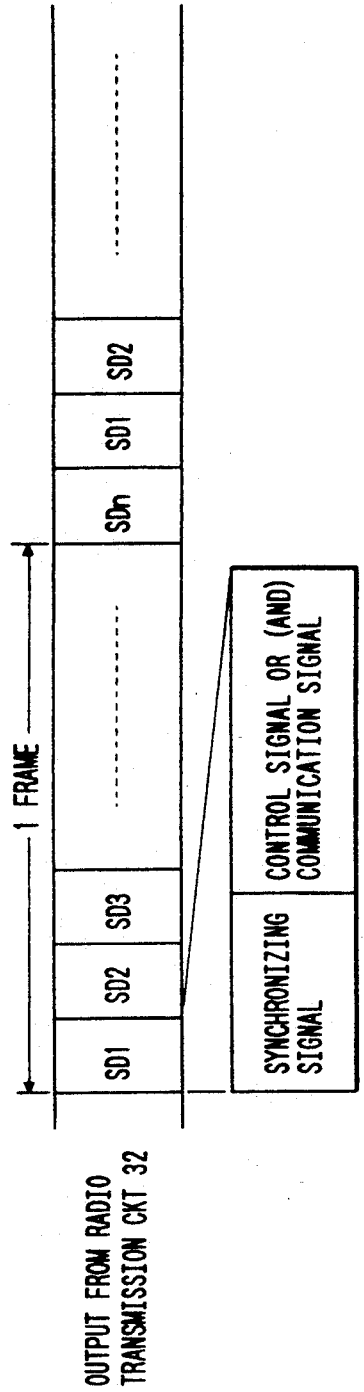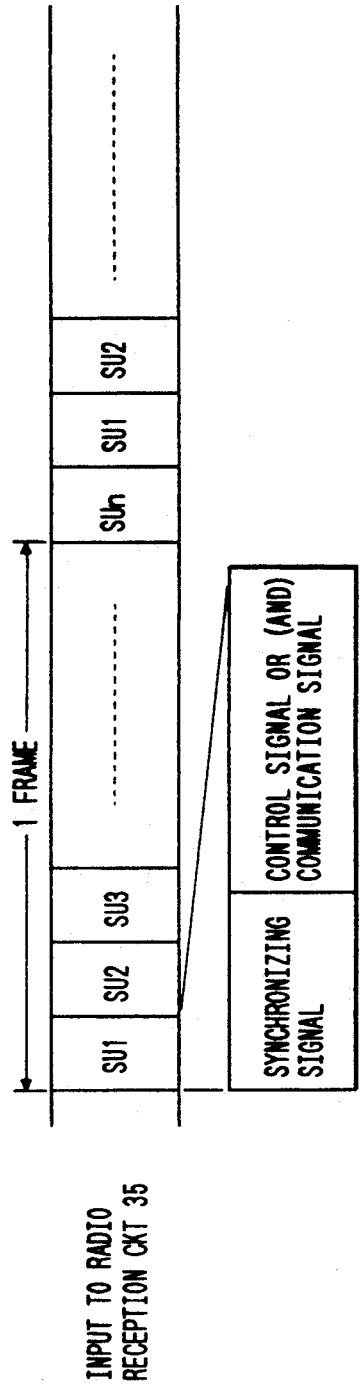

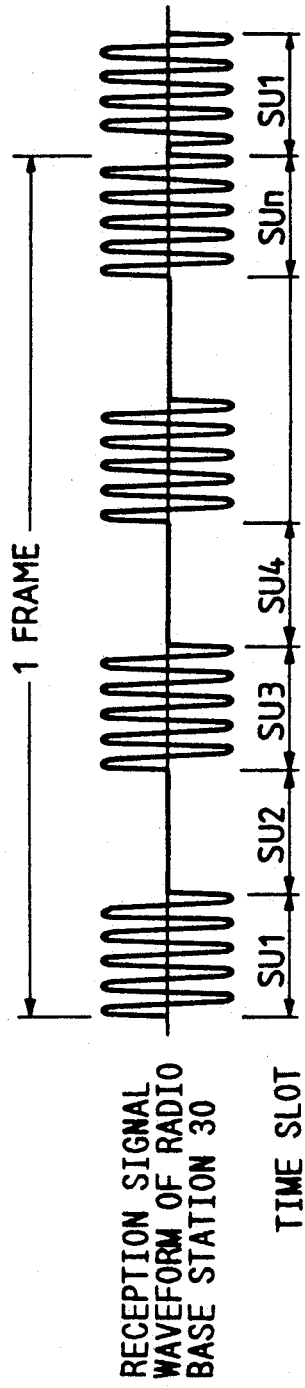
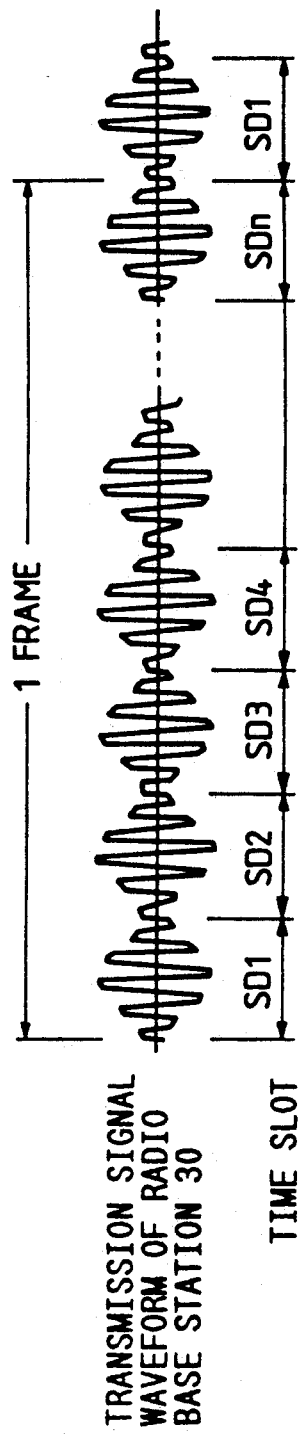

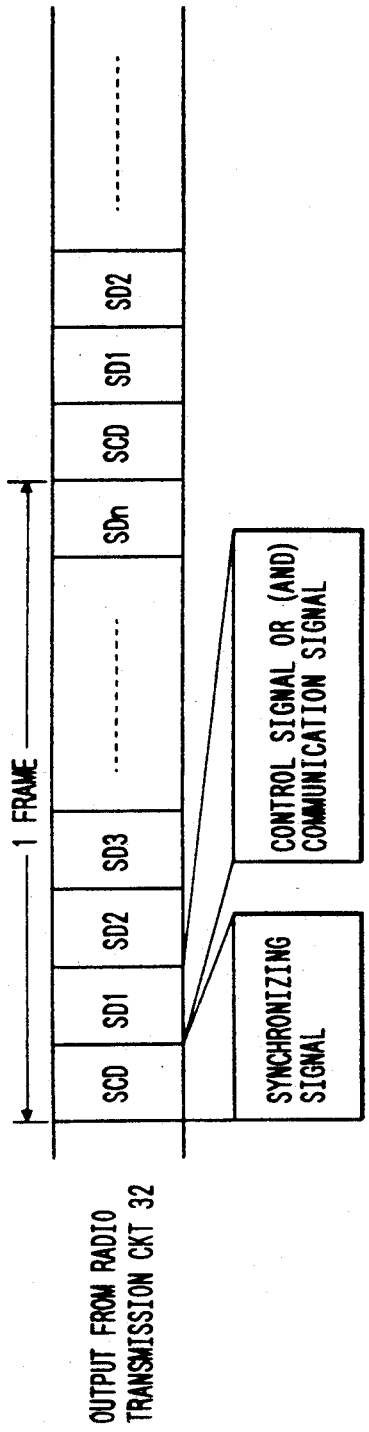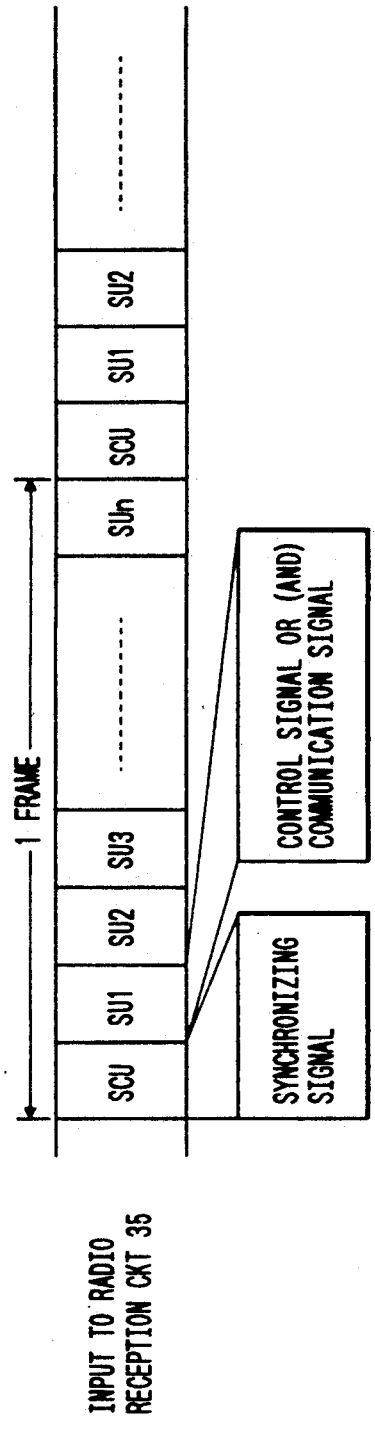

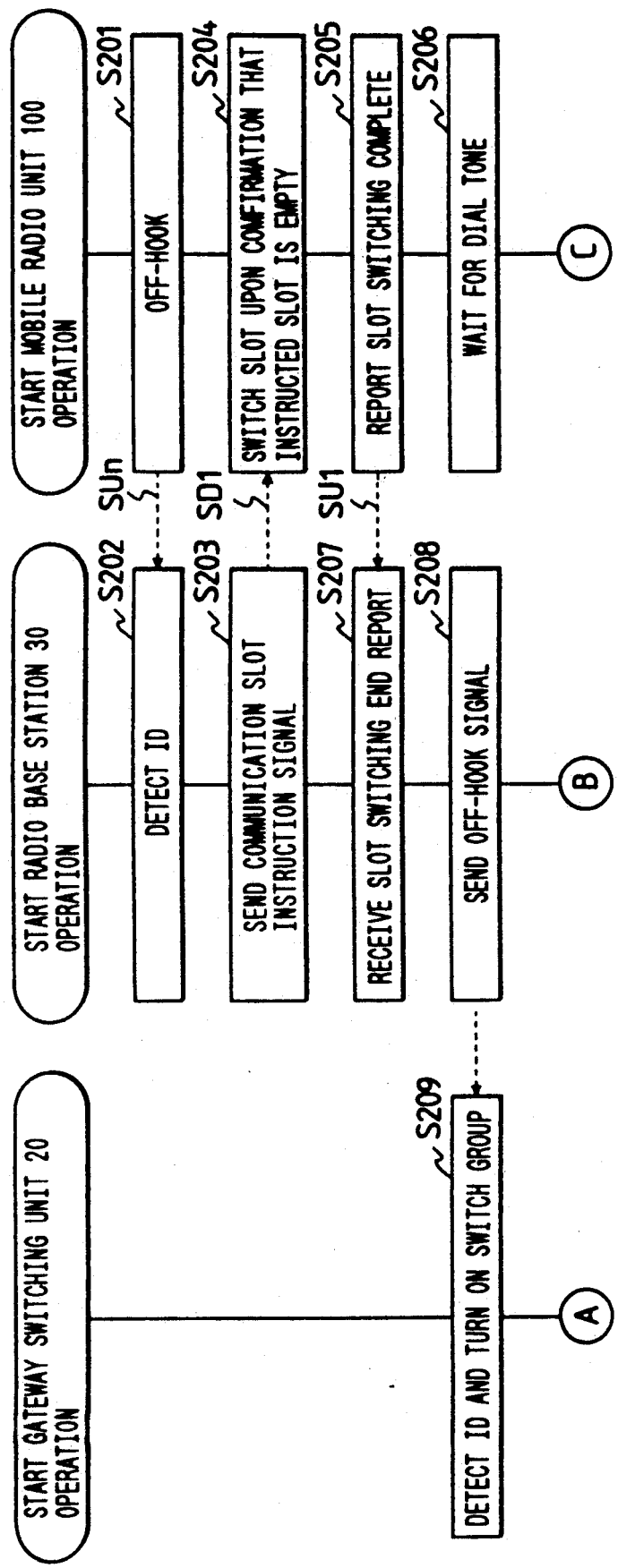

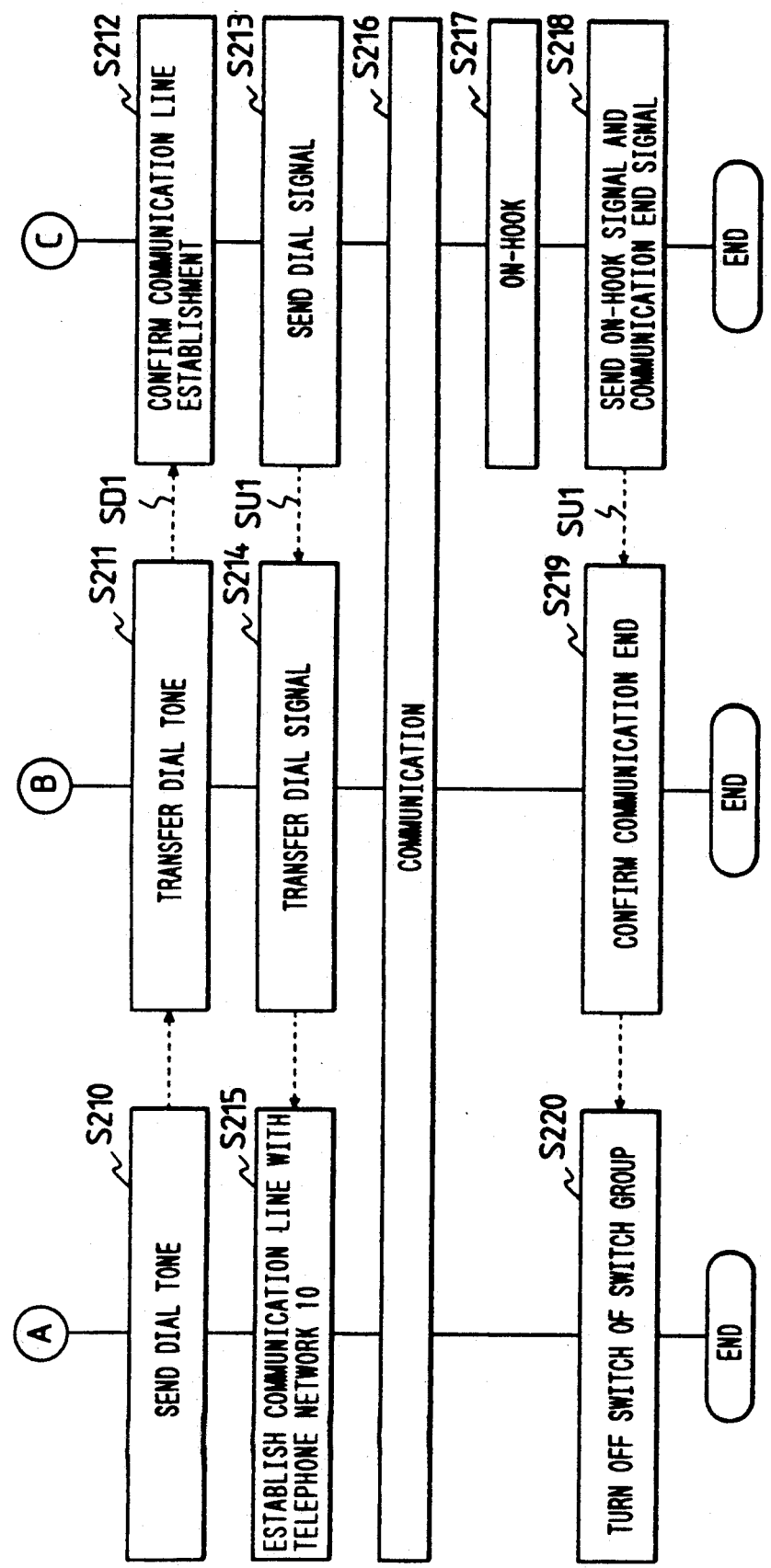

FIG. 7

| | CODELESS TELEPHONE | TCM SYSTEM | | | | FDM SYSTEM |
|---|---|---|---|---|---|---|
| | | SYSTEM 1A | SYSTEM 1B | SYSTEM 2 | SYSTEM 3 | |
| $f_c$ (MHz) | 250 | 250 | 250 | 250 | 250 | 250 |
| $N_{CH}$ (CH) | 89 | 1 | 1 | 1 | 1 | 1 |
| n | 1 | 1 | 1 | 1 | 1 | 1 |
| $N_s$ max | 87 | 148 | 148 | 148 | 148 | 148 |
| $f_w$ (kHz) | 0.3~3.0 | 44.4~444 | 44.4~444 | 44.4~444 | 44.4~444 | 0.3~591 |
| $V_m$ | $V_m$ | $V_m \times 148$ | $V_m \times 148$ | $V_m \times 13.2$ | $V_m \times 46.8$ | $V_m \times 3.31$ |
| $q'$ | — | 0 | (21) | 21 | 10 | 33 |
| $V_{qm}$ | $V_m$ | $V_m \times 148$ | $V_m \times 148 \times 11.2$ | $V_m \times 148$ | $V_m \times 148$ | $V_m \times 148$ |
| $M_d$ (rad rms) | 1.75 (1kHz) | 1.75 (148kHz) | 19.6 (148kHz) | 1.75 (148kHz) | 1.75 (148kHz) | 1.75 (148kHz) |
| $P_T$ (mW) | 10 | 1480 | 11.7 | 11.7 | 150 | 0.74 |
| $A_s$ (m) | 100 | 100 | 100 | 100 | 100 | 100 |
| $t_e$ (sec) | — | 1 | 1 | 0.001 | 0.003 | — |
| $N_{TS}$ | — | 148 | 148 | 148 | 148 | — |
| n (CH) | 1 | 1 | 1 | 24.6 | 6.2 | 148 |

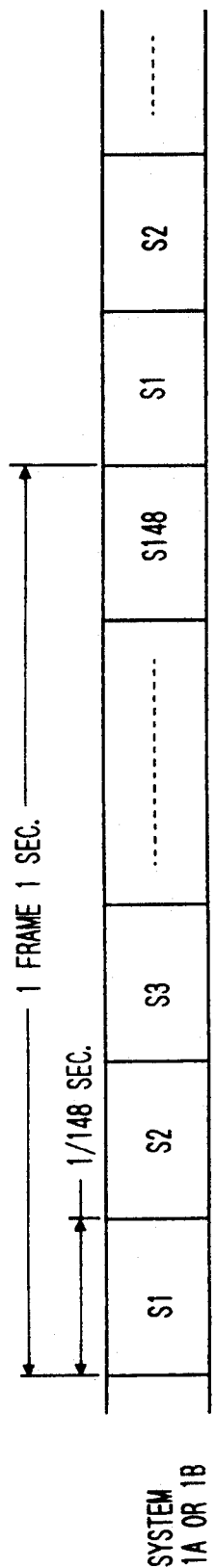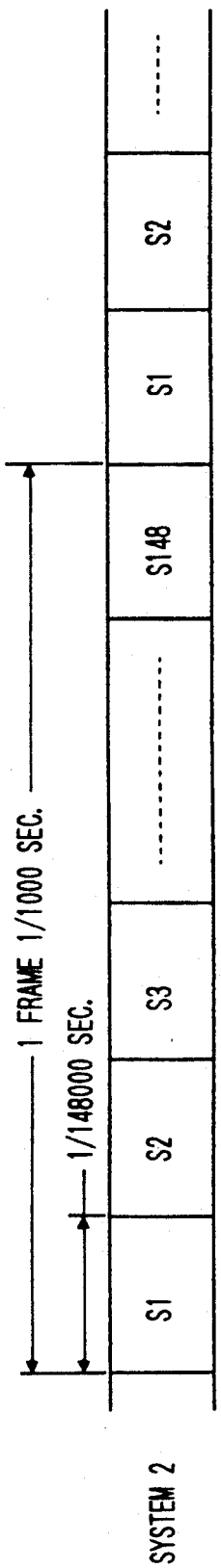

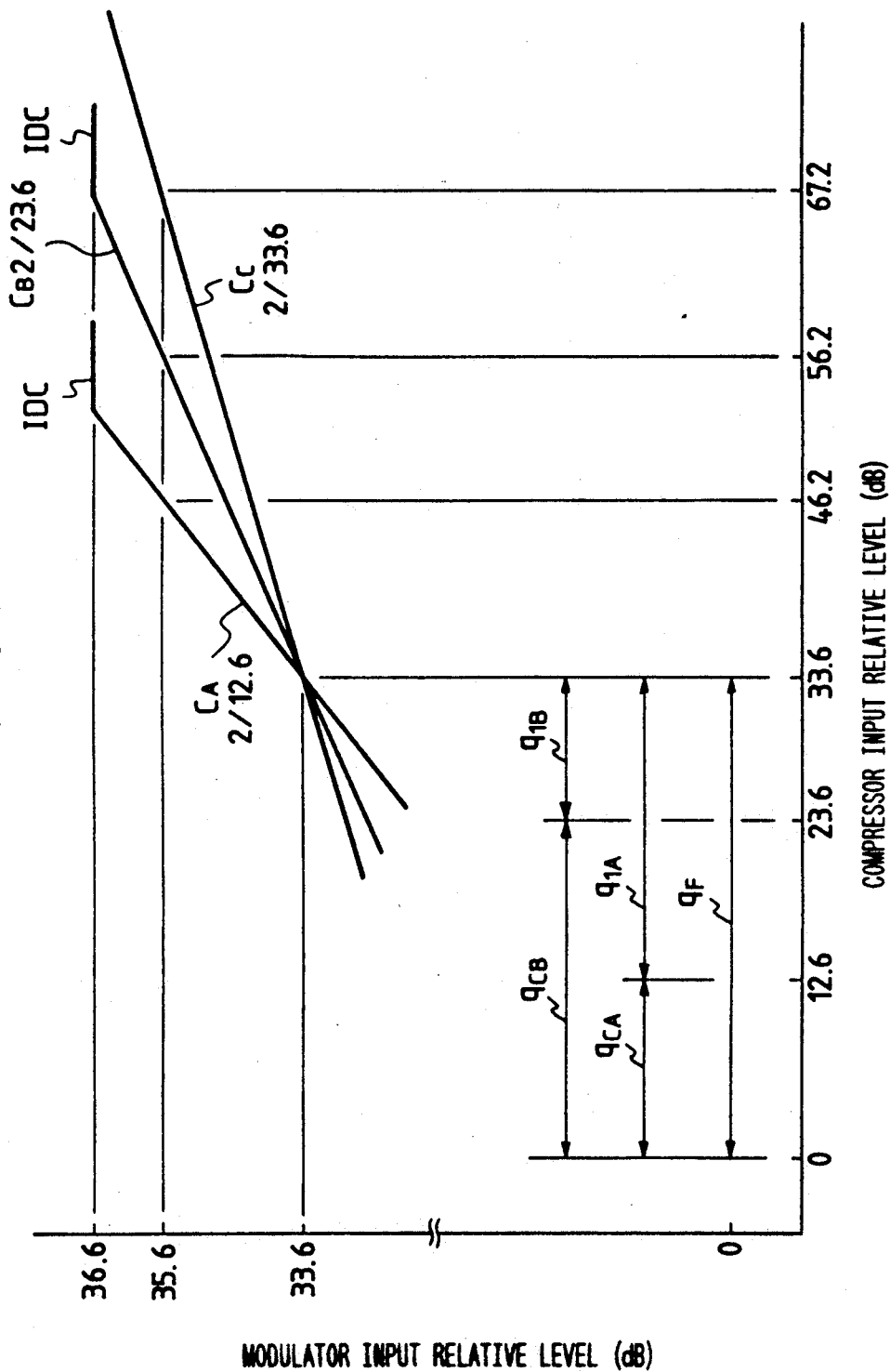

FIG. 10

| n | X (dB) | $t_e$ (sec) | n' | Y (dB) | X-Y (dB) | $\frac{2}{X-Y}$ |
|---|---|---|---|---|---|---|
| 6000 | 52.7 | 1/6000 | 6000 | 52.7 | — | — |
| 6000 | 52.7 | 1/3000 | 3000 | 49.7 | 3 | 2/3 |
| 6000 | 52.7 | 1/1500 | 1500 | 46.7 | 6 | 2/6 |
| 6000 | 52.7 | 1/400 | 400 | 40.0 | 12.7 | 2/12.7 |
| 6000 | 52.7 | 1/100 | 100 | 31.0 | 21.7 | 2/21.7 |
| 6000 | 52.7 | 1/25 | 25 | 21.0 | 31.7 | 2/31.7 |
| 6000 | 52.7 | 1/6 | 6 | 11.0 | 41.7 | 2/41.7 |
| 6000 | 52.7 | 1 | .1 | 0 | 52.7 | 2/52.7 |

FIG. 11

| n | X (dB) | $t_e$ | n' | Y (dB) | X-Y (dB) | $\frac{2}{X-Y}$ | SYSTEM NAME |
|---|---|---|---|---|---|---|---|
| 148 | 33.6 | 0.001 | 24.6 | 21.0 | 12.6 | 2/12.6 | 1A |
| 148 | 33.6 | 0.003 | 6.2 | 10.0 | 23.6 | 2/23.6 | 1B |
| 148 | 33.6 | 0.025 | 1 | 0 | 33.6 | 2/33.6 | 1C |

FIG. 13

| MULTIPLEXING COMMUNICATION NUMBER N | SINOSOIDAL WAVE RELATIVE ELECTRIC POWER WITH SAME PEAK VALUE | NSLA | NOTE |
|---|---|---|---|
| 1 | 0dB | 0dB | |
| 60 | +7dB | 35.6 - 7 = 28.6dB | REFER TO FIG.7 OF 3 REFERENCE |
| 120 | +9dB | 41.6 - 9 = 32.6dB | |
| 240 | +11dB | 47.6 - 11 = 36.6dB | |
| 480 | +13dB | 53.6 - 13 = 40.6dB | |
| 960 | +15dB | 59.6 - 15 = 44.6dB | |
| WHEN N IS LARGER | $-15 + 10\log_{10}N$ | $20\log_{10}N$ - RELATIVE SIGNAL POWER = $15 + 10\log_{10}N$ | ABOUT THIS VALUE, WHEN COMMUNICATION MULTIPLEXING NUMBER IS LARGER |

| N | NECESSARY RELATIVE SIGNAL POWER CAPACITY | NSLA |
|---|---|---|
| 1 | 0dB | 0 |
| 10 | +6dB | 20 - 6 = 14dB |
| 100 | +9dB | 40 - 9 = 31dB |
| 500 | +13dB | 54 - 13 = 41dB |
| 1000 | +16dB | 60 - 16 = 44dB |

TIME-DIVISION COMMUNICATION METHOD FOR MOBILE BODIES AND SYSTEM USING SAID METHOD

BACKGROUND OF THE INVENTION

1. [Field of the Invention]

The invention relates to efficient utilization of the non-simultaneous load advantage (NSLA)(hereinafter referred to as "NSLA") of a time-compressed multiplexed (TCM) signal, which is a modulated signal used in a time-division method for radio channels applied to radio communications between mobile bodies. More particularly, it is directed to a communication method which improves frequency utilization efficiency and thus achieves economic mobile radio communications in the following way. A radio channel is given, and while one of a plurality of movable radio units within a service area is communicating with its counterpart radio base station by establishing a radio communication line on the given radio channel, another mobile radio unit initiates communication with another radio base station using the same radio channel. Under such condition, interference with the communication between the mobile radio units and the radio base stations to be caused due to frequency utilization efficiency considerations or radio wave propagation characteristics is obviated. Also, separate communication signals are impressed on a band of low frequencies other than the frequencies carrying the time-division multiplexed signals, and the NSLA of these separate communication signals are utilized to reduce transmission power.

2. [Related Art]

Systems using time-division time-compressed multiplexed (TCM) signals for small-zone voice signal communications between mobile bodies are discussed in the following references.

Reference 1: S. Ito "A Study of a Portable Telephone System—A Proposal of Time-Division Time-Compressed FM System," IECE Technical Report, RCS 89-11, July, 1989; and Reference 2: S. Ito "A Study of a Portable Telephone System—A Theoretic Study of Time-Division Time-Compressed FM System," IECE Technical Report, RCS 89-39, October, 1989.

Specifically, reference 1 reports an exemplary system which includes: a radio reception circuit having a reception mixer; a radio transmission circuit having a transmission mixer; and a switching circuit. The radio reception circuit and the radio transmission circuit communicate with each other and are included in each of a mobile radio unit and a radio base station to intermittently receive and transmit signals therebetween. Each circuit divides a transmission signal (base band signal) by a predetermined time interval; stores the divided signals in a storage circuit; reads each stored signal into a predetermined time slot at a reading speed which is n times a storing speed; and angle-modulates or amplitude-modulates a carrier by the modulating signal loaded in the time slot. The switching circuit is arranged in both a frequency synthesizer (hereinafter referred to as "synthesizer") to be applied to the reception mixer of the radio reception circuit and a synthesizer to be applied to the transmission mixer of the radio transmission circuit. In this exemplary system a transmitted original base band signal can be reproduced in the following way. The output of each synthesizer is applied intermittently, and not only transmission and reception synchronize with these intermittent outputs, but also a pair of radio base station and mobile radio unit synchronize with each other under the intermittent transmission and reception. To access only the signal loaded in the predetermined time slot, the reception side receives the transmission signal by connecting and disconnecting the radio reception circuit; storing the demodulated signal in a storage circuit; and reading the stored signal at a low reading speed which is 1/n times a storing speed.

Reference 2 discusses interference between adjacent radio channels and co-channel interference, which are problems to be handled in a small-zone TCM-FM system, and suggests the possibility that a satisfactory system will be implemented through proper design of system parameters.

NSLAs of so-called frequency-division multiplexed (FDM) signals, in which voice signals are frequency-converted and multiplexed so that they do not overlap on the frequency axis, are discussed, e.g., in the following references.

Reference 3: B. D. Holbrook, J. T. Dixon: "Load Rating Theory for Multichannel Amplifiers" BSTJ, 18, Oct. 1939; and Reference 4: C. B. Feldman, et. al., "Band Width and Transmission Performance" BSTJ, July, 1949, pp. 490 to 595.

FIG. 13 is prepared from FIG. 7 of the above reference 3, while FIG. 14 is cited from page 495 of the above reference 4 which indicates that NSLAs substantially equal to those shown in FIG. 13 can be obtained.

Reasons why NSLAs are obtained and their applications to angle modulation will be briefly described hereunder.

The level of a communication line which is busy with an active telephone signal varies depending on the person, sex, and length of a subscriber line, and there is always an interval between words in a continuous speech by a single person. While one party is talking, the other does not talk, thereby transmitting no signal in one direction. No speech is made while the communication line is being switched and connected. Thus, individual signal levels are diversified, and to obtain a signal having these different levels synthesized is not easy. But to clarify this point is very important in preparing repeater lines capable of maintaining levels of distortion, crosstalk, quasi-crosstalk, and noise within predetermined tolerances. Thus many people have been involved in this study.

The level of a signal in a carrier-suppressed FDM system (SS: a system to which a single side band is applied) is a synthesis of these voices. It is very unlikely that the individual voices overlap one another simultaneously. Thus, as long as the number of communication lines N is small, the impact of each individual voice on the synthetic signal is direct due to its large fluctuation. However, its impact becomes less direct with increasing degree of multiplexing to be averaged in terms of probability. Thus, the peak of the synthetic signal increases very slowly with an increase in the number of communication lines. This tendency has been statistically demonstrated with respect to telephone signals in the United States by B. D. Holbrook and J. T. Dixon (in reference 3). According to their study, fluctuations in the power of a sinusoidal wave having a peak value equal to that of a multiplexed signal are as shown in FIG. 13. To demonstrate how small the increase in peak of the multiplexed signal is, such increase is compared with a sum of the peak voltages of individual signals. The result is NSLAs shown in FIG. 13. That is, e.g., a 960-multichannel system has a peak voltage equal to that obtained when all signals are fully loaded to 6 communication lines simultaneously and no signals are loaded to 954 communication lines.

In an SS-FM system, fluctuations in voltage of the synthetic signal result in a frequency deviation. Therefore, if it is assumed that the number of multiplexed communication lines N is increased with the peak frequency deviation of the synthetic signal defined to be a predetermined value, the modulation index per communication line can be increased by each NSLA shown in FIG. 13 compared with that in the case where the voltages of all the communication signals are summed up. This contributes to improving its signal to noise ratio (S/N) commensurate with the increase in the modulation index, compared with the S/N ratio given at the time the peak frequency deviation is defined to be an arbitrary value.

The exemplary system configurations proposed in references 1 and 2 include no disclosure as to the presence of NSLAs of TCM signals transmitted from a radio base station to a multiple of mobile radio units. Thus, they do not take advantage of the NSLAs.

Thus, there exists a problem to be overcome; i.e., the problem of not being able to achieve a number of advantages which could have been achieved if the NSLAs had been analyzed therein. Such advantages include: reduction in transmission output level to be achieved by increasing the frequency modulation factor; ease with which to design TCM signal amplifiers; implementation of economical amplifiers by increasing the operation level setting range; and system economization by relaxing the rating restrictions of mixers, resistors, and capacitors.

The exemplary system configurations disclosed in references 3 and 4 introduce the multiplexed load gain in the so-called FDM signal in which voice signals are frequency-converted and multiplexed so that they do not overlap on the frequency axis. However, these systems are not applicable to TCM signals, nor do they clearly refer to the presence of multiplexed load gains in the TCM signals. Thus, there also exists a problem to be overcome; i.e., the problem of not being able to achieve a number of advantages (the same advantages mentioned with respect to the problem related to the references 1 and 2) which could have been achieved in system design if the presence of the multiplexed load gains in the TCM signals had been clearly indicated in these references 3 and 4.

Further, time-compressed multiplexing (TCM), in which original signals are time-compressed, produce an unused band of low frequencies. Thus, effective use of such low-frequency band remains as another problem to be overcome.

SUMMARY OF THE INVENTION

An object of the invention is to overcome the above-mentioned problems.

According to the invention, a clear derivation of the multiplexed load gain of a time-division time-compressed multiplexed (TCM) signal is presented in relation to that of a frequency-division multiplexed (FDM) signal. In the derivation, parameters such as a degree of multiplexing (the number of communication lines), a time length per frame, the highest frequency of an original signal of the TCM signal were employed and these parameters were analyzed based on a sampling theorem. Although the NSLA tends to decrease depending on the system parameter, such a tendency is compensated for by the introduction of a syllabic compressor (hereotafter referred to as "compressor") to make the system of the invention practically applicable.

Furthermore, in the invention, prevention of the peak from exceeding a predetermined deviation in modulation is achieved by taking advantage of amplitude distribution characteristics of the TCM signal. Specifically, a compressor is inserted at the input of a transmitter to allow a desired amplitude distribution to be obtained, and a syllabic expander (hereotafter referred to as "expander") is provided at the input of a receiver for demodulation. In this system, the use of a TCM signal, having its original signal time-compressed, allows some low-frequency components to be unused. To effectively use such unused low-frequency components, FDM communication line switching units are provided at both the radio base station and the mobile radio unit, and this permits the additional communication of FDM signals.

Having demonstrated that the TCM signal does have an NSLA, specific NSLAs can be calculated using various design parameters of the system, and their use in combination with a known NSLA of an FDM signal allows not only the transmission power of the TCM signal to be reduced, but also frequency bands to be effectively used by increasing its modulation factor in FM (PM) while keeping interference and the like within predetermined tolerances. Since the peak of the signal outputted from the transmitter no longer exceeds a predetermined deviation, inconveniences in system operation can be eliminated, thereby not only facilitating the design work for modulators and amplifiers but also reducing the ratings of active components such as mixers, resistors, and capacitors to achieve economical communications.

Moreover, in the invention, if the frame length of the TCM signal becomes longer than $\frac{1}{2}f_h$: ($2f_h$: a Nyquist frequency where $f_h$ is the highest frequency) and if the NSLA of the TCM signal is likely to become smaller compared with that of an FDM signal whose multiplexing degree is the same, a compressor is used to obtain an equivalently equal or more NSLA.

BRIEF DESCRIPTION OF THE DRAWINGS

FIG. 1C is a diagram showing the circuit configuration of an exemplary radio base station to be applied to the system of the invention;

FIGS. 2A (a) and 2A(b) are diagrams for a description of exemplary structures of time slots to be applied to the system of the invention;

FIGS. 2B (a) and 2B(b) are diagrams showing waveforms of radio signals in the time slots;

FIGS. 2C (a) and 2C(b) are diagrams for a description of other exemplary structures of time slots to be applied to the system of the invention;

FIGS. 4A and 4B are flow charts showing the flow of operations by the system of the invention;

FIG. 7 is a diagram showing various system parameters;

FIGS. 8(a) and 8(b) are diagrams for a description of exemplary structures of time slots to be applied to the TCM system shown in FIG. 7;

FIGS. 9A and 9B are diagrams showing the input/output characteristics of a syllabic compander (hereatoafter referred to as "compander");

FIGS. 10 and 11 are diagrams showing the relationship between the NSLAs of a TCM signal and an FDM signal and the compression rate of a compressor;

FIGS. 13 and 14 are diagrams showing the relationship between the NSLA of an FDM signal and the number of communication lines cited from well known references; and FIG. 15 is a diagram showing the relationship between the frame length and the NSLA of a TCM signal.

DETAILED DESCRIPTION OF THE PREFERRED EMBODIMENTS

Figure 1A:
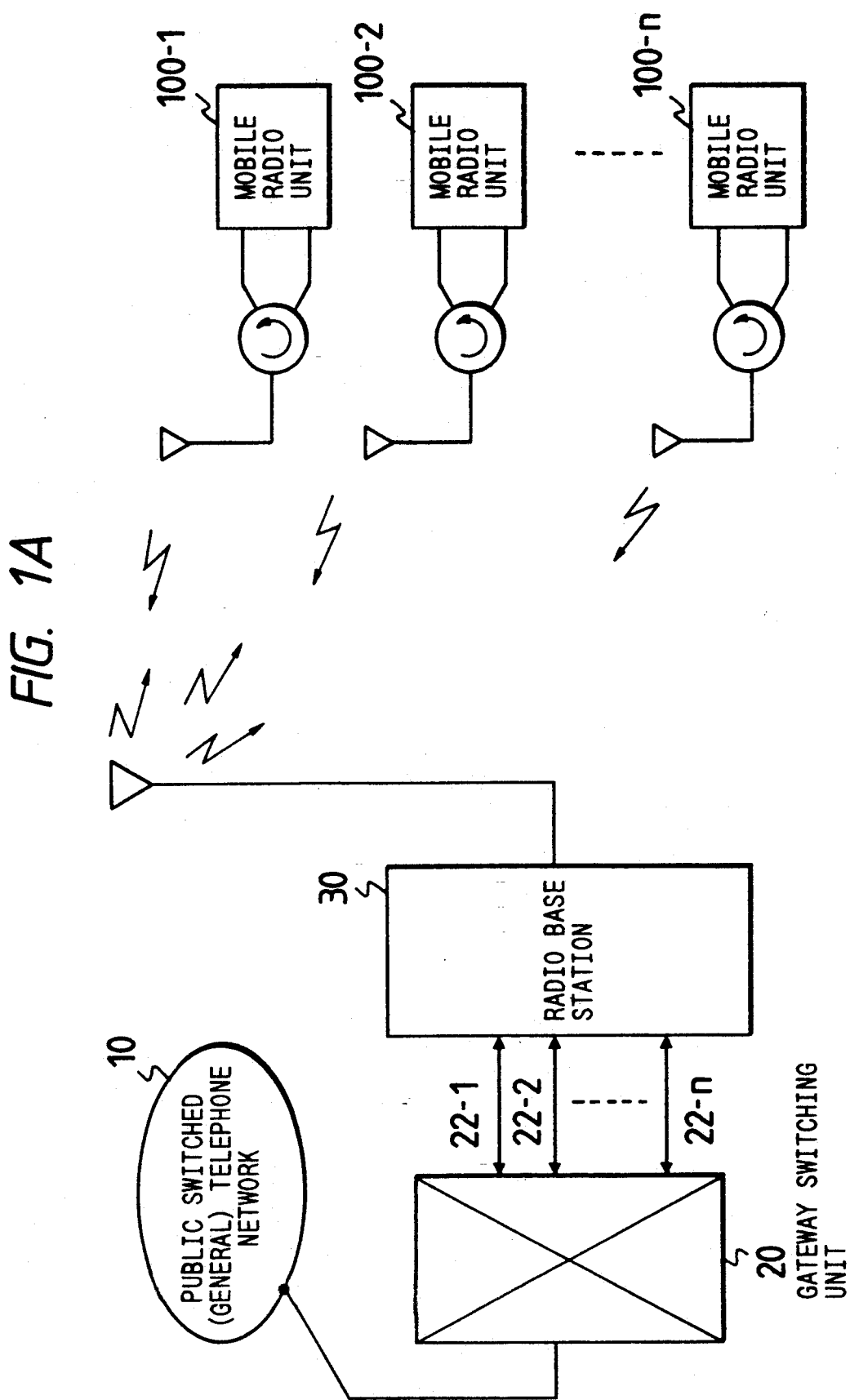
FIG. 1A is a configurational diagram showing the concept of a system of the invention.
Figure 1B:
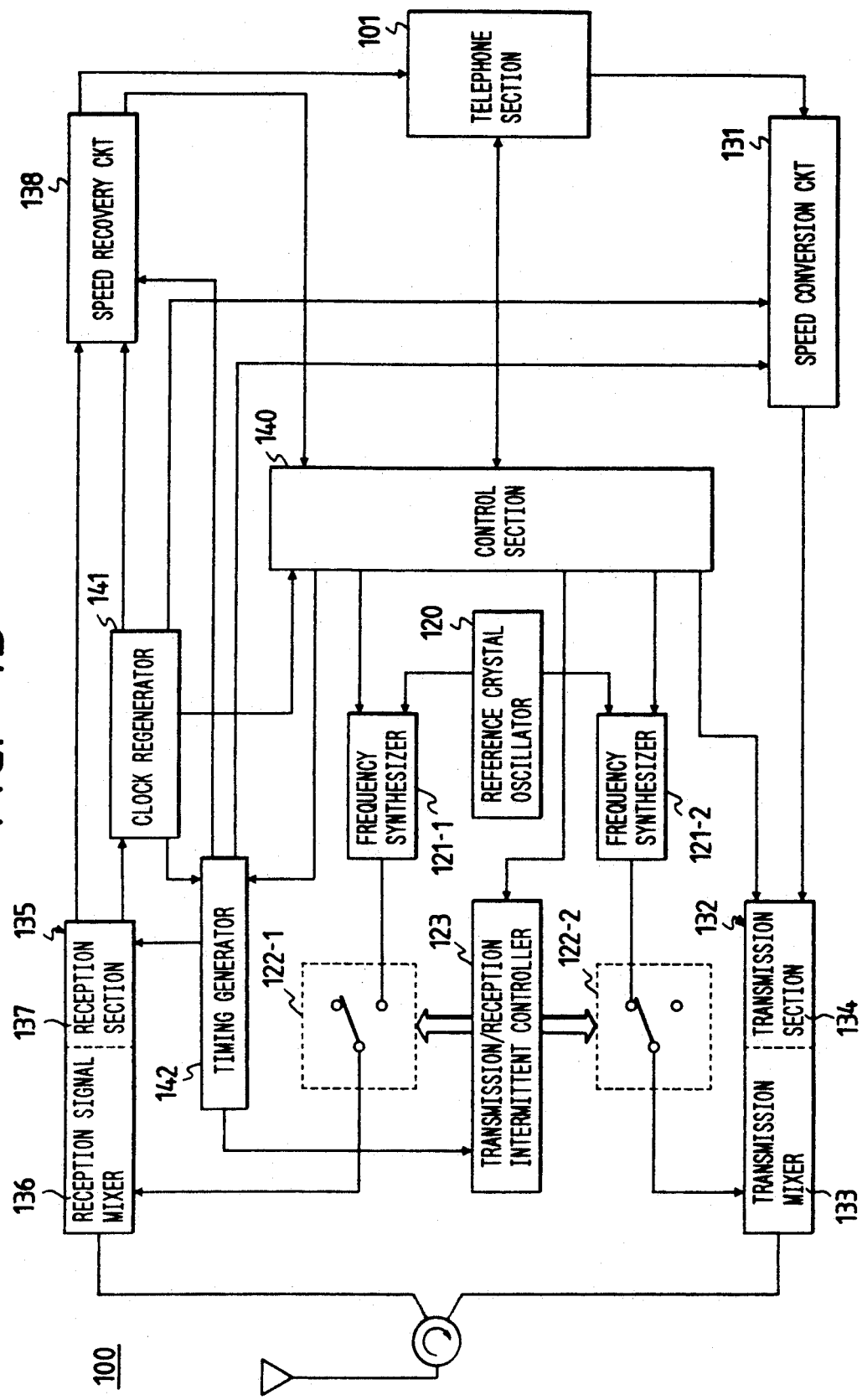
FIG. 1B is a diagram showing the circuit configuration of an exemplary mobile radio unit to be applied to the system of the invention.

FIGS. 1A, 1B, and 1C show exemplary system configurations for a description of an embodiment of the invention.

In FIG. 1A, reference numeral 10 designates a general telephone network; 20, a gateway switching unit for switching the connection between the telephone network 10 and a radio system; 30, a radio base station including: an interface with the gateway switching unit 20; a circuit for converting signal speeds; a circuit for allotting and selecting time slots; a control section; and a circuit for not only connecting and disconnecting radio signal lines but also exchanging radio signals with mobile radio units 100 (100-1 to 100-n).

Between the gateway switching unit 20 and the radio base station 30 are transmission lines for transmitting communication signals 22-1 to 22-n including communication signals of communication channels CH1 to CHn and control signals.

FIG. 1B shows a circuit diagram of the mobile radio unit 100 that communicates with the radio base station 30. Reception signals such as a control signal and a communication signal received by an antenna section are applied to a radio reception circuit 135, which includes a reception signal mixer 136 and a reception section 137. The communication signal which is an output of the radio reception circuit 135 is applied to a speed recovery circuit 138, a control section 140, and a clock regenerator 141. The clock regenerator 141 regenerates a clock from a received signal and applies the regenerated clock to the speed recovery circuit 138, the control section 140, and a timing generator 142.

The speed recovery circuit 138 recovers the speed ("pitch" in the case of an analog signal) of a time-division time-compressed communication signal among the received signals so that the recovered signal is a continuous signal, and applies it to a telephone section 101 and the control section 140. The communication signal outputted from the telephone section 101 is divided by a predetermined time interval and has its speed ("pitch" in the case of an analog signal) increased (compressed) at a speed conversion circuit 131. The communication signal thus processed is then fed to a radio transmission circuit 132 that includes a transmission mixer 133 and a transmission section 134.

The output of a modulator included in the transmission section 134 is converted into a predetermined radio frequency by the transmission mixer 133, sent out from the antenna section, and received by the radio base station 30. To transmit the radio signal from the mobile radio unit 100 to the radio base station 30 using a permitted time slot, timing information must be obtained from the timing generator 142 shown in FIG. 1B through the control section 140.

The timing generator 142 supplies to a transmission/-reception intermittent controller 123, the speed conversion circuit 131, or the speed recovery circuit 138 a timing required thereby based on a clock from the clock regenerator 141 and a control signal from the control section 140.

The mobile radio unit 100 includes: synthesizers 121-1, 121-2; selector switches 122-1, 122-2; the transmission/reception intermittent controller 123 which generates a signal for selecting the selector switch 122-1 or 122-2; and the timing generator 142. The synthesizers 121-1, 121-2, the transmission/reception intermittent controller 123, and the timing generator 142 are controlled by the control section 140. Each of the synthesizers 121-1, 121-2 receives a reference frequency supplied from a reference crystal oscillator 120.

FIG. 1C shows the radio base station 30. The n-channel communication signals 22-1 to 22-n between the radio base station 30 and the gateway switching unit 20 are connected to a signal processing section 31 through transmission lines constituting an interface.

The communication signals 22-1 to 22-n sent from the gateway switching unit 20 are applied to the signal processing section 31 of the radio base station 30. The signal processing section 31 has amplifiers for compensating for transmission losses, and performs a so-called 2-line-to-4-line switching operation. Specifically, its input signal and its output signal are mixed and separated. The input signals from the gateway switching unit 20 are sent to a signal speed conversion circuit group 51. The output signals from a signal speed recovery circuit group 38 are transmitted to the gateway switching unit 20. Among the above-described signals, the input signals from the gateway switching unit 20 are inputted to the signal speed conversion circuit group 51 which includes a number of signal speed conversion circuits 51-1 to 51-n, and are subjected to speed conversion while being divided by a predetermined time interval. The signals transmitted to the gateway switching unit 20 from the radio base station 30 are inputted to the signal speed recovery circuit group 38 through a signal selection circuit group 39 and then inputted to the signal processing section 31 after their speed (pitch) has been converted.

Control signals and/or communication signals outputted from the radio reception circuit 35 are inputted to the signal selection circuit group 39 which includes signal selection circuits 39-1 to 39-n for selecting signals on a time slot basis. The inputted signals are separated by the signal selection circuit group 39 so that a communication signal corresponding to each of the communication channels CH1 to CHn is obtained. The outputs from the signal selection circuit group 39 are subjected to signal speed (pitch) recovery by the signal speed recovery circuit group 38 which includes signal speed recovery circuits 38-1 to 38-n provided on a channel basis, received by the signal processing section 31 for a 4-line-to-2-line switching operation, and then sent to the gateway switching unit 20 as communication signals 22-1 to 22-n.

The function of the signal speed conversion circuit group 51 will now be described.

The signal speed conversion circuit group 51 has a function of compressing the time length of a signal. That is, an input signal such as a voice or control signal which has been divided by a predetermined time length can be compressed by storing it in a memory circuit at a certain storing speed and then reading such stored signal at a reading speed which is, e.g., 15 times the storing speed. The concept of the signal speed conversion circuit group 51 is the same as the concept which is applied to the reproduction of a tape-recorded voice at a higher speed. Practically, CCDs (charge-coupled device) and BBDs (bucket brigade device) can be used, or a memory used in television sets and tape recorders that can compress or expand the time axis of a speech may also be used (see "A Tape Recorder Capable of Compressing/Expanding the Time Axis of Speech," by Kosaka, et. al., Nikkei Electronics, Jul. 26, 1976, pp. 92-133).

As described in the above reference, circuits using the CCDs or BBDs exemplified for the signal speed conversion circuit group 51 can also be applied to the signal speed recovery circuit group 38 without any modification. In this case, speed recovery can be achieved by making the reading speed lower than the storing speed by a timing signal from the timing generator 42 which generates a timing based on a clock from a clock generator 41 and a control signal from a control section 40.

Control signals and/or voice signals outputted from the gateway, switching unit 20 via the signal processing section 31 are inputted to the signal speed conversion circuit group 51, subjected to speed (pitch) conversion, and then applied to a signal allotting circuit group 52 which allots signals on a time slot basis. The signal allotting circuit group 52 is a buffer memory circuit, which stores a segment of high-speed signals outputted from the signal speed conversion circuit group 51, reads these signals stored in the buffer memory based on timing information from the timing generator 42 given by an instruction from the control section 40, and sends the read signals to the radio transmission circuit 32. As a result, the communication signals are time-serially arranged in series with no overlapping channels, making an apparently continuous signal wave when control signals and/or communication signals are fully loaded therein, which case will be described later.

Modes of the signals thus compressed will be described next with reference to FIGS. 2A (a), (b) and FIGS. 2B (a), (b).

The output signals from the signal speed conversion circuit group 51 are inputted to the signal allotting circuit group 52, where time slots are allotted to these signals in a predetermined sequence. Reference characters SD1, SD2, . . . , SDn in FIG. 2A (a) indicate that speed-converted communication signals are allotted on a time slot basis.

As shown in FIGS. 2A (a) and (b), each time slot loads a synchronizing signal and a control signal and/or a communication signal. If no communication signal is loaded, there is only a synchronizing signal with an idle slot signal applied in place of the communication signal. Accordingly, as shown in FIG. 2A (a), signals filling one frame which consists of time slots SD1 to SDn are applied to a modulation circuit of the radio transmission circuit 32.

The multiplexed signals time-serially arranged for transmission are angle-modulated by the radio transmission circuit 32 and then transmitted on air from the antenna section thereof.

Figure 3A:
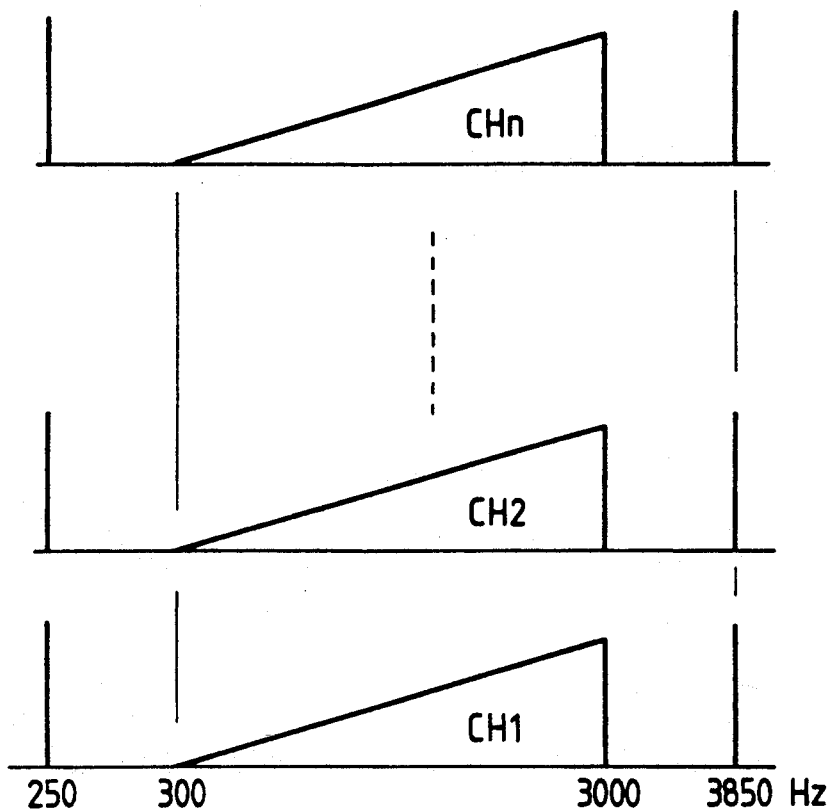
FIGS. 3A (a), 3A(b) and FIG. 3B are diagrams showing spectra of communication signals and control signals.
Figure 3A:
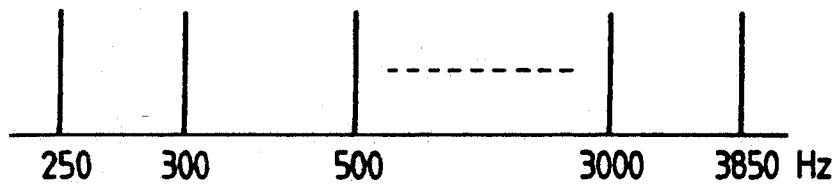

With respect to transmission of control signals between the radio base station 30 and the mobile radio unit 100 at the time of calling before starting a communication over the telephones, either frequencies which are in or out of a frequency band dedicated to the telephone number can be used. FIGS. 3A (a) and (b) show the relationship between these frequencies. FIG. 3A (a) illustrates a signal outside the frequency band, which can use low frequencies (250 Hz) and high frequencies (3850 Hz). This signal could be, e.g., a control signal which must be sent during communication.

FIG. 3A (b) illustrates a signal within the frequency band, which could be a signal to be sent at the time of calling.

While the above examples deal with tone signals, signals of various types can be transmitted at high speeds by increasing the number of tone signals or modulating the tones.

Figure 3B:
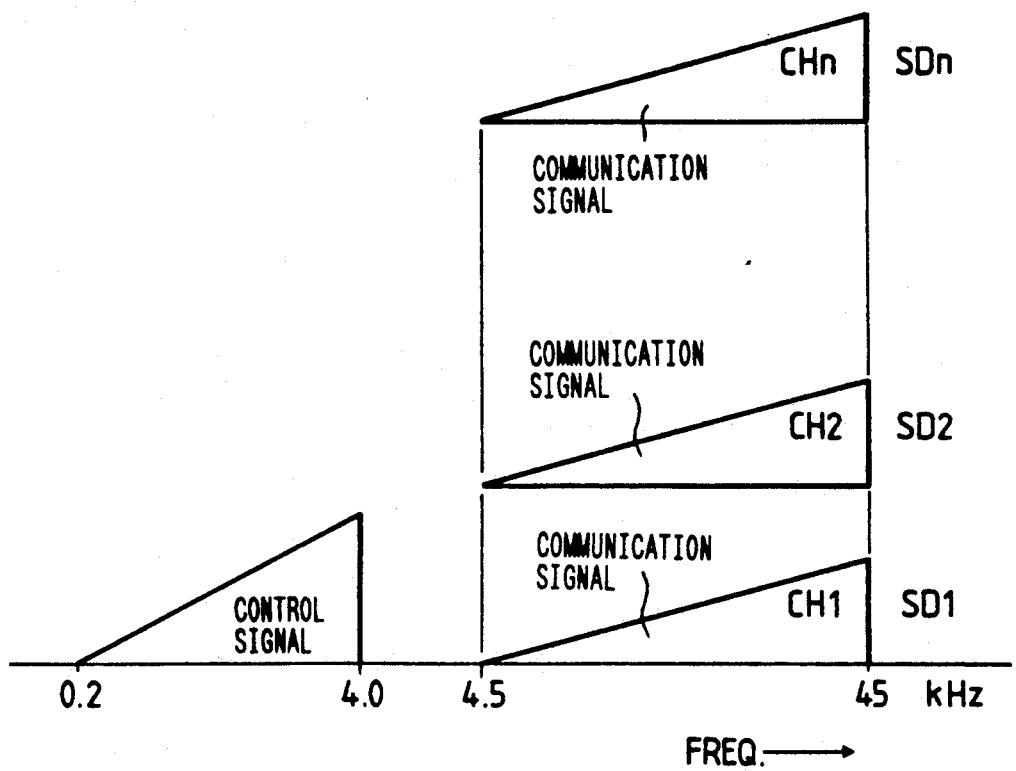
FIG. 3C is a diagram showing a circuit configuration for multiplexing a voice signal and a data signal.
FIG. 3D is a diagram showing spectra of a TCM signal and an FDM signal.
Figure 3C:
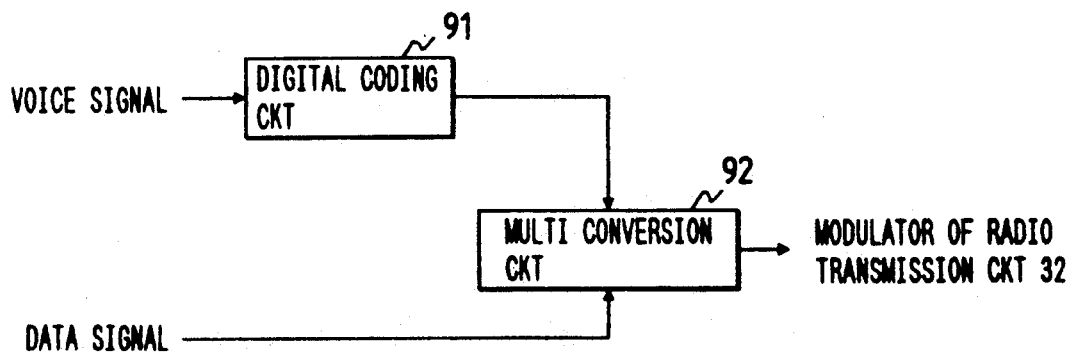

The above describes the case of analog signals. When a digital data signal is used as a control signal, the voice signal may also be digitally coded, and both digitized signals may be subjected to time-division multiplexing before being transmitted. A circuit to be used in this case is as shown in FIG. 3C. FIG. 3C shows an example in which a voice signal is digitized by a digital coding circuit 91; the digitized signal is multiplexed with a data signal by a multiplexing circuit 92; and the multiplexed signal is applied to a modulation circuit included in the radio transmission circuit 32. However, when designing a system that handles digital data signals, it should be noted that no NSLA (described later) is present unlike the case of multiplexing analog signals.

To the multiplexed signal received by its counterpart receiver, an inverse process of that shown in FIG. 3C is carried out by a demodulation circuit and, as a result, the voice signal and the control signal can be taken out separately.

In contrast thereto, signals sent from the mobile radio unit 100 are received by the antenna section of the radio base station 30 and inputted to the radio reception circuit 35. FIG. 2A (b) schematically shows such upward input signals. Specifically, time slots SU1, SU2, ..., SUn designate transmission signals to the radio base station 30 from the mobile radio units 100-1, 100-2, ..., 100-n. Each of the time slots SU1, SU2, ..., SUn loads a synchronizing signal and a control and/or a communication signal as shown at lower left in FIG. 2A (b). However, the synchronizing signal may be omitted if a distance between the radio base station 30 and the mobile radio unit 100 is short or depending on the signal speed. Moreover, the waveforms of radio carriers of the above upward radio signals within the time slots are as schematically shown in FIG. 2B (c).

The control signals among the input signals sent to the radio base station 30 are applied to the control section 40 directly from the radio reception circuit 35; provided however, that, depending on the speed conversion rate, the communication signals may be subjected to similar speed processing and applied to the control section 40 from the output of the signal speed recovery circuit group 38 thereafter. In the mean time, the communication signals are applied to the signal selection circuit group 39. The signal selection circuit group 39 receives timing signals from the timing generator 42 instructed by a control signal from the control section 40, separates a synchronizing signal from a control signal and/or a communication signal at each of the time slots SU1 to SUn, and outputs them. These signals are inputted to the signal speed recovery circuit group 38. This circuit 38 has a function of performing an inverse process of that of the speed conversion circuit 131 (FIG. 1B) of the transmitting mobile radio unit 100, thereby causing the original signals to be faithfully reproduced and transmitted to the gateway switching unit 20.

Transmission of signals through signal space in the invention will now be described in relation to required transmission bands and radio channels adjacent thereto.

As shown in FIG. 1C, control signals from the control section 40 are applied to the radio transmission circuit 32 in parallel to outputs from the signal allotting circuit group 52; provided however, that, depending on the speed conversion rate, the control signal may be subjected to processing similar to that of the communication signals and applied to the radio transmission circuit 32 from the output of the signal allotting circuit group 52 thereafter.

The circuit configuration of the mobile radio unit 100 is also such as to accommodate processing when the radio base station 30 has a 1-channel communication line as shown in FIG. 1B. A frequency distribution at its output when original signals, e.g., voice signals (0.3 kHz to 3.0 kHz) have passed through the signal speed conversion circuit group 51 (FIG. 1C) are as shown in FIG. 3B. Specifically, if the speed of a voice signal is converted to a speed which is 15 times the original speed as described above, then the frequency distribution of the signal must be increased to levels of 4.5 kHz to 45 kHz as shown in FIG. 3B. While the frequency distribution of the signal is increased here, its waveform is converted merely such as to have its frequency axis extended (analogously converted). It should be noted here that the only change is the analogous conversion of the waveform. This point must be remembered when calculating NSLAs.

FIG. 3B shows the case where a control signal is transmitted simultaneously with voice signals while carried on a low-frequency band of the voice signals. Let it be assumed that the control signal (0.2 to 4.0 kHz) and the communication signal CH1 (4.5 to 45 kHz designated by SD1) among these signals are loaded in a time slot, e.g., SD1. The same apply to other voice signals loaded in the time slots SD2 to SDn.

That is, the time slot SDi (i=2, 3, ..., n) loads a control signal (0.2 to 4.0 kHz) and a communication signal CHi (4.5 to 45 kHz). However, these signals in each time slot are time-serially arranged and no signals in a plurality of time slots can in any way be applied simultaneously to the radio transmission circuit 32. Nor will any other control signal be loaded in a time slot if a first time slot of a frame is allotted to a control signal. Further, when using the band of lower frequencies for other signals, a time slot for a control signal may be provided adjacent to the frequencies dedicated to the communication signals (4.1 to 4.4 kHz or 46 to 46.5 kHz).

When these communication signals are applied to the angle modulation section included in the radio transmission circuit 32 together with the control signal, at least $$f_c \pm 45 \text{ kHz}$$

is required as a transmission band, where $f_c$ is the radio carrier frequency. If a plurality of radio channels are available in the system, the highest speed at which signals can be converted by the signal speed conversion circuit group 51 is limited by inter-channel frequency interval restrictions. With the frequency interval among the plurality of radio channels being $f_{rep}$ and the highest signal speed being $f_H$, the following inequality must be established.

$$f_{rep} > 2f_H$$

In contrast thereto, in the case of a digital signal, a voice signal is digitized generally at a speed of about 64 kb/s. Thus, it is necessary to read the scale of the horizontal axis about one digit higher in FIG. 3B which presents the case of the analog signal. The above relationship, however, similarly applies to the case of the digital signal.

The control signals incoming from the mobile radio unit 100 to the radio base station 30 are applied to the radio transmission circuit 35, and part of the output of the radio transmission circuit 35 is destined to the control section 40 and the rest to the signal speed recovery circuit group 38 through the signal selection circuit group 39. The control signals following the latter path are subjected to speed conversion that is completely inverse to the speed conversion at the time they have been transmitted (conversion to a lowspeed signal) so that their speeds equal those of signals used in the general telephone network 10. The low-speed signals are then sent to the gateway switching unit 20 through the signal processing section 31.

Figure 1D:
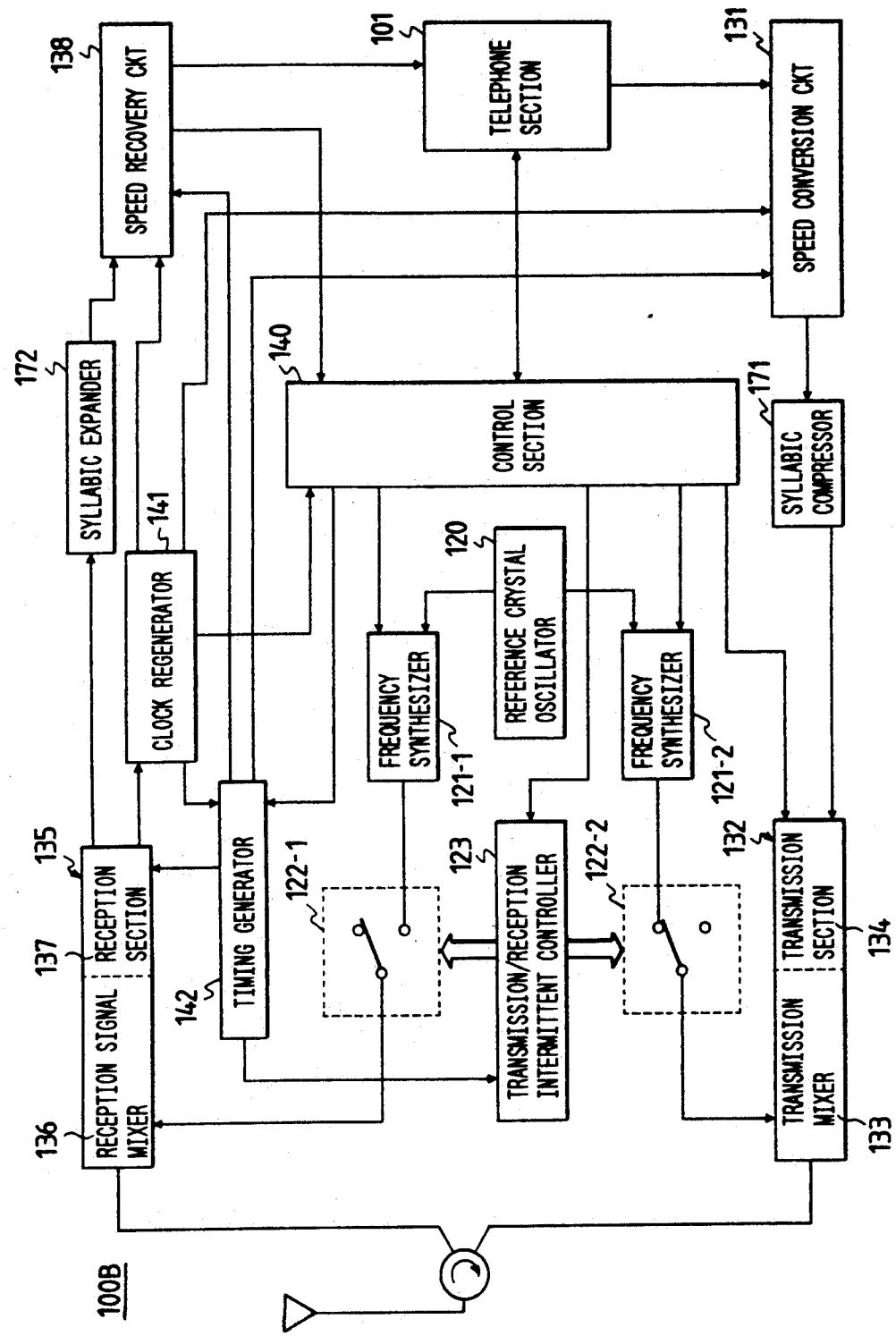
FIGS. 1D, 1E, 1F are diagrams showing the circuit configurations of other exemplary mobile radio units to be applied to the system of the invention.
Figure 1E:
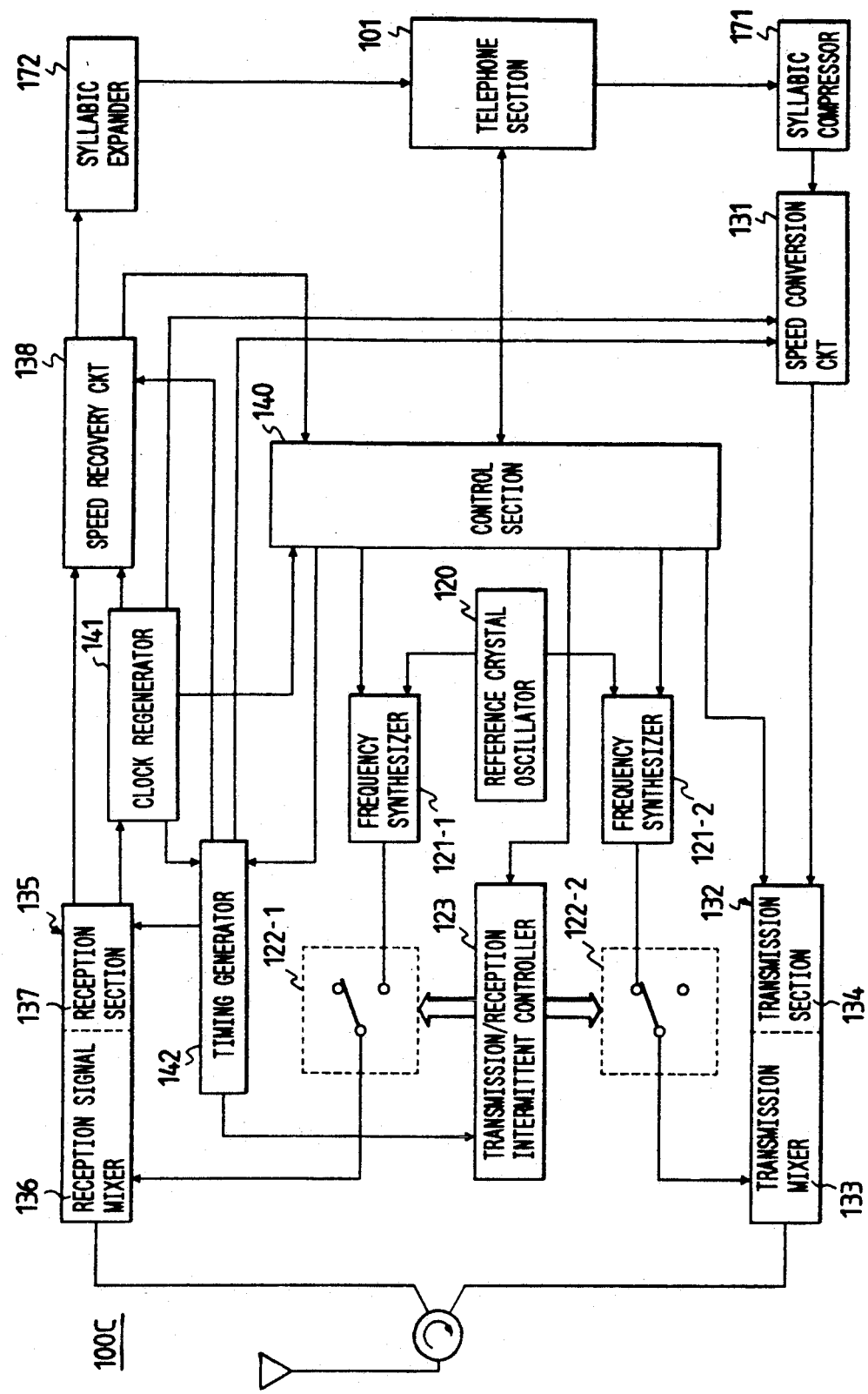

FIGS. 1D and 1E show other exemplary mobile radio units 100B and 100C. These mobile radio units 100B and 100C are distinguished from the mobile radio unit 100 shown in FIG. 1B in that the former include a compressor 171 and an expander 172. The compressor 171 compresses signals from a transmitter to prevent their peaks from exceeding a predetermined deviation, while the expander 172 in turn expands received signals that have been compressed by the compressor 171.

In the mobile radio unit 100B (FIG. 1D), the compressor 171 is interposed between the speed conversion circuit 131 and the radio transmission circuit 132, and the expander 172, between the radio reception circuit 135 and the speed recovery circuit 138. In the mobile radio unit 100C (FIG. 1E), the compressor 171 is interposed between the telephone section 101 and the speed conversion circuit 131, and the expander 172, between the speed recovery circuit 138 and the telephone section 101.

Figure 1F:
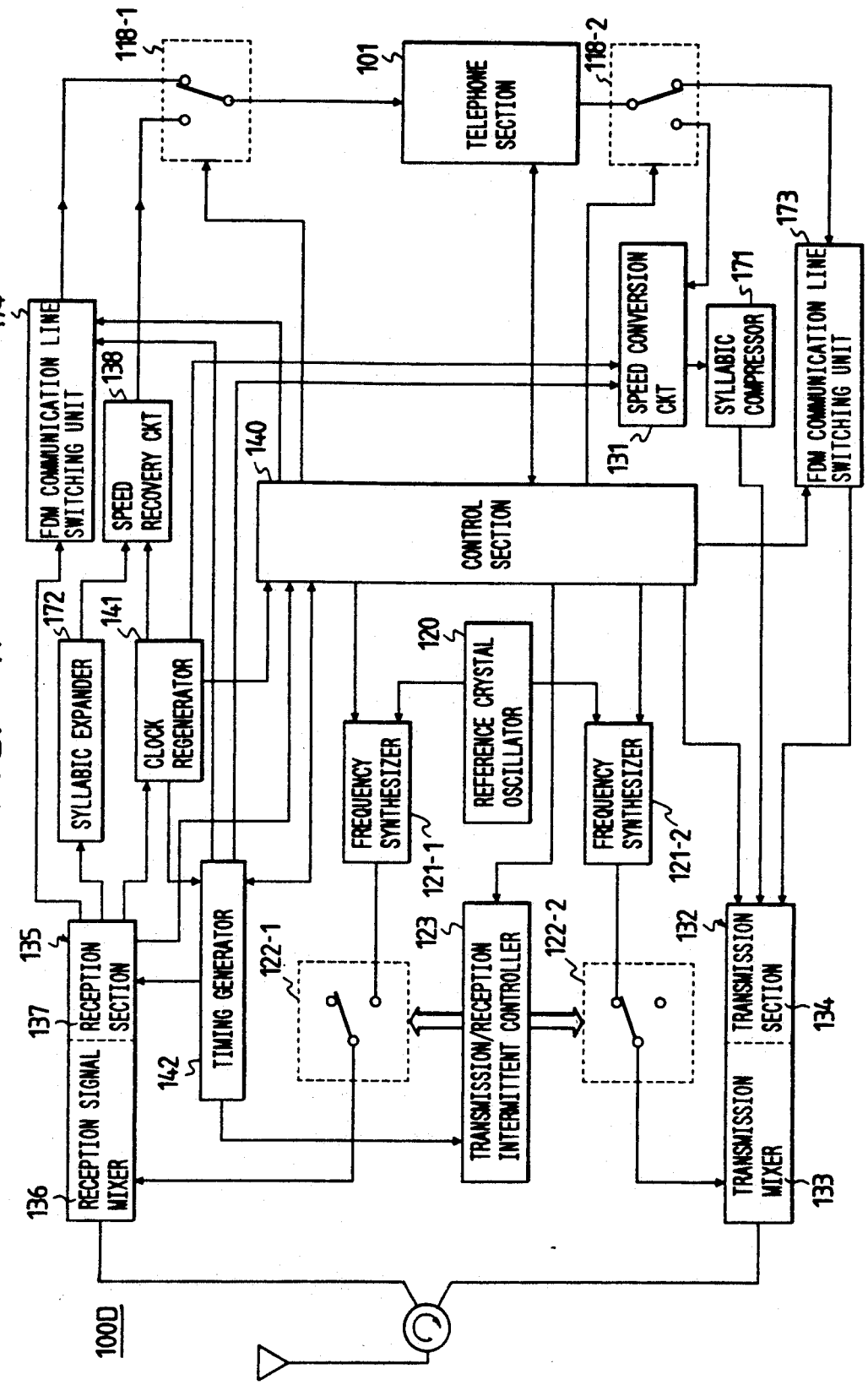

FIG. 1F shows still another exemplary mobile radio unit 100D. The mobile radio unit 100D is distinguished from the mobile radio unit 100B shown in FIG. 1D in that to the former, FDM (frequency-division multiplexing) communication line converters 173, 174 and switches 118-1, 118-2, all constituting noncompressed signal communication means, are added. The switch 118-1 selects a reception signal from either the FDM communication line switching unit 174 or the speed recovery circuit 138, and the switch 118-2 applies a transmission signal to either the FDM communication line switching unit 173 or the speed conversion circuit 131. These switches allow a means of communication to be selected, either an FDM signal or a TCM (time-division time-compressed multiplexed) signal.

Figure 1G:
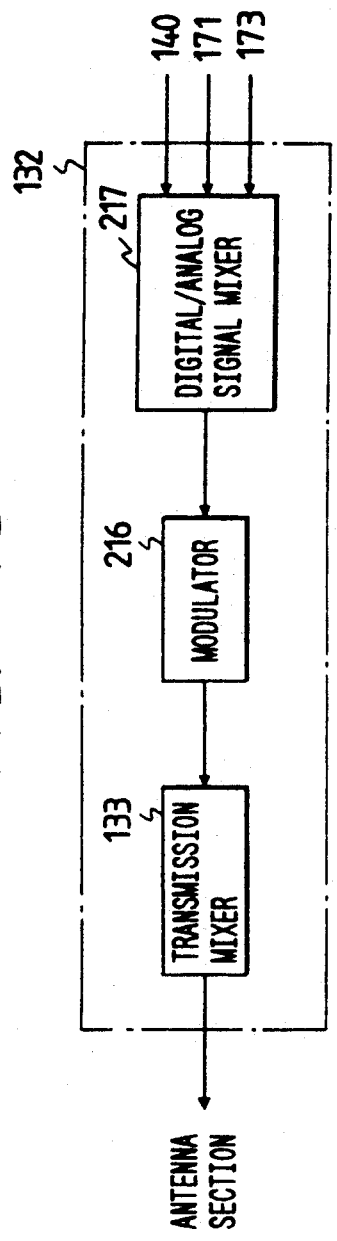
FIG. 1G is a diagram showing in detail the circuit configuration of a radio transmission circuit which is a component of the mobile radio unit shown in FIG. 1F.

FIG. 1G shows a detailed circuit suitable for the radio transmission circuit 132 shown in FIG. 1F. A digital/analog signal mixer 217 receives at least one signal from among the following three signals: a digital control signal from the control section 140, an analog TCM signal from the compressor 171, and an analog FDM signal from the FDM communication line switching unit 173, and mixes them. The mixed signal is then modulated at a modulator 216 and applied to the antenna section as an output through the transmission mixer 133.

Figure 1H:
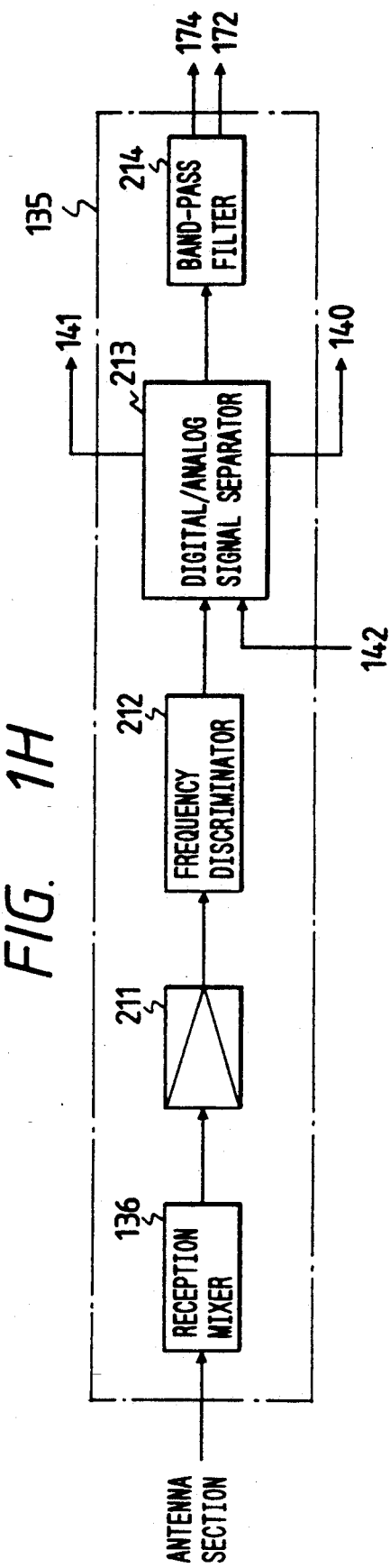
FIG. 1H is a diagram showing in detail the circuit configuration of a radio reception circuit which is a component of the mobile radio unit shown in FIG. 1F.

FIG. 1H shows a detailed circuit suitable for the radio reception circuit 135 shown in FIG. 1F. The received signal from the antenna section is applied to a digital/analog signal separator 213 through a reception mixer 136, an amplifier 211, and a frequency discriminator 212, and the separated signals are then digitized based on timing signals from the timing generator 142. The digitized signals are then applied to the clock regenerator 141, the control section 140, and the analog TCM and FDM signals are applied to both the expander 172 and the FDM communication line switching unit 174 through a band pass filter 214, respectively.

Unless otherwise specified, the mobile radio units 100, 100B, 100C, 100D are hereinafter referred to collectively as the "mobile radio unit 100."

Figure 1I:
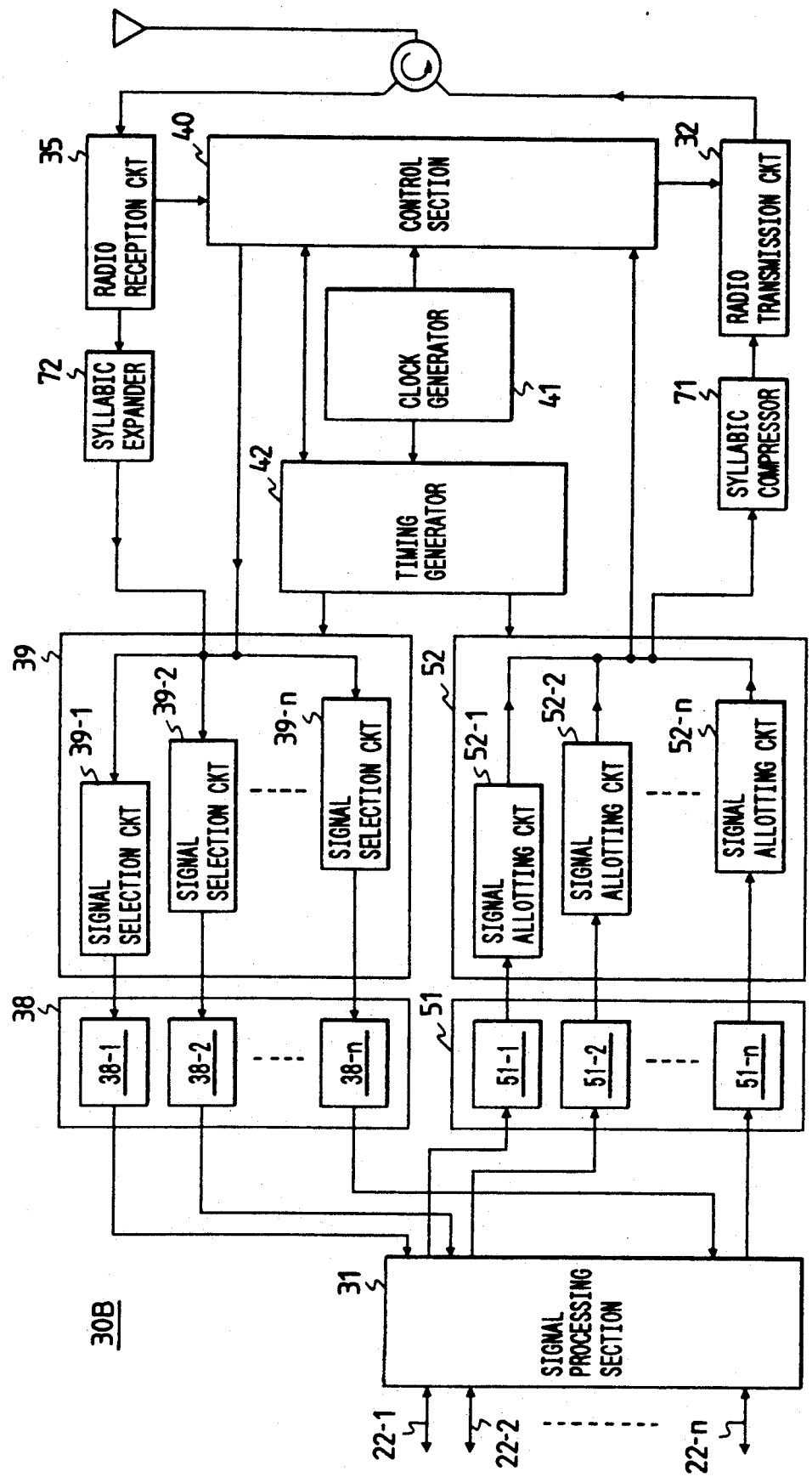
FIGS. 1I, 1J, 1K are diagrams showing the circuit configurations of other exemplary radio base stations to be applied to the system of the invention.
Figure 1J:
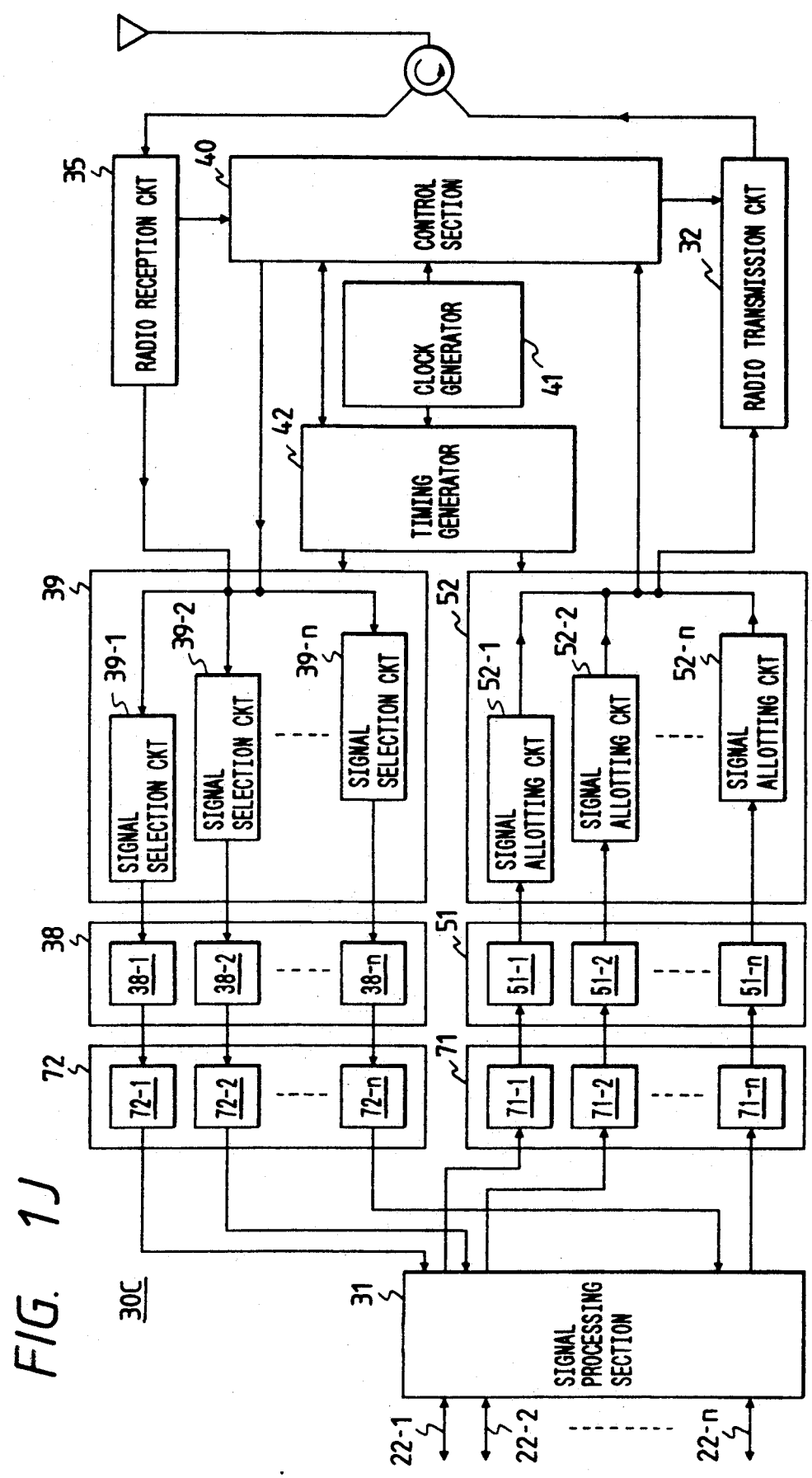

FIGS. 1I and 1J show other exemplary radio base stations 30B and 30C. These radio base stations 30B and 30C are distinguished from the radio base station 30 shown in FIG. 1C in that the former include a compressor 71 or a compressor group 71 including compressors 71-1 to 71-n and an expander 72 or an expander group 72 including expanders 72-1-72-n. The compressor 71 or the compressor group 71 compresses signals from a transmitter to prevent the peak value from exceeding a predetermined deviation, while the expander 72 or the expander group 72 in turn expands received signals that have been compressed by the compressor(s).

In the radio base station 30B (FIG. 1I), the compressor 71 is interposed between the signal allotting circuit group 52 and the radio transmission circuit 32, and the expander 72, between the radio reception circuit 35 and the signal selection circuit group 39. In the radio base station 30C (FIG. 1J), the compressor group 72 including the compressors 71-1 to 71-n is interposed between the signal processing section 31 and the signal speed conversion circuit group 51, and the expander group 72 including the expanders 72-1 to 72-n, between the signal speed recovery circuit group 38 and the signal processing section 31.

Figure 1K:
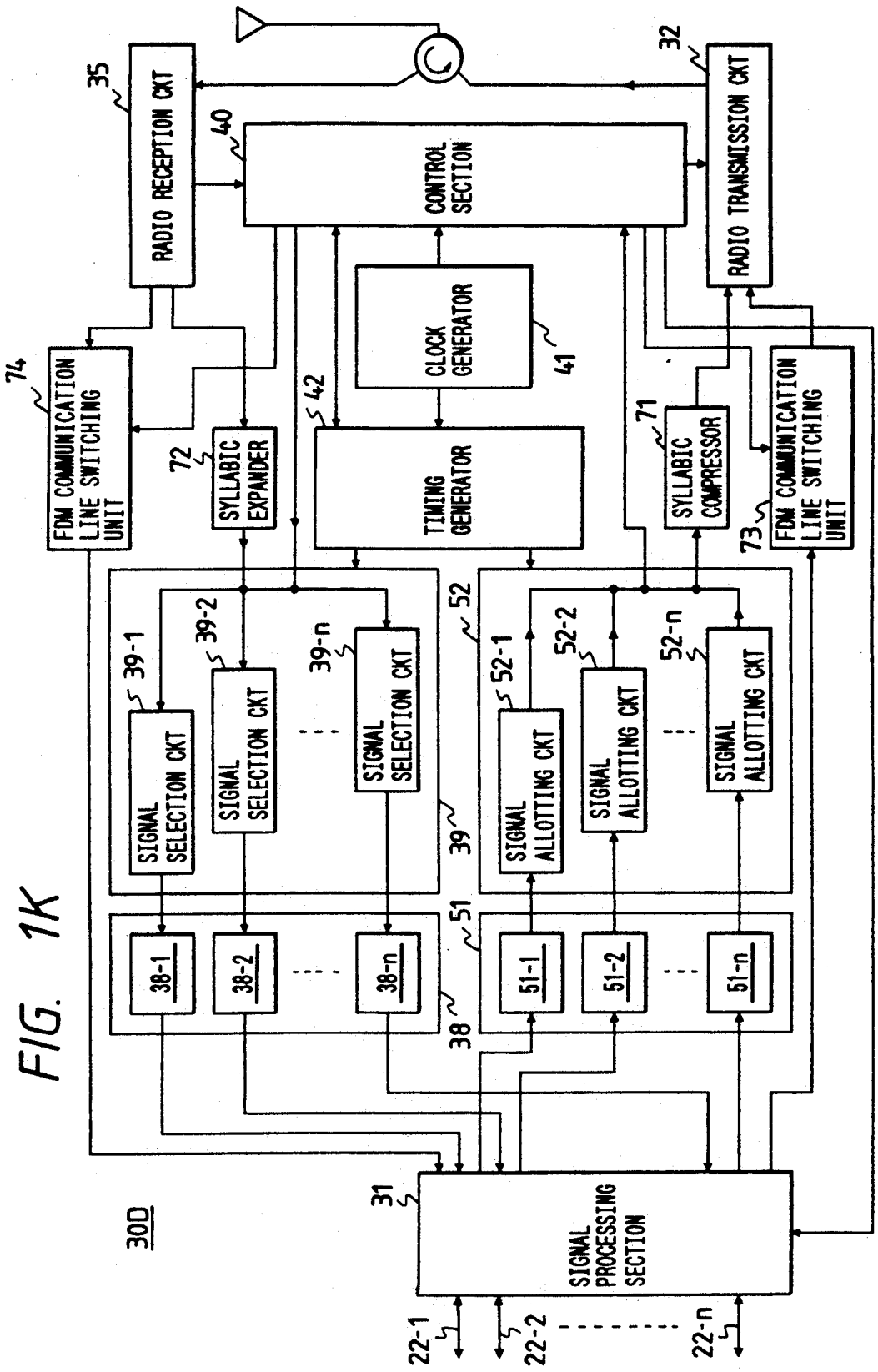

FIG. 1K shows still another exemplary radio base station 30D. This radio base station 30D is distinguished from the radio base station 30B shown in FIG. 1I in that FDM communication line switching units 73, 74, both constituting noncompressed signal communication means, are added to the transmission and reception sides in the base radio station 30D. The FDM communication line switching units 73, 74 are operated in a manner similar to that of the mobile radio unit 100D. In the radio base station 30D, it is the signal processing section 31 that performs the function of the switches 118-1, 118-2 used in the mobile radio unit 100D. The signal processing section 31 is operated in accordance with an instruction from the control section 40.

Unless otherwise specified, the radio base stations 30, 30B, 30C, 30D are hereinafter referred to collectively as the "radio base station 30."

Now, the calling operation of the system according to the invention will be described, taking a voice signal as an example.

(1) Call originating from mobile radio unit 100

The calling from the mobile radio unit 100 will be described with reference to the flow charts shown in FIGS. 4A and 4B.

When the power of the mobile radio unit 100 is turned on, the radio reception circuit 135 shown in FIG. 1B starts searching a control signal carried on a downward radio channel (e.g., a channel CH1) (by the term "downward" it is intended to mean "from the radio station 30 to the mobile radio unit 100"). If the system includes a plurality of radio channels, one of the following radio channels (hereinafter referred to as "channel CH1") is set to receive signals in accordance with procedures specified by the system:

i) A radio channel that exhibits the highest reception input electromagnetic field;

ii) A radio channel specified by a control signal incorporated in the radio channels; or iii) A radio channel having an idle time slot or slots among the time slots within the radio channels. The system performs the above by searching for a synchronizing signal within the time slot SDi shown in FIG. 2A (a). The control section 140 sends a control signal to generate a station-originated frequency which allows the synthesizer 121-1 to receive the radio channel CH1, while fixing the switch 122-1 to the synthesizer 121-1 position.

When the receiver of the telephone section 101 is put in an off-hook position (S201 in FIG. 4A), the synthesizer 121-2 shown in FIG. 1B receives from the control section 140 a control signal for generating a station-originated frequency which permits transmission of the radio channel CH1. The switch 122-2 is also set to the synthesizer 121-2 position and fixed as such. Then, an off-hook control signal outputted from the telephone section 101 is transmitted using that radio channel CH1. This control signal is transmitted in, e.g., a time slot SUn over frequencies shown in FIG. 3A (b).

This control signal is transmitted solely in the time slot SUn in burst form and not transmitted in other time slots, thereby not interfering with other communications. However, if the speed of the control signal is relatively low or the volume of data of the signal is so large that the data cannot be accommodated by a single time slot, then the signal is transmitted in the same time slot one frame after and, if still necessary, in the same time slot two frames after.

The following technique is employed to search for the time slot SUn. As shown in FIG. 2A (*a*), the control signal transmitted from the radio base station 30 includes a synchronizing signal and a control signal that follows the synchronizing signal. The mobile radio unit 100 is made frame-synchronous by receiving such control signal. This control signal also includes control data such as indications of currently used and unused time slots (idle time slots). Some systems use a control signal which includes only a synchronizing signal and a communication signal when the time slot SDi (i=1, 2, ..., n) is occupied by other communications. Even in such a case, an unused time slot usually contains a synchronizing signal and a control signal, and it is by reception of this control signal that the mobile radio unit 100 can be instructed on which time slot should be used to transmit the off-hook signal.

If all the time slots are being occupied, no calling can be made through this radio channel. Thus, another radio channel must be searched by sweeping.

Some other systems may identify no idle time slots. In such a case, confirmation of an idle time slot must be made by searching the presence or absence of voice multiplexed signals SD1, SD2, ..., SDn one after another.

Returning to the main subject, the mobile radio unit 100, which has received the control data transmitted by one of the above-described techniques, can judge not only the time slot in which to transmit the off-hook control signal but also its transmission timing.

Assuming that the time slot SUn for upward signals is an idle time slot, a burst-like control signal can be transmitted by sending the off-hook control signal using this idle time slot and by taking a required timing out of the response signals from the radio base station 30.

If there is off-hook operations from other mobile radio units simultaneously, the off-hook signals cannot be transmitted satisfactorily to the radio base station 30 due to their interference. Thus, the operation must be started all over again; but such likelihood is confined to a very low value from the system design viewpoint. To further reduce the off-hook signal collision, the following techniques will be adopted.

Assuming that a mobile radio unit 100 has found an idle time slot for its off-hook operation, such a time slot should not be monopolized but should be shared by a plurality of mobile radio units; e.g., a first half is allotted to one mobile radio unit and a second half to another mobile radio unit for the transmission of their off-hook signals. That is, in this technique, a time slot is divided into several time segments, each of which is allotted to a group of mobile radio units.

Another technique is to prepare a number of frequencies dedicated to control signals, each of which is allotted to a group of mobile radio units. According to this technique, even if control signals whose frequencies are different from each other are transmitted simultaneously within a single time slot, there will be no interference at the radio base station 30. The above two techniques may be adopted separately, or may be applied conjointly to obtain synergetic effects.

If the off-hook control signal from the mobile radio unit 100 has been received by the radio base station 30 satisfactorily and if the ID (identification number) of the mobile radio unit 100 has been detected (S202), the control section 40 searches for a currently idle time slot. Although it may be the time slot SUn that is allotted to the mobile radio unit 100, the control section 40 does search for one to make sure. This search operation is performed to accommodate simultaneous off-hook operations from other mobile radio units in addition to the off-hook operation from the mobile radio unit 100 and to find a time slot suiting the service type and zone.

If the control section 40 has searched for, e.g., an idle time slot SD1, it instructs the mobile radio unit 100 to use the upward time slot SU1 (by the term "upward" it is intended to mean "from the mobile radio unit 100 to the radio base station 30") and its corresponding downward time slot SD1 by a downward control signal using the time slot SD1 of the radio channel CH1 (S203).

In response thereto, the mobile radio unit 100 not only is set to receive the signal in the instructed time slot SD1 but also selects the time slot SU1 (see FIG. 2A (*b*)), corresponding to the time slot SD1, for the upward radio channel. At this time, the control section 140 of the mobile radio unit 100 causes the transmission/reception intermittent controller 123 and the switches 122-1, 122-2 to operate one to the other (S204). Simultaneously therewith, the control section 140 transmits a slot switching end report to the radio base station 30 using the upward time slot SU1 (S205) and then waits for a dial tone (S206).

The state of the time slot SU1 for the radio carrier of an upward signal is schematically shown in FIG. 2B (*c*). The radio base station 30 receives not only the time slot SU1 but also upward signals in time slots SU3 and SUn from other mobile radio units 100 in the same frame.

The radio base station 30 which has received the slot switching end report (S207) sends the gateway switching unit 20 the off-hook signal (S208). The gateway switching unit 20, in response thereto, detects the ID of the mobile radio unit 100, turns on necessary switches in the group of switches included in the gateway switching unit 20 (S209), and sends a dial tone (S210 in FIG. 4B). This dial tone is transferred from the radio base station 30 (S211), causing the mobile radio unit 100 to confirm that the communication line has been established (S212).

Upon entering this state, the dial tone is heard from the receiver of the telephone section 101 of the mobile radio unit 100, and the transmission of a dial signal is initiated. This dial signal is subjected to speed conversion by the speed conversion circuit 131 and transmitted from the radio transmission circuit 132 including the transmission section 134 and the transmission mixer 133 using the upward time slot SU1 (S213). Accordingly, the transmitted dial signal is received by the radio reception circuit 35 of the radio base station 30.

The radio base station 30 has already responded to the off-hook signal from the mobile radio unit 10 and has already allotted the time slots to be used. The radio base station 30 has also operated its signal selection circuit group 39 and signal allotting circuit group 52 to get ready for the reception of the upward time slot SU1 and transmit the downward time slot SD1. Therefore, the dial signal transmitted from the mobile radio unit 100 passes through the signal selection circuit 39-1 of the signal selection circuit group 39, is inputted to the signal speed recovery circuit group 38 to have its original transmission signal recovered, then transferred to the gateway switching unit 20 as a communication signal 22-1 through the signal processing section 31 (S214), causing the communication line with the telephone network 10 to be established (S215).

In the meantime, an input signal (originally a control signal, but a communication signal once communication has been initiated) from the gateway switching unit 20 is subjected to speed conversion at the signal speed conversion circuit group 51 and has the time slot SD1 allotted by a signal allotting circuit 52-1 of the signal allotting circuit group 52 in the ratio base station 30. Then, this input signal thus processed is transmitted to the mobile radio unit 100 using the time slot SD1 of the downward radio channel from the radio transmission circuit 32. The mobile radio unit 100 is waiting for this signal with the time slot SD1 of its radio channel CH1 and receives it by its radio reception circuit 135. An output of the radio reception circuit 135 is inputted to the speed recovery circuit 138. The original transmission signal is thus recovered at this speed recovery circuit 138 and the speed-recovered recovered signal is inputted to the receiver of the telephone section 101. Accordingly, the communication between the mobile radio unit 100 and an ordinary telephone within the ordinary telephone network 10 is initiated (S216).

To end the communication, the receiver of the telephone section 101 of the mobile radio unit 100 must be put in an on-hook position (S217). Then, a communication end signal and an on-hook signal from the control section 140 are transmitted from the radio transmission circuit 132 of the mobile radio unit 100 to the radio base station 30 through the speed conversion circuit 131 (S218), while the control section 140 stops the operation of the transmission/reception intermittent controller 123 and sets the switches 122-1, 122-2 to the output terminals of the synthesizers 121-1, 121-2, respectively.

In the meantime, the control section 40 of the radio base station 30 receives the communication end signal from the mobile radio unit 100 and transfers the communication end signal to the gateway switching unit 20 (S219), causing the communication to be terminated by turning off a switch of a switch group (not shown) (S220). Simultaneously therewith, the control section 40 also frees the signal selection circuit group 39 and the signal allotting circuit group 52 of the radio base station 30.

In the above description, it is so treated that the communication of the control signals between the radio base station 30 and the mobile radio unit 100 does not involve such circuits as the signal speed conversion circuit group 51 and the signal speed recovery circuit group 38. However, this is for reasons of convenience only; the control signals can of course be exchanged satisfactorily while causing them to pass through the signal speed conversion circuit group 51, the signal speed recovery circuit group 38, the control signal speed conversion circuit 48, and the signal processing section 31 as in the case of voice signal communications. (2) Call incoming to mobile radio unit 100

The mobile radio unit 100 enters a waiting state when its power has been turned on. As described in section (1) under "Call originating from mobile radio unit 100," the mobile radio unit 100 is now ready to receive downward control signals on the radio channel CH1 that conforms to the procedures specified by the system.

Let it be assumed now that a call incoming signal to the mobile radio unit 100 has reached the radio base station 30 from the ordinary telephone network 10 via the gateway switching unit 20. Control signals pass through the signal speed conversion circuit group 51 as a communication signal 22 in a manner similar to that of the voice signals, and transmitted to the control section 40 through the signal allotting circuit group 52. As a result, the control section 40 sends the mobile radio unit 100 a signal consisting of a mobile radio unit 100 ID signal, a call incoming signal indication signal, and a time slot using signal (an SU1 corresponding to, e.g., an SD1 is used for transmission from the mobile radio unit 100). Upon reception of this signal sent from the control section 40, the mobile radio unit 100 causes this signal to be transmitted to its control section 140 from the reception section 137 of its radio reception circuit 135. The control section 140, which confirms that this signal is a call incoming signal to itself 100, rings a dial tone from its telephone section 101 and, simultaneously therewith, operates its transmission/reception intermittent controller 123 so as to wait at the instructed time slots SD1, SU1. The control section 140 also starts to turn on and off the switches 122-1, 122-2. Accordingly, the mobile radio unit 100 is ready for communication.

Since reference 2 theoretically illustrates that signals are transmitted satisfactorily by this system and do not adversely affect other radio channels within the system, such illustration will be omitted. In the following section, that TCM signals to be applied to the invention have NSLAs will be discussed theoretically, together with their applications.

(3) NSLA of a TCM signal transmitted from radio base station 30

Figure 5:
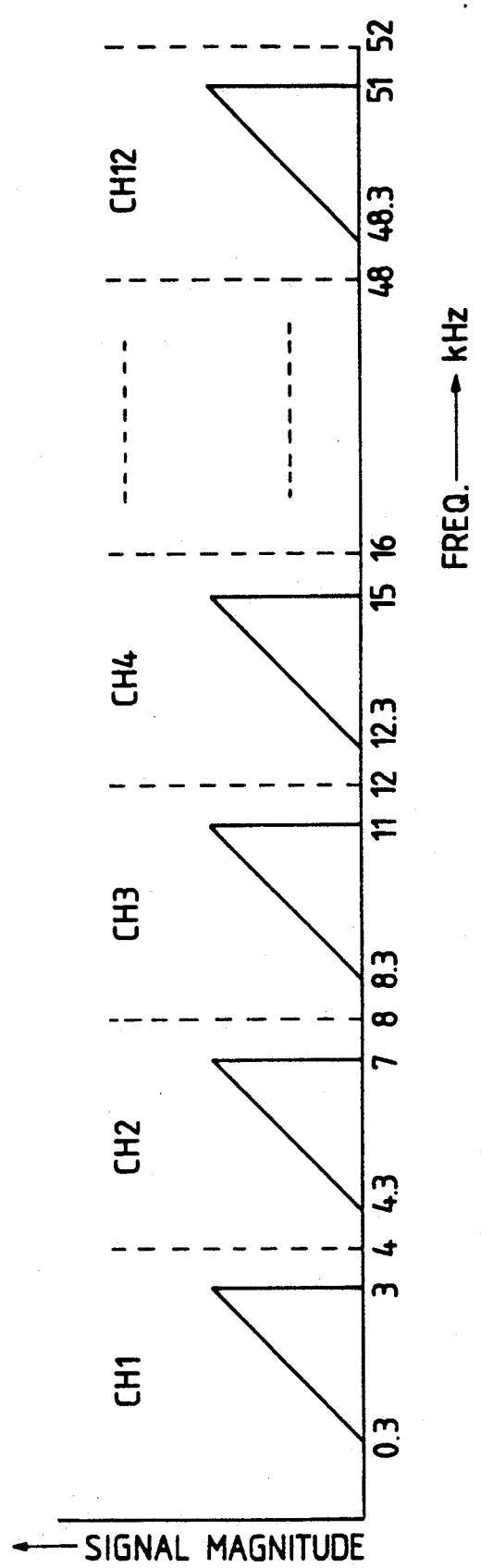
FIG. 5 is a diagram showing the spectrum of an FDM signal.

In an attempt to relate the NSLA of a TCM (time-division time-compressed multiplexed) signal to the NSLA of an FDM (frequency-division multiplexed) signal, voice signals carried by FDM channels CH1, CH2, ..., CHn will be expressed in functional form. As is well known, an FDM signal is obtained by frequency-converting voice signals and arranging the frequency-converted signals in line on the frequency axis as shown in FIG. 5. FDM signals enjoy extensive applications in coaxial transmission systems and microwave analog communication systems, and its NSLA used in many practical systems has provided enormous advantages. While a spectrum shown in FIG. 5 is in the case of 12-channel (CH1 to CH12) frequency-division multiplexing (FDM), various FDM with 60, 120, 480, 960, 1200, 2700 channels are generally used.

In the following description, it is assumed that the levels of input voice signals multiplexed to an FDM signal or a TCM signal are equal. Now, if the voice signals to be applied to the channels CH1, CH2, CH3, ..., CHn are expressed as $f_1(t)$, $f_2(t)$, $f_3(t)$, ..., $f_n(t)$. Transmission frequencies for these voice signals in wired transmission range from 0.3 to 3.4 kHz and those in mobile radio transmission, from 0.3 to 3.0 kHz. The latter frequency range has been selected. The frequency components of these voice signals are as follows: 0.3 to 3.0 kHz for channel CH1; 4.3 to 7.0 kHz for channel CH2; ..., $4\times(n-1)+0.3$ to $4\times(n-1)$ kHz for channel CHn, not overlapping one upon the another. The amplitude distributions of n voice signals in terms of signal waveform exhibit only shifts to higher frequency bands on the frequency axis, with their waveforms not changed at all. This is an important point in calculating NSLAs and can be expressed as follows. A known NSLA of an FDM signal coincides with those of FDM signals obtained by arranging n voice signals on the frequency axis as shown in FIG. 5 and by simply mixing n non-frequency-converted voice signals. This coincidence will be proved mathematically. A mixed signal consisting of the frequency-converted signals on the channels CH1, CH2, ..., CHn can be expressed by the following equation.

$$F(t) = f_1(t) + f_2(t) + \ldots + f_n(t) \quad (1)$$

A function $f_i(t)$ can specifically be expressed as follows.

$$f_1(t) = \sum_{\omega_{p1} \geq 0.3 \text{ kHz}}^{3 \text{ kHz}} a_{p1} \sin(\omega_{p1} t + \beta_{p1}) \quad (2)$$

$$f_i(t) = \sum_{\omega_{p1} \geq 0.3 + 4(i-1) \text{kHz}}^{(4i-1) \text{kHz}} a_{pi} \sin(\omega_{pi} t + \beta_{pi}) \quad (3)$$

However, $i \geq 2$.

A mixed signal consisting of non-frequency-converted signals is given by the following equation.

$$G(t) = g_1(t) + g_2(t) + \ldots + g_n(t) \quad (4)$$

where $$g_1(t) = f_1(t) \quad (5)$$

$$g_i(t) = \sum_{\omega_{pi} \geq 0.3 \text{ kHz}}^{3 \text{ kHz}} a_{pi} \sin(\omega_{pi} t + \beta_{pi}) \quad (6)$$

However, $i \geq 2$.

Then, the powers of the signals in equations (1) and (4) will be calculated.

The power of F(t) is $$T^{-1} \times \int_0^T F(t)^2 \, dt = \tfrac{1}{2} \sum_p \sum_i a_{pi}^2 \quad (7)$$

The power of G(t) is $$T^{-1} \times \int_0^T G(t)^2 \, dt = \tfrac{1}{2} \sum_p \sum_i a_{pi}^2 \quad (8)$$

However, the rule that no power generated between different signals is applied in the calculations.

$$\int_0^T f_i f_j \, dt = 0 \quad (9)$$

$$\int_0^T g_i g_j \, dt = 0$$

$$\int_0^T a_{pi} \sin(\omega_{pi} + \beta_{pi}) \times a_{pj} \sin(\omega_{pj} + \beta_{pj}) \, dt = 0$$

However, $i \neq j$

From equations (2) and (3), $$\int_0^T f_1^2(t) \, dt = \Sigma (\tfrac{1}{2}) a_{p1}^2 = \int_0^T g_1(t)^2 \, dt \quad (10)$$

$$\int_0^T f_i^2(t) \, dt = \Sigma (\tfrac{1}{2}) a_{pi}^2 = \int_0^T g_i(t)^2 \, dt \quad (11)$$

However, $i \geq 2$.

From equations (10) and (11), the following relation can be established.

$$F(t)^2 = G(t)^2 \quad (12)$$

It has been demonstrated from the above that the power of a signal unrelated to frequency conversion.

A case where the sampling theorem is applied to the function $g_i(t)$ will now be considered. It is well known that the original signal of $g_i(t)$ can be reproduced by samples (in voltage). The samples can be obtained by sampling the signal at a time interval of $1/(2f_h)$, i.e., every $1/6000$ sec since the highest frequency $f_h$ of $g_i(t)$ is 3 kHz.

Figure 6A:
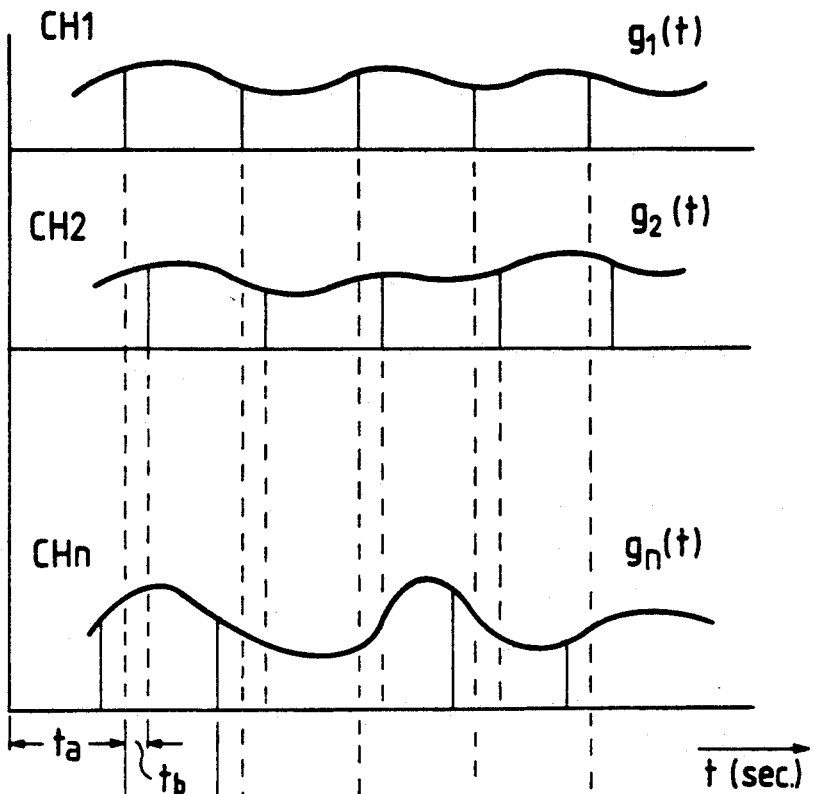
FIGS. 6A (a) and (b) are diagrams showing changes in amplitude of TCM signals.
Figure 6A:
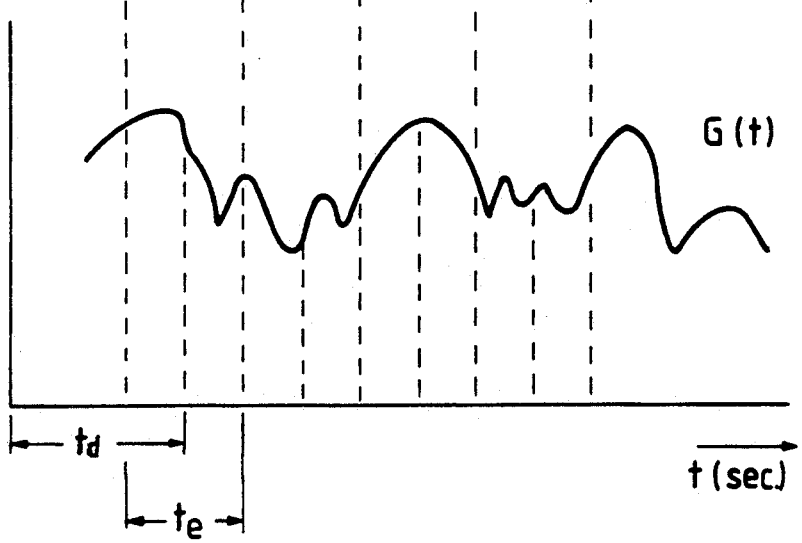

Thus, as shown in FIG. 6A (a), $f_i(t)$ is sampled at a time interval of $$[1/6000 + (1/6000)(i-1)/6000] \sec \quad (13)$$

In FIGS. 6A (a) and (b), $t_a = 1/6000$ sec $t_b (1/6000) \times (1/6000)$ sec $t_c = (1/6000) \times (5999/6000)$ sec $t_d = 1/6000 + (1/6000) \times (3000/6000)$ sec $t_e = 1/6000$ sec For a more detailed description, it will be assumed that the multiplexing degree n is 6000 and the length of a single frame is 1/6000 sec.

Figure 6B:
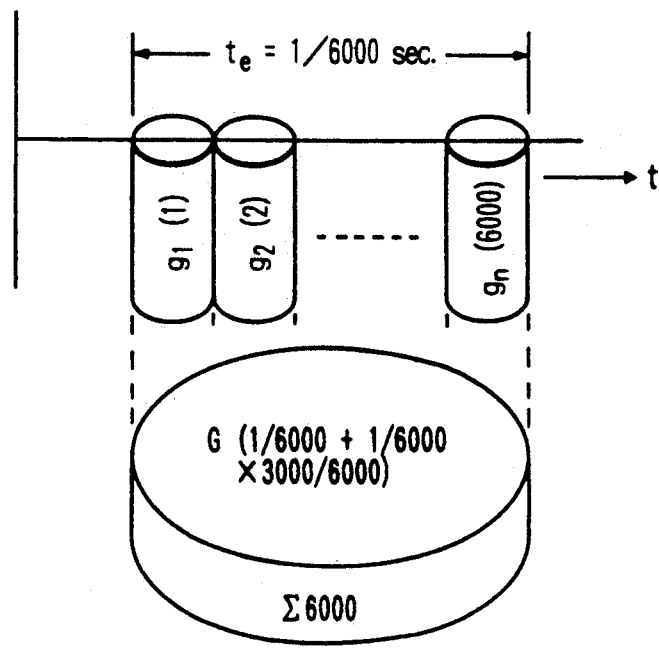
FIGS. 6B to 6D are diagrams showing the sampling of TCM signals.
Figure 6B:
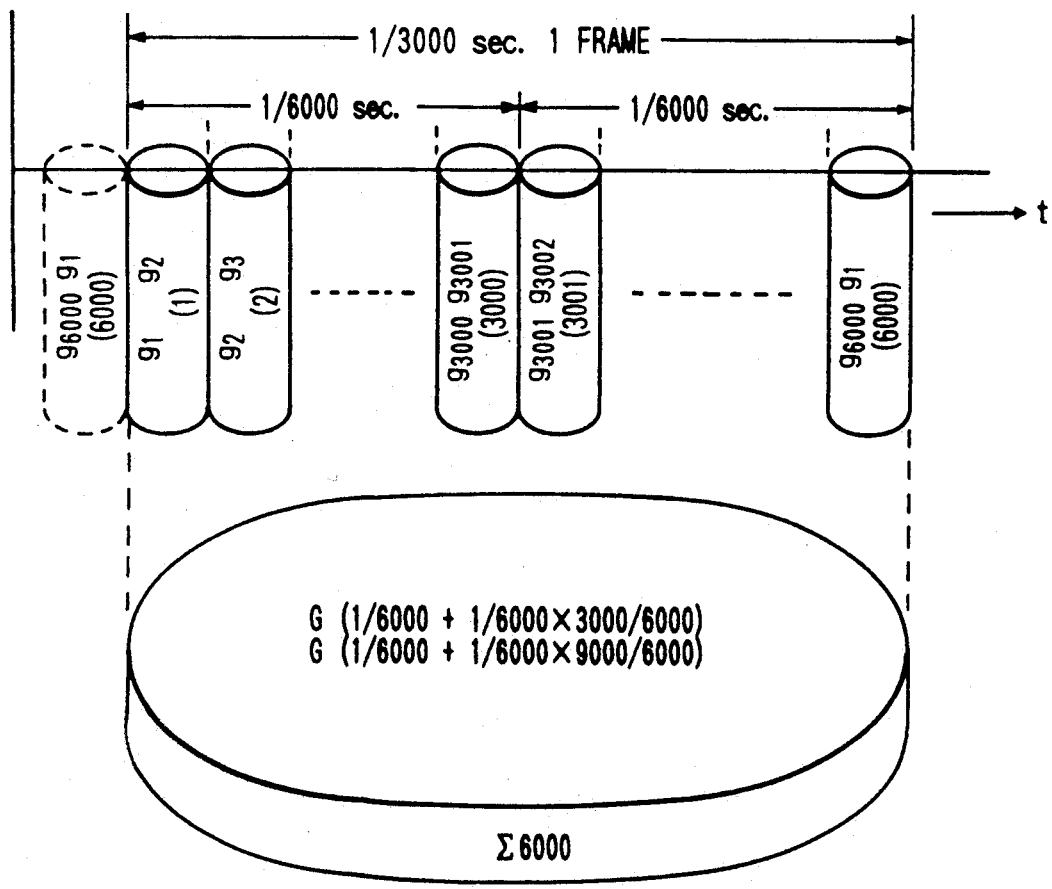

Let it now be assumed that 6000 small bags (each having a diameter of $1/6000 \times 1/6000$ sec) and a large bag (having a diameter of 1/6000 sec) such as shown in FIG. 6B (c) are arranged on the horizontal axis shown in FIG. 6A (a). Assuming that the above sample is represented by a match or matches, how these matches are accommodated, or loaded, in the respective bags will be analyzed.

The function $g_i(t)$ (i=1, 2, ..., n) has 6000 matches in one second, and since the matches are arranged equidistant in terms of time, each of the bags (1), (2), ..., (N) receives a match. This operation is repeated every frame. Specifically, Bag (1) receives $g_1(1/6000)$
Bag (2) receives $g_2(1/6000 + 1/6000 \times 1/6000)$
Bag (3) receives $g_3(1/6000 + 1/6000 \times 2/6000)$ Bag (6000) receives $g_{6000}(1/6000 + 1/6000 \times 5999/6000)$ It is assumed that the large bag ($\Sigma 6000$) receives matches, or samples of the mixed signal G(t). In this case, it is assumed that the sampling time is $1/6000 + 1/6000 \times 3000/6000$, i.e., a midpoint of a single frame. As a result, the large bag ($\Sigma 6000$) loads matches as many as $G(1/6000 + 1/6000 \times 3000/6000)$.

The sum of the matches in the bags (1) to (6000), which is $g_1(1/6000)$
$g_2(1/6000 + 1/6000 \times 1/6000),$
$\vdots$
$g_{6000}(1/6000 + 1/6000 \times 5999/6000)$ and the number of matches loaded in the large bag ($\Sigma 6000$), which is
$G(1/6000 + 1/6000 \times 3000/6000)$ will be compared as in the following equations (14) and (15).

$$\sum_{i=1}^{6000} g_i = g_1(1/6000) + \tag{14}$$
$$g_2(1/6000 + 1/6000 \times 1/6000) +$$
$$g_3(1/6000 + 1/6000 \times 2/6000) + \ldots +$$
$$g_i(1/6000 + 1/6000 \times (i-1)/6000) +$$
$$g_{6000}(1/6000 + 1/6000 \times 5999/6000)$$

$$G(1/6000 + 1/6000 \times 3000/6000) = \tag{15}$$
$$g_1(1/6000 + 1/6000 \times 3000/6000) +$$
$$g_2(1/6000 + 1/6000 \times 3000/6000) + \ldots +$$
$$g_n(1/6000 + 1/6000 \times 3000/6000)$$

As a result of the comparison of equation (14) with equation (15), if $$\sum_{i=1}^{6000} g_i = G(1/6000 + 1/6000 \times 6000/2) + \Delta \tag{16}$$

and if the average of the terms converges to 0 as $\Delta$ is sampled at an interval of 1/6000 sec, it means that the NSLA of an FDM signal is present in a TCM signal at the same value. This is because each of the 6000 bags arranged on the horizontal axis can be assumed to represent a time slot and their sum, a frame, while each match contained in the bag is assumed to represent a signal which is a TCM signal of the non-frequency-converted voice signals $g_1, g_2, \ldots, g_n$. And it is because these TCM signals are well mingled such as in the large bag ($\Sigma 6000$) shown in FIG. 6B (c) and thus can be deemed as a single FDM signal. Therefore, in this example, although it is a TCM signal, no particular time compression is necessary. Thus its time-compressing degree is 1.

In FIG. 6B (c), the position of each bag on the horizontal axis (time axis) is as follows.

Bag (1):   $1/6000 \leq t < 1/6000 + 1/6000 \times 1/6000$
Bag (2):   $1/6000 + 1/6000 \times 1/6000 \leq t < 1/6000 + 1/6000 \times 2/6000$
$\vdots$
Bag ($i$):   $1/6000 + 1/6000 \times (i-1)/6000 \leq t < 1/6000 + 1/6000 \times i/6000$
$\vdots$
Bag (6000):   $1/6000 + 1/6000 \times 5999/6000 \leq t < 1/6000 + 1/6000 \times 6000/6000$ The time for sampling each of the non-frequency-converted voice signals
$g_1(t), g_2(t), \ldots, g_i(t), \ldots, g_{6000}(t)$ is set as
$1/6000, \quad 1/6000 + 1/6000 \times 1/6000, \quad \ldots ,$
$1/6000 + 1/6000 \times (i-1)/6000, \quad \ldots ,$
$1/6000 + 1/6000 \times 5999/6000.$ As a result, each match is accommodated in a bag while in contact with the lateral surface of the bag, which is for reasons of convenience only. Should a match be accommodated in the middle of the bag, the time t of $g_i(t)$ may be selected as $$t = 1/6000 + 1/6000 \times (i + 0.5)/6000$$

Such a selection in no way alters the conclusion of this proof.

The corresponding terms in the right sides of equations (14) and (15) will now be compared.

$$\Delta_i = g_i(1/6000 + 1/6000 \times (i-1)/6000) - \tag{17}$$
$$g_i(1/6000 + 1/6000 \times 3000/6000)$$

What is meant by the above equation (17) is the difference in the size of a signal between times when a voice on channel i (CHi) is sampled, the times being
$(1/6000 + (i-1)/6000^2)$ sec; and
$(1/6000 + 3000/6000^2)$ sec.

This difference $\Delta_i$ is like an error in a random noise and could take any value, positive or negative, or even zero in some cases, although rare, on the channel CHi ($i = 1, 2, \ldots, n$). This difference varies from right to left around zero, possibly plotting a normal distribution.

The above sampling has been based on a certain time $t = t_0$. A next sampling is performed with a delay of 1/6000 sec. A still next sampling is performed with another delay of 1/6000 sec. Since the sampling is performed, e.g., 6000 times a second, its mean value in a second becomes $$\text{Mean } (\Sigma \Delta_i) = 1/6000 \sum_{i=1}^{6000} \Delta_i \to 0 \tag{18}$$

That is, the mean value approaches 0. This becomes clearer with a sampling over a longer period. It may be correct to say that the mean value in 10 seconds or 30 seconds will bring the solution of equation (18) to zero.

Hence, it has been demonstrated that the average powers of the FDM and TCM signals whose multiplexing degree (6000) is the same are identical. Now, the amplitude distributions of the above two types of multiplexed signals will be described.

Let it be assumed that a signal f (l) (l = 1, 2, 3, ...) applied to one telephone channel has the following mean value and variance.

Mean value   $E[f(l)] = 0$
Variance     $E[f(l)^2] = \sigma^2$

As is known well, the mean value and variance of an N-multiplexed FDM signal are as follows.
Its mean value is $$E\left[\sum_{i=1}^{N} f_i(n)\right] = 0$$

Its variance is $$E\left[\sum_{i=1}^{N} f_i(n)^2\right] = N\sigma^2$$

Thus, the mean value and variance of the mixed signal consisting of the signals expressed by the function $g_i(i=1, 2, \ldots, n)$, which are not arranged on the frequency axis as an FDM signal, can likewise be obtained as follows.

Its mean value is:

$$E\left[\sum_{i=1}^{N} g_i(n)\right] = 0$$

Its variance is:

$$E\left[\sum_{i=1}^{N} g_i(n)^2\right] = N\sigma^2$$

Then, the mean value and variance of a TCM signal which is to be applied to the invention will be calculated. In this case, a function $f_i(n+k)$ for expressing a voice signal is introduced on the basis of the following relationship.

$$f_i(n + k) = f_i(kN + n + i - 1)$$

Now, its mean value will be calculated.

$$E[f(n)] = \lim_{L\to\infty} 1/L \sum_{n=0}^{L-1} f(n)$$

To simplify the calculation,
$L = rN$
Then, $$E[f(n)] = \lim_{r\to\infty} (1/rN) \times \sum_{l=0}^{r-1} \sum_{i=1}^{N} f_i(l)$$

$$= \sum_{i=1}^{N} 1/N \lim_{r\to\infty} (1/r) \times \sum_{l=0}^{r-1} f_i(l)$$

$$= \sum_{i=1}^{N} (1/N) E[f_i(l)]$$

$$= E[f_i(l)]$$

$$= 0$$

Then, its variance will be calculated.

$$E[f(n)^2] = \lim_{L\to\infty} 1/L \sum_{n=0}^{L-1} f(n)^2$$

To simplify the calculation,
$L = rN$
Then, $$E[f(n)^2] = \lim_{r\to\infty} (1/rN) \times \sum_{l=0}^{r-1} \sum_{i=1}^{N} f_i(l)^2$$

$$= \sum_{i=1}^{N} 1/N \lim_{r\to\infty} (1/r) \times \sum_{l=0}^{r-1} f_i(l)^2$$

$$= \sum_{i=1}^{N} (1/N) E[f_i(l)^2]$$

$$= \sigma^2$$

From the above, it is clear that the variance has an amplitude distribution identical with that of a channel of voice signal.

In transmitting a TCM signal, it is likely, depending on the system parameter, that its peak value is so large as to increase its deviation in frequency modulation, thus causing interference with adjacent channels. In such a case, a circuit for compressing the value of $\sigma$ to $\sigma^{\frac{1}{2}}$ in advance, i.e., a compressor 171 capable of performing a $\frac{1}{2}$-compression ($\frac{1}{2}$ in decibel) must be inserted as shown in FIGS. 1D to 1F to compress the signal before being applied to the transmission section. And at the reception side, a circuit for expanding the signal, i.e., an expander 172, must be arranged as shown in FIGS. 1D to 1F to expand the signal before reproducing the original sound.

The above illustrates the fact that the NSLA obtained by FDM can likewise be obtained by TCM. However, in the above discussion it is assumed that, although the voice transmission frequencies applied to the multiplexed load gains cited from reference 3 are from 0.3 to 3.4 kHz, the same NSLAs can be obtained at voice transmission frequencies from 0.3 to 3.0 kHz specified by the Enforcement Regulation for Wireless Telegraphy Act of Japan. This assumption may be accepted with no practical errors.

With respect to TCM signals, time compression makes their frequency components higher in proportion to their compressing degree. It is only the frequency components that are changed as described above and their signal waveforms are only subjected to analogous conversion in such a manner that the waveforms are extended on the frequency axis. Thus, there is no change in their NSLAs. This will be proven strictly with mathematical formulas.

A TCM signal is expressed as follows using equations (5) and (6).

$$h_i(t) = \sum_{\omega_{pi} \geq 0.3 \text{ kHz}}^{3.0 \text{ kHz}} a_{pi} \sin(n\omega_{pi} + \beta_{pi}) \tag{19}$$

However, $lT \leq t \leq T/n + lT$.

$$h_i(t) = 0.$$

However, $1/n < lT < t < T + lT$, where $l = 1, 2, 3, \ldots$ and T is the time length of a single frame. Hence, all the time-compressed TCM signals are $$H(t) = \sum_{p=1}^{n} \left( \sum_{\omega_{pi}} a_{pi} \sin(n\omega_{pi} + \beta_{pi}) + \beta_{pi} \right) \times n^{\frac{1}{2}} \tag{20}$$

That the term "$n^{\frac{1}{2}}$" is multiplied in the right side of equation (20) is because the TCM signals are transmitted only within 1/n of the time length of a single frame. This is expressed in voltage (the value must be multiplied by n if expressed in power). The power in equation (20) for a time T within a single frame can be calculated as follows, in a manner similar to equations (7), (8).

$$T^{-1} \int_0^T H(t)^2 \, dt = n/T \sum_i^n \int_0^T g_i(nt)^2 \, dt \qquad (21)$$

$$= n/T \left[ T/n \sum g_p^2 \right]_0^T$$

$$= \left[ \sum_{p=1}^n g_p^2 \right]_0^T$$

$$= T^{-1} \int_0^T G(t)^2 \, dt$$

Thus, taking the time as a multiple of integer of a frame, it is understood that the powers of the signals H(t) and G(t) become $$H(t)^2 = G(t)^2 \qquad (22)$$

Now, NSLAs in the case where the frame length of a TCM signal with n-channels of voice signals multiplexed is shorter than $1/(2f_h)$ will be described.

In this case, it is easy to demonstrate that such a TCM signal has an NSLA equal to that of a similar FDM signal with n-channels of voice signals multiplexed.

Let it be assumed that the frame length is, e.g., 1/8000 sec. Then, voice signals $g_1(t), g_2(t), \ldots, g_n(t)$ are sampled at a frequency of 8000 Hz instead of 6000 Hz, while a mixed voice signal G(t) is also sampled at 8000 Hz, and these two examples are compared. The previous description can be applied similarly with the horizontal axes in FIGS. 6A (a), (b) and FIG. 6B (c) changed from 1/6000 to 1/8000.

Further, how the NSLA is changed if the frame length becomes longer than $1/(2f_h)$ will be described. The conclusion is that the NSLA is generally decreased. Its specific value will be calculated below with a frame length of 1/3000 sec and a multiplexing degree of 6000. The size of the bags arranged on the time axis is increased by the increase in frame length as shown in FIG. 6B (d). To be exact, the diameter of each bag is $1/6000 \times 1/3000$ sec. The sum of the diameters of all the n bags is 1/3000 sec. The diameter of the large bag (Σ6000) is 1/3000 sec.

Similarly, let it be assumed that matches sampled at a frequency of 1/6000 sec are loaded in respective bags. In this case, there will arise the following inconvenience if the matches are loaded in the bags in exactly the same manner as before with a frame length of 1/6000 sec. That is, there are only 3000 bags (1) to (3000) within 1/6000 sec as shown in FIG. 6B (d), while there are 6000 matches. As a result, each bag accommodates two matches. More specifically, as shown in FIG. 6B (d), the bag (1) accommodates matches (signal value) which designate the two voice signals $g_1(t)$ and $g_2(t)$; the bag (2), $g_2(t)$ and $g_3(t)$; the bag (3), $g_3(t)$ and $g_4(t)$; . . . k,m, and the bag (3000), $g_{3000}(t)$ and $g_{3001}(t)$. The voice signal $g_1(t)$ is accommodated in the bag (6000) which is in the preceding sampling time. In contrast thereto, none of the bags (3001) to (6000) accommodate any match sampled within this sampling time; each of them will accommodate two matches to be sampled within 1/6000 sec which is a next sampling time.

In the meantime, the large bag (Σ6000) will have two matches per frame. The two matches are G(1/6000 + 1/6000 × 3000/6000); and

G(1/6000 + 1/6000 × 9000/6000).

However, G(1/6000 + 1/6000 × 9000/6000) is similarly a match (signal) sampled within 1/6000 sec which is a next sampling time.

By the fact that two matches are accommodated in each of the bags (1) to (3000), it is meant that voice signals $g_i(t), g_{i+1}(t)$ are put in the respective time slots of a TCM signal while mixed every two channels. To achieve this operation technically, a 6000-channel TCM signal (2 (channel) × 3000 (time slots) = 6000 (CH)) must be prepared by means of 2-channel FDM. Then, this 6000-channel TCM signal and a single match in the preceding part of the large bag (Σ6000) are compared in a manner similar to that described before.

This is one of the techniques, but this does not produce a TCM signal in a strictly technical sense. Thus, to put only one voice signal in each time slot, the following technique must be taken. The 6000 voice signals are divided into two groups, one group being accommodated in the bags (1) to (3000) and the other group being accommodated in the bags (3001) to (6000).

This operation will be described with reference to FIG. 6D (f). There are two pairs of bags (1) to (6000) and a large bag (Σ6000). In FIG. 6D (f), the bags (1) to (6000) in the upper part contain matches $g_1, g_3, g_5, g_{5999}$, respectively, while the large bag (Σ6000) contains a single match $G_1(1/6000 + 1/6000 \times 3000/6000)$. On the other hand, the bags (1) to (6000) in the lower part contain matches $g_2, g_4, g, \ldots, g_{6000}$, while the large bag (Σ6000) contains a single match $G_2(1/6000 + 1/6000 \times 9000/6000)$.

According to FIG. 6D (f), there will be no case where two matches are mixed in a single bag. Thus, it is understood that the NSLA of an FDM signal (the multiplexing degree is 3000 in this case) is equal to that of a TCM signal from the same proof as in the previously described case with a frame length of 1/6000 sec.

The above description can be expressed mathematically as follows. The n voice signals (n = 6000 in this case) expressed in equation (4) are halved so that $$G_1(t) = g_1(t) + g_3(t) + \ldots g_{5999}(t) \qquad (4')$$

$$G_2(t) = g_4(t) + g_4(t) + \ldots g_{6000}(t) \qquad (4'')$$

What must be done now is to prove each of the above equations similarly; provided however, that it is, assumed that the sampling time is the same as described above.

It has so far been clarified that grouping is necessary to calculate the NSLA. Now, why signals must be compressed in a TCM signal will be described.

In FIG. 6D (f), each of the bags (1) to (6000) in the upper part and each of the bags (1) to (6000) in the lower part accommodate a match. However, there still is something unacceptable in deeming this as a TCM signal. That is, a group of bags in the upper part and that in the lower part proceed simultaneously timewise, thus still leaving each pair of $g_1$ and $g_2$, $g_3$ and $g_4$, . . . , or $g_{5999}$ and $g_{6000}$ coexisting to coexisting in each time slot of the TCM signal. It is signal compression that serves to remove this coexistence. The following technique is applied. With respect to the voice signals $g_1, g_3, \ldots, g_{5999}$, pairs of bags (1) and (3001), (2) and (3002), . . . (3000) and (6000) must be accommodated within the preceding bags (1), (2), . . . , (3000), while with respect to the voice signals $g_2, g_4, \ldots g_{6000}$, pairs of bags are similarly accommodated in the succeeding bags (3001), (3002), . . . (6000).

To implement this regrouping, the following synthetic signal must be prepared for, e.g., g:. Specifically, signals obtained by two adjacent sampling times must be summed. In technical terms, a voice signal is stored in a storage circuit and read while time-divided at a speed which is twice the original speed (a duty ratio of 50%), and a signal obtained by sampling this read signal at a cycle of 1/3000 sec will be a desired TCM signal. In this case, however, its original signal cannot be reproduced faithfully as long as the sampled value (in voltage) of the TCM signal which is the instantaneous value at the sampling time is used as it is. Thus, it is why a TCM signal must be transmitted with a predetermined time duration (time slot length).

The above operation has the following meaning in terms of NSLA.

If the frame length is longer than the sampling time interval, i.e., 1/6000 sec, it means that no NSLA can be obtained in 6000-channel FDM even with the multiplexing degree n being 6000. And if the frame length is 1/3000 sec, it means that an NSLA equivalent to that of a 3000-channel FDM signal is obtained.

Now, the NSLA of a TCM signal with a frame length of 1 sec and a multiplexing degree n of 6000 will be calculated.

Figure 6C:
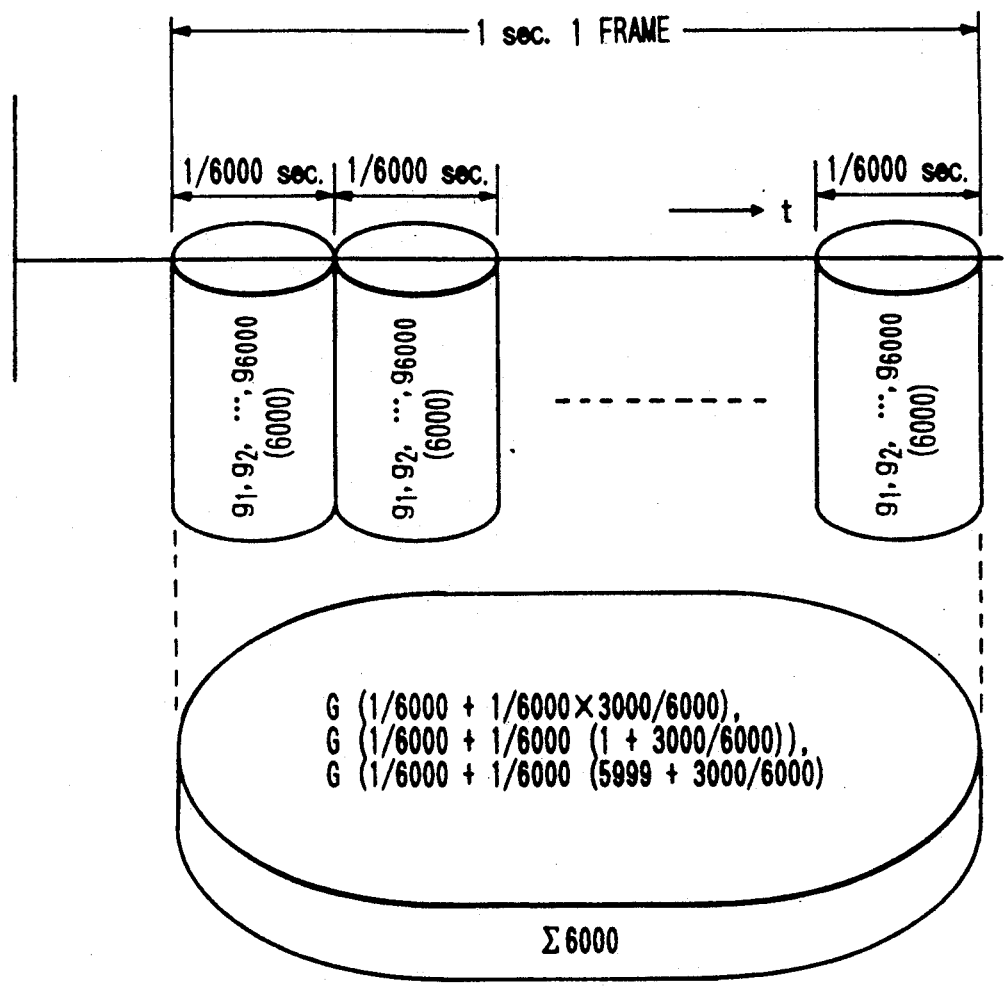
Figure 6D:
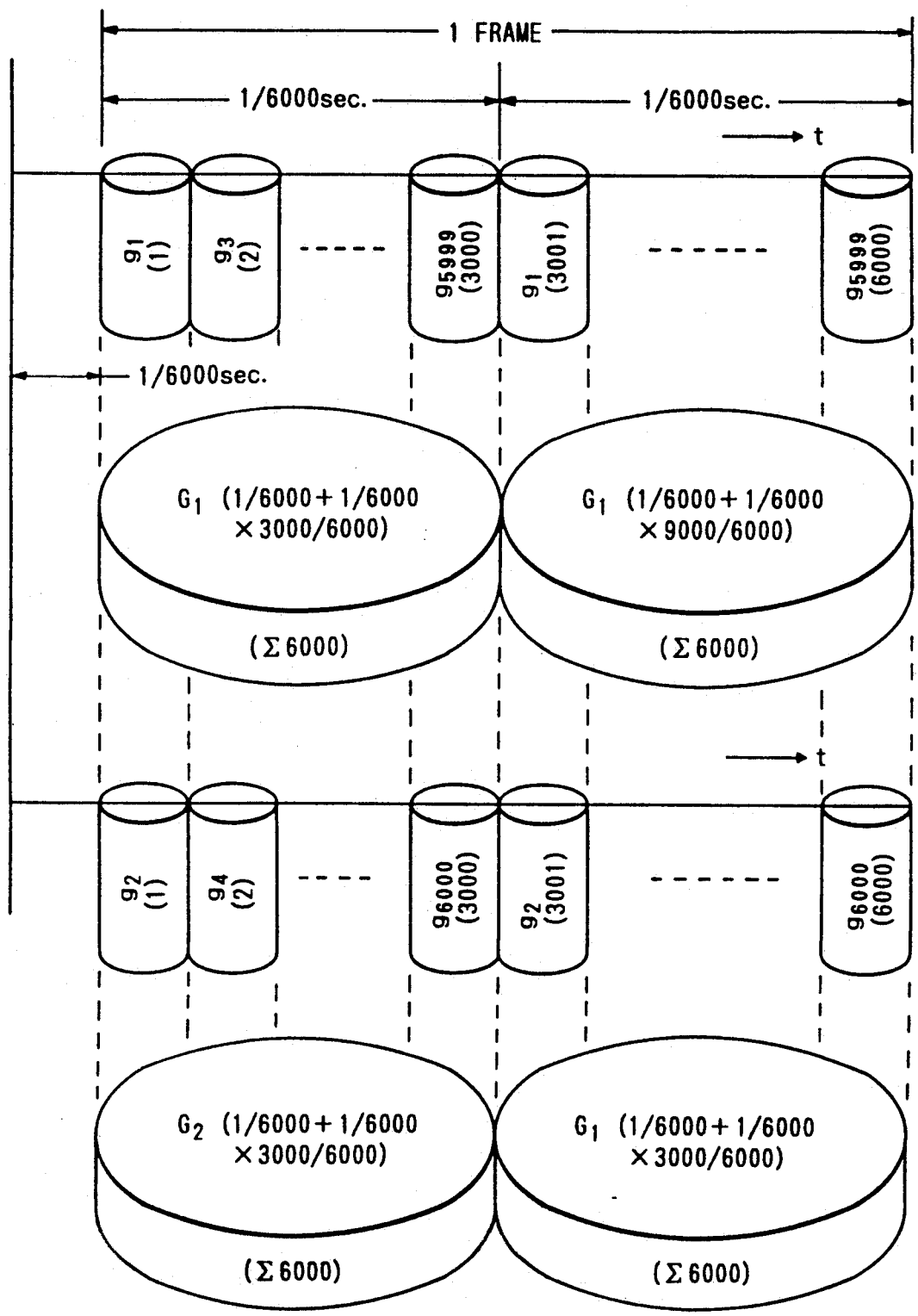

FIG. 6C (e) shows this example. Since the frame length is 1 sec and n is 6000 in FIG. 6C (e), there are 6000 bags, each with a diameter of 1/6000 sec, on the horizontal axis. These 6000 bags constitute a single frame. Let us now think about which bag accommodates each of the sampled matches $g_1(t), \ldots, g_{6000}(t)$. Taking the sampling time as a value equal to that in the previous example whose frame length is 1/6000 sec, each of the bags (1), (2), (3), . . . , (6000) accommodates a match, which designates a voice signal.

The large bag ($\Sigma 6000$) can accommodate 6000 matches which designate G(t) (having a value sampled every sampling time). This means that 6000 channels of voices are mixed and put in respective time slots of a TCM signal. Although it is FDM that can technically implement this, the FDM is not applicable to the TCM signal to which the invention is directed. Therefore, to put a single voice signal in a single time slot, 6000 voice signals must be divided into 6000 groups and put in a time slot by the group (on a channel basis in this example). This indicates that an NSLA of this example is 0, meaning that there is no gain at all. The compressing degree of the TCM signal is 6000.

It is indicated from the above description that the NSLA is decreased as the frame length becomes longer than the sampling time necessary for faithful reproduction of each voice signal. To express it in general form, if the frame length $t_e$ is greater than $1/(2f_h)$ and the multiplexing degree is n, then the NSLA becomes equal to that of an FDM signal having a multiplexing degree determined by a value $$n' = n \times 1/(2f_h t_e) \quad (23)$$

According to references 1 and 2, practically feasible ranges for the frame length $t_e$ and the multiplexing degree n are Frame length $t_e$: $0.1 \text{ sec} \geq t_e \geq 0.0005 \text{ sec}$
Multiplexing degree n: $3000 \geq n \geq 2$ It is apparent from the above example that equation (23) is always established as long as these parameters are within the above ranges.

To put a match in each bag as a TCM signal; in other words, to put an original voice signal in each bag when the frame length $t_e$ is longer than $\frac{1}{2}f_h$, the signal must be compressed. It has already been demonstrated that a compression rate $\psi$ can be given by the following equation.

$$\psi = t_e/(\tfrac{1}{2}f_h)$$

Figures 14, 15:
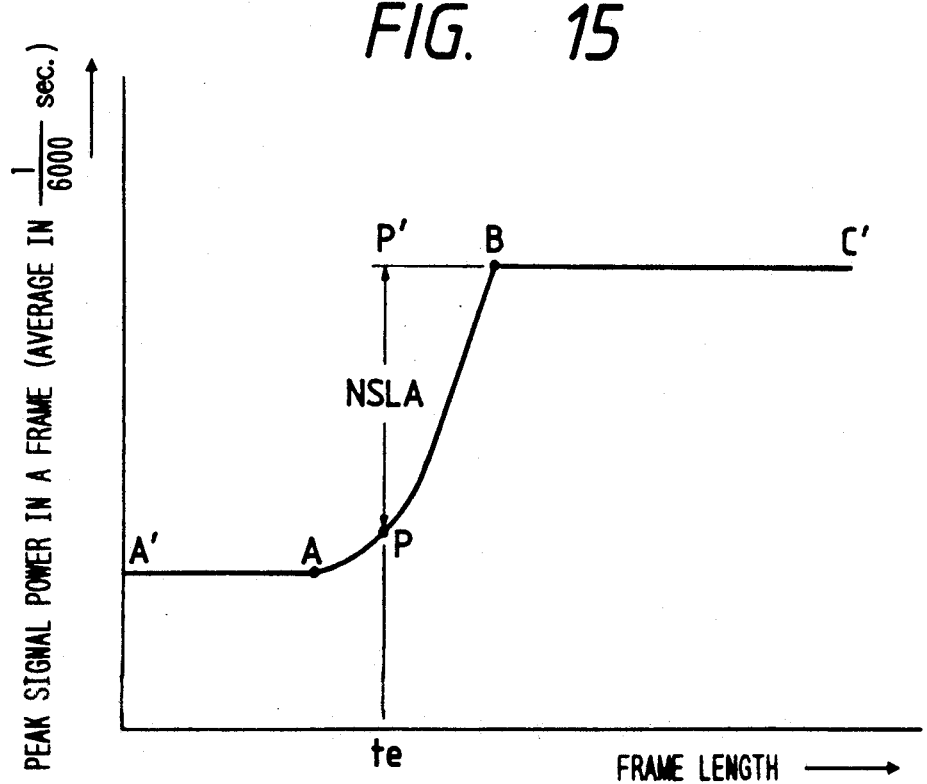

The meaning of the NSLA calculated from equation (23) is indicated in FIG. 15. How the peak power (averaged within 1/6000 sec) within the frame changes in terms the frame length of a TCM signal is presented in a polygonal line A'APBC' with the frame length being on the horizontal axis. Assuming that the frame length of the TCM signal is $t_e$ (the multiplexing degree being n), the peak power within the frame can be given by a point p. If a point at which the extension line of a segment C'B meets a perpendicular line drawn thereto is P', the NSLA can be expressed as line segment PP'. As is apparent from FIG. 15, the NSLA of a TCM signal becomes larger with a smaller $t_e$, but becomes constant with $t_e$ exceeding a predetermined value. Conversely, if $t_e$ becomes relatively large, there will be no gain at all. The critical point between the two is related to the multiplexing degree n, i.e., the number of time slots.

(4) NSLA of a TCM signal received by radio base station 30

The radio base station 30 receives TCM signals transmitted from a number of mobile radio units 100. Let us now think about the NSLA of a received radio wave. The conclusion is that it is acceptable for the mobile radio units 100 to transmit the TCM signals with high modulation factors, under the assumption that the NSLA of a TCM signal received from the mobile radio unit 100 is completely equal to that of a TCM signal transmitted from the radio base station 30 as will be described later.

However, if the compressor (group) 71 is employed as shown in FIGS. 1I to 1K at the radio base station 30, it is necessary to insert the compressor 171 before the radio transmission circuit 132 as shown in FIGS. 1D to 1F at the mobile radio unit 100.

Let it be assumed that a specific example has the following conditions. The frame length equals the sampling time which is 1/6000 sec and the multiplexing degree is 6000. The radio base station 30 is performing a simultaneous transmission using all the 6000 time slots within a single frame under carriers identical to those of the 6000 mobile radio units 100. The mobile radio units 100 are located equidistant along the circumference of a circle as viewed from the radio base station 30. A reception antenna of the radio base station 30 is nondirective, while a reception antenna of each mobile radio unit 100 is also nondirective. The transmission powers of the mobile radio units 100 are equal to one another, and the carriers used by the mobile radio units 100 for transmission are synchronous in phase. The radio wave propagation characteristics between each mobile radio unit 100 and the radio base station 30 are identical. Under the above assumption, the incoming signals to the radio base station 30 from the mobile radio units 100 are received in completely the same manner. Thus, the state of the received signals within the single frame may be thought of as being completely identical with that of the signals transmitted from the radio base station 30. Looking at it from the other end of the spectrum, what is indicated here is that it is acceptable for a mobile radio unit 100 to transmit a signal with such a high modulation factor as to allow an NSLA for a multiplexing degree of 6000 to be obtained, under the assumption that an NSLA would still be obtainable despite the fact that it is only one voice channel that is being transmitted from the mobile radio unit 100 in a time slot allotted to itself.

What has been presented in the above is an ideal condition. Let us now translate the above condition into a practical condition. The mobile radio units 100 are randomly scattered. Their radio wave propagation characteristics are erratic, and so is the reception power at the radio base station 30 on a time slot basis. The carriers from the mobile radio units 100 are not always in phase-synchronous. Thus, if a time slot with a high reception level has a high modulation factor, it is likely that time slots adjacent to this time slot will be adversely affected by a transmission in which radio waves are multiplexed. However, such a likelihood can be reduced by increasing a guard time or the like.

In small-zone systems, the transmission wave of a mobile radio unit 100 is less likely to cause interference with the radio base station 30 of a different location as co-channel interference. Thus, in such a case, the NSLA may be utilized to reduce the number of repetitive zones. It is because the utilization of an NSLA as FM (PM) and the application of a high modulation factor provide a wide band gain, which contributes to increasing the resistance against the co-channel interference.

It is now apparent from the above description that system design can be based on the assumption that the NSLA obtained when signals are transmitted from the mobile radio unit 100 to the radio base station 30 is substantially completely equal to that obtained when the signals are transmitted from the radio base station 30 to the mobile radio unit 100.

(5) Specific utilization of NSLA

An exemplary utilization of an NSLA will be described while calculating the NSLA with the frame length being 1 msec and the TCM (time-division time-compressed multiplexing) degree being 500.

First, a signal to noise ratio (S/N) of an SCPC (single channel per carrier; one telephone channel signal is modulated in one carrier) analog FM signal is obtained and compared with that of a TCM signal. Assuming that the level (voltage) of an input signal to the receiver is C; the FM modulation index is $m_f$; the noise level (voltage) per unit frequency is $F_a$; and the highest modulation frequency $f_a$ of a modulated wave is equal to $F_a$, then S/N is given by the following equation.

$$S/N = 3^{\frac{1}{2}} m_f C (2F_a)^{-\frac{1}{2}} \tag{24}$$

This equation is cited from a reference titled "FM Radio Engineering" by Sugawara, Nikkan Kogyo Shinbun-sha, 1959, p. 401 (13.25).

Then, S/N at the time a TCM signal with a multiplexing degree Q is frequency-modulated under the conditions indicated below can be given by the following equation.

$$(S/N)_{TCM} = 3^{\frac{1}{2}} m_{fQ} C_Q (2F_{aQ})^{-\frac{1}{2}} \tag{25}$$

However, $$F_{aQ} = QF_a \tag{25'}$$
$$m_{fQ} = Q m_f$$

$$n_Q = Qn$$

Since the TCM signal has the frequency of its original signal multiplied by Q, not only the bandwidth of a low-frequency amplifier is multiplied by Q, but also the modulation factor (modulation index) is multiplied by Q. This is why it is appropriate to provide equations (25') as such.

Then, such a level $C_Q$ of the received TCM signal as to allow the S/Ns in the left sides of equations (23) and (24) to be equal will be calculated using the following equation.

$$3^{\frac{1}{2}} m_f C (2F_a)^{-\frac{1}{2}} = 3^{\frac{1}{2}} m_{fQ} C_Q (2F_{aQ})^{-\frac{1}{2}} \tag{26}$$

From equation (26), $$C_Q = Q^{\frac{1}{2}} C \tag{27}$$

can be obtained. This means that a reception level multiplied by $Q^{\frac{1}{2}}$ in terms of voltage and by Q in terms of power is required. Therefore, a transmission power which is Q times that of the SCPC signal is required.

Then, an NSLA of this exemplary TCM signal will be calculated.

As described in section (3), the multiplexing degree in FDM terms in this example is $$n' = 500 \times 1/6000 \text{ (sec)} \div (1/1000 \text{ (sec)})$$
$$= 500 \times 1/6 = 83 \, CH$$

Thus, it is understood from FIG. 13 that the NSLA is a mean value between 28.6dB for 60-channel (60-communication-line) multiplexing and 32.6dB for 120-channel multiplexing.

Figure 12:
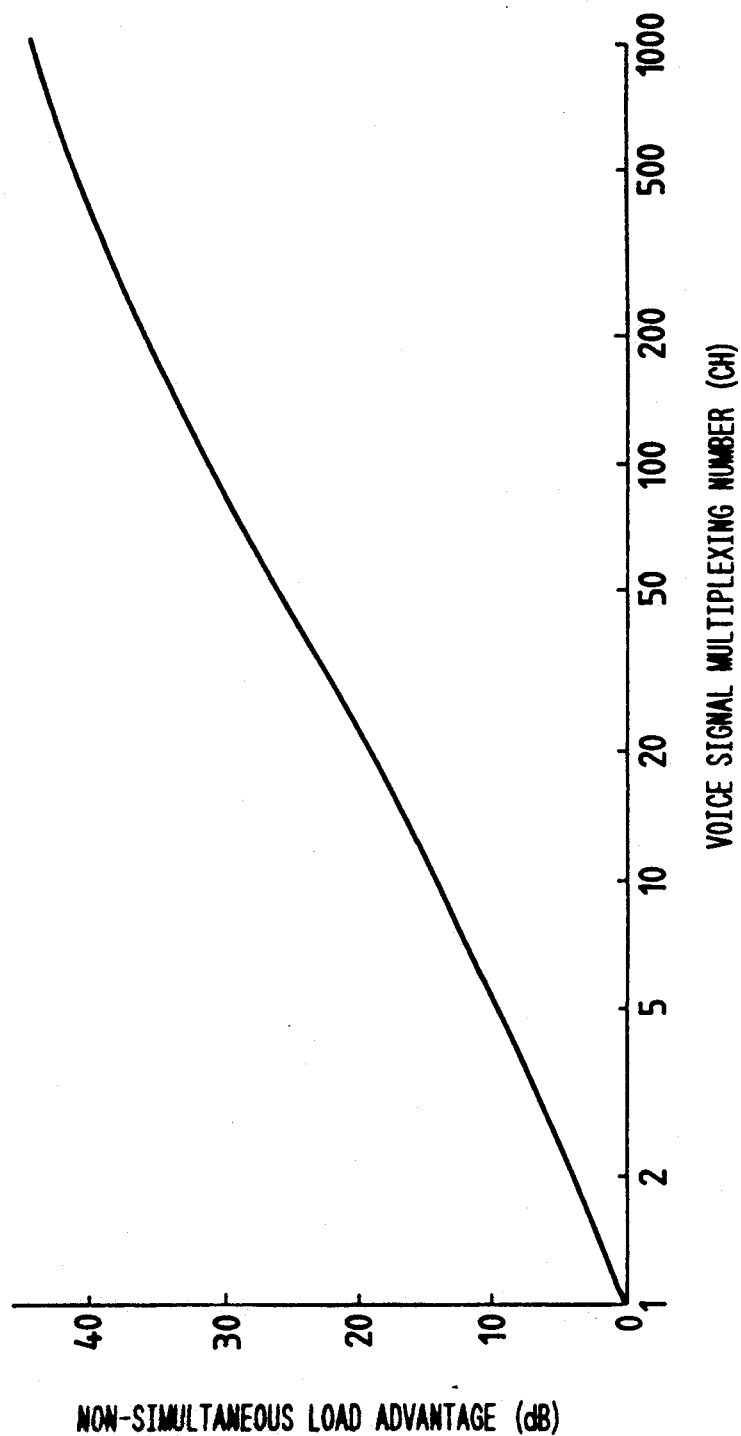
FIG. 12 is a diagram showing the relationship between the NSLA of a TCM signal and the degree of multiplexing voice signals.

Preparing a graph shown in FIG. 12 based on the diagram shown in FIG. 13 and interpolating from the graph, an NSLA of 30dB is obtained. Thus, this NSLA should be utilized to increase the modulation factor (deviation) and to decrease transmission power. Assuming that the transmission output of a non-TCM SCPC signal, i.e., 1-channel analog FM signal, is 10 mW, which is a cordless telephone output level, the required transmission power can be calculated from equation (27) by multiplying the above output level by 500 and then subtracting the NSLA from the multiplied value.

$$10 \log (10nW \times 500) - 30dB = 7dBm \tag{28}$$

That is, a transmission power of 5.0 mW can be obtained. This means that TCM signals require smaller power in transmission.

The physical meaning of the NSLA in TCM signals will be described with some points to be noted when applying it to systems.

It has already been indicated that no NSLA is obtained at all when the frame length of a TCM signal is 1 sec or more (with a multiplexing degree of 6000). In such a case, the frequency modulation index of the TCM signal is a value specified by the system. For example, if the frequency modulation index of an original signal (0.3 to 3.0 kHz) is 1.75 kHz (when 1-kHz tone signal is subjected to standard deviation), then the frequency band at the time this original signal is subjected to 500-channel TCM ranges from 150 to 1500 kHz and its standard deviation becomes 875 kHz (when a 500- kHz tone signal is subjected to standard modulation). However, when the frame length is 1 msec, 30dB can be obtained as an NSLA as described above, and this NSLA has been utilized to increase the modulation factor. Now, the modulated waves will be described.

Let us take a case of "full loading"; i.e., telephone signals are carried in all the time slots. Since the NSLA is a value obtained by subtracting about +8dB as the relative power of a sine wave whose peak value is equal, it is understood from FIG. 14 that the contribution of 30dB to the increase in deviation is tantamount to the deviation obtained at the time a TCM signal having an arbitrary frame length uses only a single time slot.

Then, let us take another case where the loading in time slots is reduced.

A reduction in loaded channels will naturally decrease the NSLA. For example, in case of 250-channel loading, which is half the 500-channel loading, its NSLA is obtained as follows from equation (23).

$$n' = 250 \times 1/6000 \div (1/1000)$$
$$= 250 \times 1/6 = 42 \, (CH)$$

Therefore, it is understood from FIG. 12 that the NSLA is 24.5dB. However, since the load has been halved, the power of the modulated signal is decreased by 3dB. Hence, an equivalent NSLA becomes 27.5dB. This is an increase in the effective TCM-FM modulation factor, but its increase is so slight that no substantial positive contribution could be made to the system operation.

Now, let us take still another case where a single channel is loaded in a single time slot. The NSLA for a single channel is 0dB. This is a reduction of 27dB, or 1/500 the NSLA of the full loading. Thus, its nominal NSLA is 27dB, and the application of 30dB in lieu of 27dB to a modulator would produce no substantial effects to the system operation. In effect, an IDC (instantaneous deviation control) circuit is disposed at the input of a modulation circuit of an actual radio unit so that the modulation factor can be maintained within a prescribed value. Thus, in terms of the modulator output, the effective deviation is maintained below a predetermined value independently of TCM telephone signal loading conditions.

It has been made clear from the above that the transmission power can be reduced to a remarkable degree by utilizing the NSLA of a TCM signal to increase the deviation of an FM signal. It goes without saying that this can be a tremendous contribution to power-saving. That is, if a radio unit whose continuous SCPC transmission power is 10mW is operated at a time factor of 1/500, or 0.2%, then its output becomes 5mW, which is half 10mW. Thus, its contribution to power-saving is obvious.

Now, the advantageous of the invention will be described with reference to FIG. 7, in which system characteristics are compared on the condition that the currently used frequencies for cordless telephone transmission in Japan are applied to them.

FIG. 7 shows the various characteristics of different systems including TCM systems, a cordless telephone, and an FDM system for comparison. Reference characters used therein designate the following.

$f_c$ ... carrier frequency
$N_{CH}$ ... required number of radio channels
n ... number of allowable communications
$N_{s \, max}$ ... maximum number of communications as a system
$f_W$ ... frequency band of a modulated signal
$V_{qm}$ ... maximum voltage at modulator input means (averaged within 1/6000 sec)
q' ... NSLA (assumed from FIG. 10)
$V_{qm}$ ... maximum voltage at modulator input means when an NSLA is applied thereto (averaged within 1/6000 sec)
$M_d$ ... modulation factor (standard modulation)
$P_T$ ... transmission power
$A_s$ ... service area (distance from radio base station)
$t_e$ ... length of a single frame
$N_{TS}$ ... number of time slots per frame
n' ... multiplexing degree in FDM terms (calculated from equation (23))

With respect to the TCM systems 1A, 1B, 2, 3 shown in FIG. 7, the maximum number of communications as a system $N_{s \, max}$ is 148, i.e., a maximum of 148 channels (CH) can be multiplexed in cordless telephone transmission. This value has been derived from reference 1 under the condition that $$12.5 \, kHz \times 89 \, CH = 1112.5 \, kHz$$

which is a frequency band given to one of the two stations involved in a cordless telephone communication is used by a single-carrier TCM-FM signal. The frequency band $f_w$ of a modulated signal in the FDM system shown in FIG. 7 was calculated as being 444 kHz for comparison. Although the NSLA q' of the TCM system 1B is 0dB when calculated from equation (23), the value in parentheses was presented for a comparison with the TCM system 2.

Now, the NSLA of a TCM signal whose multiplexing degree (the number of time slots $N_{TS}$ per frame) is 148 and whose frame length $t_e$ is 1 msec in the TCM system 2 shown in FIG. 7 will be calculated. Since the above multiplexing degree in FDM terms is 24.6 CH as shown by equation (23), it is found from FIG. 13 that the NSLA to be calculated is a mean value between 28.6dB for 60-channel multiplexing and 32.6dB for 120-channel multiplexing.

Assuming from FIG. 12, the NSLA is 21dB. Thus, 21dB will be used to increase the modulation factor (deviation) $M_d$ and reduce the transmission power $P_T$. If the transmission output of a non-TCM SCPC signal, i.e., a-channel analog FM signal, is 10mW which is the output level of a cordless telephone signal, the required transmission power can be obtained from equation (27) while multiplying 10mW by 48 and subtracting the NSLA from that product. That is, $$10 \log (10mW \times 148) - 21dB = 11.7dBm$$

The transmission time of the TCM signal has a time factor of 1/148, thus reducing the transmission power to a level commensurate with the time factor. For systems in which the compressors 71, 171 with a compressing degree of about ½ are disposed at the input of the transmitter to suppress the peak output, details will be described in section (8).

Since the TCM systems shown in FIG. 7 cannot provide any such large NSLA q' as that of the FDM system, they are inferior to the FDM system in terms of contribution to reduction in transmission power $P_T$. However, turning our attention to the mobile radio system 100 which implements intermittent transmission using time slots, such mobile radio system 100 could contribute, with its average transmission power, to the reduction in transmission power as much as the FDM system does. In addition, in view of the fact that TCM system-based mobile radio units 100 are extremely simple and inexpensive in hardware configuration compared with FDM system-based mobile radio units, it is clear that the TCM systems are superior in frequency utilization efficiency and economization to currently used cordless telephone and FDM systems.

In the TCM systems, the shorter the frame length $t_e$ is, the larger the NSLA becomes. However, the frame length $t_e$ cannot be shortened infinitely, because a voice signal with a short frame length $t_e$ cannot be sampled at a small sampling cycle, thereby making it difficult to reproduce the original sound faithfully. A practically preferable frame length $t_e$ is about 1 to 5 msec.

(6) Physical meaning of NSLA in a TCM signal and some points to be noted

Let us now examine the TCM systems shown in FIG. 7 again. As shown in FIG. 8 (a), the system 1A has a 1-second long voice signal compressed by 1/148 and loaded in each time slot S, and the thus compressed voice signals are frequency-modulated, and transmitted on air, while the system 2 shown in FIG. 8 (b) has a 1/1000-second long voice signal multiplied by 1/148, and the thus multiplied voice signals are frequency-modulated and transmitted on air. In this conjunction, the reasons why the modulation factors $M_d$ are different between the systems 1A and 2 will be examined physically. The system 1A must maintain an Md of 1.75 rad rms as is the case with the cordless telephone while the system 2 may have an Md which is 21dB higher than that.

Let us compare the systems 1B and 2, on the condition that the system 1B has the transmission power $P_T$ of the system 1A reduced by 21dB from the value shown in FIG. 7 and its modulation factor $M_d$ multiplied by 11.2 (21dB); provided however, that it is assumed that neither systems 1B nor 2 use the IDC circuit, the compressor 171, and the expander 172. As long as no effects of their multiplexed radio propagation characteristics on communications are taken into account but other due considerations are given to design parameters, the reception quality in both systems should be identical when signals are received from their counterparts (radio base stations 30).

Their effects on adjacent radio channels will be examined next. The system 1B often transmits a voice signal "a" at a large level for one full second. Such a voice signal is subjected to TCM, modulated with a deviation which is, e.g., 11.2 times the value 1.75rad rms for as short as 1/148 sec, and transmitted on air thereafter. Even if a reduction in transmission power of 11.7mW is obtained as a result of the above processing, such a reduction in transmission power is not enough to eliminate critical interference with adjacent channels or other communications. Now, the reasons why the critical interference is caused will be verified.

The difference in transmission power between the systems 1B and 2 must be examined quantitatively. To do this, the signal powers within a predetermined time interval must be compared in both systems 1B and 2. However, from the understanding that setting of too long a time is useless for the comparison, a 1/148 sec has been selected. Since the high-level signal (voltage $V_m \times 1$ sec) lasts 1/148 sec in the system 1B, the total power $E_1$ becomes $$E_1 = \tfrac{1}{2} V_m^2 \times 1/148 \tag{29}$$

It should be noted, when comparing with the system 2, that this value $V_m$ is equivalent to that in the case where each of the time slots S1 to S148 within a single frame in the system 2 has a peak voltage. (However, this voltage will be a restriction as will be described later.)

With respect to the system 2, how many high-level signals, middle- or low-level signals there are in the 148-multiplexed signals will be calculated. That is, if the voltage in each time slot is $V_i$, the total power $E_2$ becomes $$E_2 = \tfrac{1}{2} \Sigma V_i^2 \times 1/148 \tag{30}$$

The total power $E_2$ can roughly be estimated from the value shown in FIG. 11. Since the total power $E_2$ should not be considered as being +9dB but considered as 15dB in this case, the ratio r between $E_1$ and $E_2$ in equations (29) and (30) is calculated as follows.

$$r = 20 \log 148 - 0.15 = 28 dB \tag{31}$$

From the above calculation, the power of the signal to be inputted to the modulator in the system 1B within the predetermined time 1/148 sec is 28dB higher than that in the system 2, accounting for fact that the modulated wave undergoes a large deviation (modulation factor) and that its power is likely to interfere with adjacent channels. In effect, this difference, 28dB, must, in strict terms, equal an NSLA of 21dB, because it is the difference in NSLA between a 1-channel voice signal and a 148-channel (24.6 channels in FDM terms) voice signal if the time and peak power under comparison have been selected properly.

The above result will be described in more detail. In the system 1B, the high-level voice signal is stored for as long as 1 sec, time-compressed, and then transmitted on air within 1/148 sec as an FM signal. In the system 2, the high-level voice signal is stored for as short as 1/1000 sec, time-compressed at a compressing degree of 1/148, and the signals in other 137 time slots within the frame are subjected to similar processing, time-serially arranged as high-level voice signals, middle-level voice signals, and almost soundless voice signals, and transmitted on air as FM signals.

As a result, the levels of modulator input signals within the frame in the system 2, and the deviation (modulation factor $M_d$) are lower by the NSLA (21dB) compared with those in the system 1B. Hence, the interference with the adjacent channels is reduced commensurate with the reduction in deviation. Of course, it is obvious that the deviation of the system 1B is harmless as long as the voice signal in a time slot is soundless. However, the system 2, whose frame length is shorter, has a constant low average power per frame, while the system 1B has an erratic average power, and this is a problem.

(7) Measures to peak deviation of TCM-FM signal

It has so far been demonstrated that when the NSLA of a TCM system is used to increase the deviation, the transmission power can be saved significantly. Now, measures to the peak deviation will be described. Although it is less likely timewise, there is no denying that peak deviations may occur and interfere with adjacent channels.

One measure is, as applied to general mobile communications, to dispose an IDC (instantaneous deviation control) circuit at the input of a modulation circuit of a radio system in attempts to maintain its modulation factor within a predetermined value. The use of this circuit allows the maximum deviation to be confined within a predetermined value at the modulation output, independently of the state of TCM telephone signals.

As another measure, expertise on microwave analog systems (1800-channel FDM and the like) will be of reference. The microwave analog systems prevent interference with adjacent channels by providing a bandpass filter at the transmitter output (antenna power supply line input) so that high-frequency waves of FM signals can be removed. The same technique may be applied to TCM-FM signals.

(8) Techniques for increasing NSLA by means of compander when a TCM signal has a frame length longer than 1/6000 sec The frame length of a TCM signal, relevant to the multiplexing degree and the time-division length, is an important system parameter. Since the mobile radio system is likely to cause interference with adjacent channels when its frame length is short as described in reference 2, the frame length cannot be set to too small a value. In a time-division process of a voice signal, too short a frame length (e.g., 0.1 msec) impairs not only transmission efficiency but also frequency utilization efficiency with its reduced size which is equal to that of overlap signals interposing the frame. Hence, the preferable frame lengths are from 0.001 to 0.01 sec. However, if attention is given to the above circumstances, then the frame length of a TCM signal becomes longer than the sampling time (1/6000 sec), thereby decreasing its NSLA as already described. Now, some techniques for not reducing NSLAs will be described.

The average powers of an FDM signal and a TCM signal, whose multiplexing degrees are the same, will be examined once again. If their telephone signals come from the same source, the FDM and TCM signals are measured by a predetermined time length and their average powers must be equal to each other. Although it is clear that, in the case of the FDM signal, an average power based on an extremely short time length can be deemed identical with an average power based on a comparatively long time length, e.g., 1/6000 sec (averaging of powers over a particularly specified time length is not necessary), in the case of the TCM signal, averaging of powers in a single frame is necessary. Although the average power of the TCM signal is the same as that of the FDM signal as long as the frame length is 1/6000 sec or smaller, an average power obtained with the frame length being above 1/6000 sec can no longer be applied directly to the calculation of NSLAs.

It is natural that the average power of a TCM signal per frame should equal that of an FDM signal no matter how long its frame length may be, as long as no consideration is given to NSLAs. However, from the NSLA viewpoint, if its frame length is longer than 1/6000 sec, the average power must be obtained by dividing the frame into subframes every 1/6000 sec and calculating an average power for the respective subframes. And the largest of these calculated average powers is the average power that is sought and has affected the calculation of NSLAs.

Therefore, if the average powers of the TCM signals thus divided every 1/6000 sec are maintained within a low value by some means so that an NSLA is larger than the multiplexing degree in terms of FDM, or more exactly, an NSLA is equal to the multiplexing degree before such division, then the average power, which is the largest of such average powers of the TCM signals, may be deemed substantially equal to that of the FDM signal. As a result, the telephone signals, which are the original signals for preparing the TCM signals, are subjected to a process by a conversion circuit to get ready for a next process. This conversion circuit is a circuit for decreasing the average power from an original level to a level with which an NSLA can be obtained, although compression of the amplitude distribution is unavoidable during such a process. This circuit will be described using specific system parameters.

It will be described with reference to an example shown in FIG. 6D. A 6000-multiplexed TCM signal with a frame length of 1/3000 sec is considered as a 3000-channel signal in terms of FDM when compared with a 6000-multiplexed TCM signal with a frame length of 1/6000 sec. Each of such 3000-multiplexed TCM signals is now subjected to a level conversion so that its average power measured every 1/6000 sec can be deemed equal to that of the 6000-multiplexed TCM signal. Required reductions will be calculated with reference to FIG. 10.

FIG. 10 shows NSLAs, which are in correspondence with multiplexing degrees in FDM terms n, at the time the frame length of the TCM signal is varied from 1/6000 sec to 1 sec with its multiplexing degree n being constant. The multiplexing degree in FDM terms n' is obtained from equation (23).

Symbols used in FIG. 10 are as follows.
n: multiplexing degree;
X: NSLA of an FDM signal whose multiplexing degree is the same as that of a TCM signal;
$T_e$: frame length of the TCM signal
n': multiplexing degree in FDM terms obtained from equation (23);
Y: NSLA in FDM terms;
X-Y: equivalent NSLA obtained by a compressor; and
1/(X-Y): compressing degree by the compressor:

From FIG. 10, NSLAs Y of TCM signals whose multiplexing degrees in FDM terms n' are 6000 and 3000 are 52.7dB and 49.7dB, respectively. Thus, a required reduction in the average power is 3dB as calculated below.

$$X - Y = 52.7 - 49.7 = 3$$

To obtain this 3dB equivalent NSLA X-Y, it not necessary to apply a 3dB level conversion (suppression) simultaneously to both subframes obtained by halving a single TCM signal frame. Nor is it required to level-convert all the signals loaded in the time slots in one of the subframes which is to be subjected to level conversion. It suffices that only a small number of time slots whose voltages are high should be level-converted. Thus, the time factor for level conversion (suppression) will be a small value. The level of a portion indicating the peak value of a TCM signal loaded in a time slot may in some cases be suppressed by 3dB or greater.

In actual systems, a suppression level sufficient for this TCM signal is about 2dB. As will be described later, it is quite acceptable to operate the systems under the assumption that this TCM signal has the value 52.7dB which is equal to the NSLA Y of the FDM signal whose multiplexing degree in FDM terms n' is 6000 as shown in FIG. 10.

An actual level-conversion circuit will now be described. This is a circuit generally known as a compressor, which is employed in the transmitter for mobile radio communications. As a counterpart, the receiver has an expander. Both the compressor and the expander are collectively called a compander.

The compander is a name given to a pair of a compressor and an expander. A compander used in analog voice communications is called a syllabic compander, which is used extensively nowadays as circuits for operating in correspondence with the envelop level of a voice signal.

In mobile radio communications, their reception level generally fluctuates greatly from 20 to 30dB due to phasing, and their reception S/N is thus impaired greatly compared with the case where there is no phasing. This allows various noise components to be introduced into the communications even if the reception level is relatively high, hence causing unpleasant noises. Noises include thermal noise, clicking noise, and random FM noise. The clicking noise is particularly disturbing during the absence of speech and is a major cause for significantly devaluating the phoneme articulation even if due considerations are given in the design of line circuits to ensure the proper articulation. The compander increases a voice level and improves the S/N during speech in the radio zone, and also remarkably suppresses noises caused in the radio system during nonspeech, thereby serving as a very reliable means for improving the quality of speech.

The invention employs companders analogous to the above to compress the peak value of a TCM signal. The specific configurations and operations of exemplary systems using companders will now be described.

FIGS. 1D and 1I show exemplary systems in which companders are applied to the mobile radio unit 100 and the radio base station 30. In FIG. 1I, the compressor 71 is interposed between the signal allotting circuit group 52 and the radio transmission circuit 32. The compressor 71 compresses the amplitude of a TCM signal. An exemplary compression characteristic is shown in FIG. 9A.

Figure 9A:
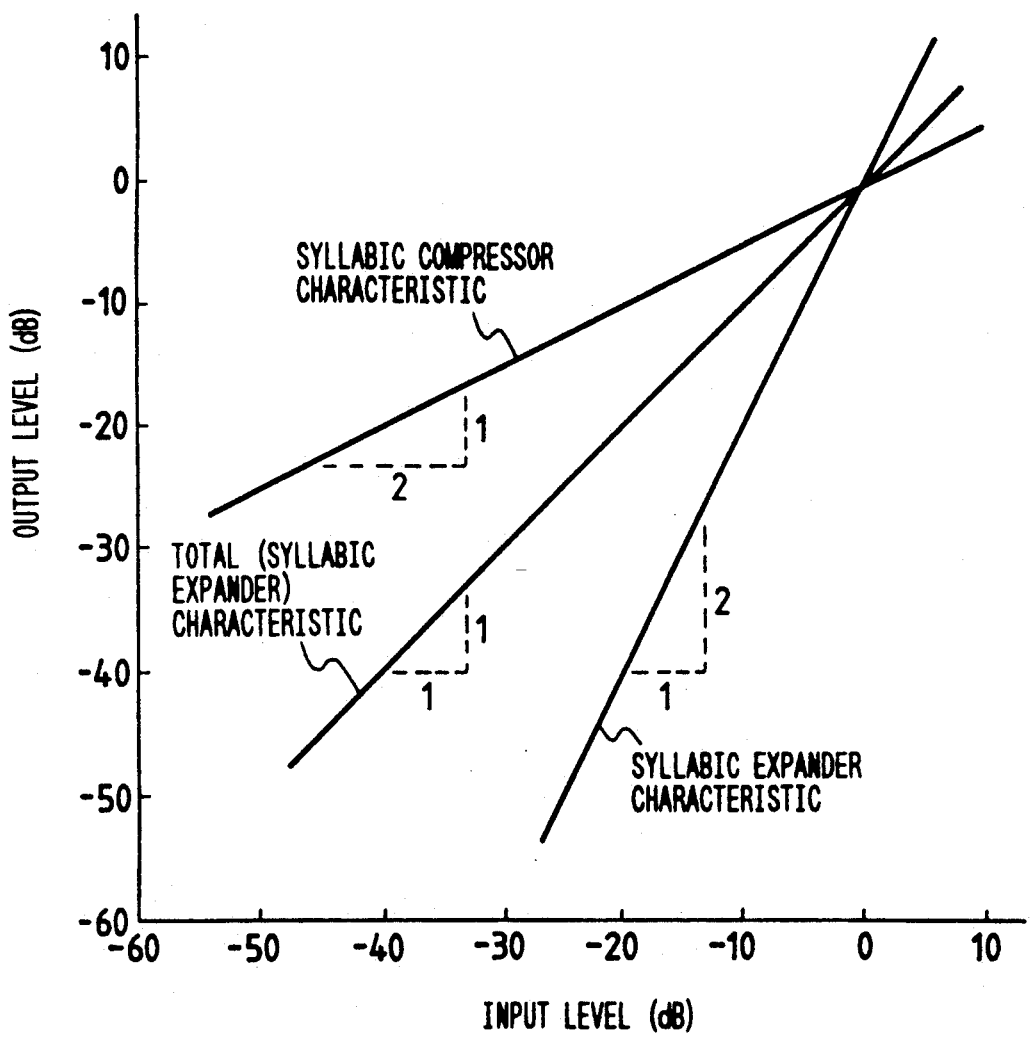

Since the compression characteristic shown in FIG. 9A is such that an output signal $n^{\frac{1}{2}}$ is generated with respect to an input signal n, it is called $\frac{1}{2}$ compression. That is, a change of 10dB in the input level causes a change of 5dB in the output level. Thus, the voice signal has its amplitude distribution halved in decibel, and when this voice signal is fed to the radio transmission circuit 32, its amplitude distribution is halved in decibel compared with that of a voice signal which is not compressed by the compressor 71.

On the other hand, the amplitude distribution of an FDM signal is proportional to $n^{\frac{1}{2}}$ of the multiplexing degree as described before. Thus, the TCM signal which has passed through the compressor 71 has a substantially suppressed amplitude distribution compared with that of the FDM signal.

Now, let it be assumed that the amplitude-compressed signals are transmitted from the antenna of the radio base station 30B and received by the mobile radio unit 100B. As shown in FIG. 1D, the mobile radio unit 100 is so constructed that a time-compressed voice signal, among received signals, is inputted to the expander 172 disposed at the output of the reception section 137. This input signal will be subjected to a conversion conforming to the expander characteristic shown in FIG. 9A. That is, a change of 5dB in the input level causes a change of 10dB in the output level. As shown in the middle part of FIG. 9A, their synthetic characteristic is such that the change in telephone input at the reception side is 1dB while the change in voice input at the transmission side is 1dB, thereby allowing the original signal to be reproduced faithfully.

While the radio base station 30B is a transmitter and the mobile radio unit 100B is a receiver in the above description, the same will apply to the case where the mobile radio unit 100B is a transmitter and the radio base station 30B is a receiver. Accordingly, the compander allows the users to enjoy improvements in communication quality while keeping them substantially unaware of its presence in their upward and downward communications.

FIG. 10 shows that the NSLA of a TCM signals can be increased to that of an FDM signal having the same multiplexing degree by using a compressor even if the NSLA in FDM terms Y is small. In FIG. 10, an equivalent NSLA (X-Y) to be obtained when the compressor is used is calculated and a compressing rate 2/(X-Y) of the used compressor is indicated. What is demonstrated in FIG. 10 is a contribution to reduction in transmission power, i.e., power-saving.

A technique for setting a specific operation level of the compressor will be described with reference to FIG. 11. The meanings of the symbols used in FIG. 11 are the same as those in FIG. 10, and the system names therein designate the TCM systems 1A, 1B, 1C shown in FIG. 7. The TCM system 1A with a multiplexing degree of 148 and a frame length of 1 msec will be taken as an example. In this example, the multiplexing degree in FDM terms n' is equivalent to 24.6 and the NSLA in FDM terms Y is 21dB. Now, let us think about a case where the compressor is operated so that 33.6dB can be obtained as an NSLA X of the 148-multiplexed FDM signal. To cause the compressor to operate as such, the highest average power among those of the TCM signals loaded in the respective subframes measured every 1/6000 sec must be reduced by 12.6dB (=33.6−21). In this case, the number of subframes is $$0.001 \text{ (sec)} \div (1/6000 \text{ sec}) = 6$$

And 3 to 4 of them should exhibit an average power that is substantially equal to that of the 148-multiplexed FDM signals, while other 1 to 2 subframes have an average power higher than this, and other 1 to 2 subframes have an average power lower than this. It is almost unlikely from the viewpoint of time to obtain a subframe whose level is such as to reduce the average power by 12dB. Even if an input signal whose average power is so increased as to be commensurate with 33.6dB which is the NSLA of the FDM signal is applied to the modulator, the number of subframes for which a drastic level conversion (suppression) is required is only small in almost all the time.

A compressor may be used as a level suppression circuit. Specifically, a compressor is disposed at the input of a modulator at the transmission side, and 12.6dB (33.6−12), which is a difference between the NSLA and the NSLA in FDM terms Y of the 148-multiplexed FDM signal, is suppressed by the compressor. Then, the signal is transmitted while increasing its deviation by 33.6dB. And an expander whose characteristic is opposite to that of the demodulator output of the receiver is inserted to subject the received signal to expansion by 12.6dB.

This system configuration will further be described with reference to the mobile radio unit 100 and the radio base station 30 shown in FIGS. 1D and 1I. In FIG. 1I, the compressor 71 is interposed between the signal allotting circuit group 52 and the radio transmission circuit 32. The compressor 71 compress the amplitude of TCM signals.

A proper compression rate will be described. From the parameters of the system 1A shown in FIG. 11, it is determined to compress 12.6dB, a value (X-Y), to a certain fraction. Although this compression rate varies depending on the system design, let us compress to, e.g., about 2dB. This value, 2dB, is an appropriate value in terms of ordinary SCPC cordless telephone signals, because the cordless telephone signals tolerate a 3dB increase in deviation from the standard modulation, and should the increase exceed that tolerance, the excessive portion can be suppressed by an IDC circuit, which is a protection circuit. If a system parameter and a protection circuit equivalent to the above are used for TCM signals, the compression rate 2/(X-Y) of the compressor becomes 2/12.6 (with a design margin of 1dB).

The following will further describe the concept that a modulated wave which do not interfere with adjacent channels can be obtained by disposing the compressor whose compression rate is 2/12.6 at the modulator input and by removing the peak value using the IDC circuit, even if its deviation (modulation factor $M_d$) is increased by 12.6dB from that of the TCM system 1A.

FIG. 9B shows characteristics of compressors $C_A$, $C_B$, $C_C$ to be applied to the TCM systems 1A, 1B, 1C shown in FIG. 7. The modulation input signal characteristics are shown in FIG. 9B. In FIG. 9B, the horizontal axis indicates compressor inputs in various systems.

A value, 0dB, in the horizontal axis designates the average input power of a system for FDM signals (system F) or the per-frame average power of the system 1A or 1B. Similarly, 12.6dB designates the highest average power among those of the subframes (1/6000 sec interval) of the system 1A; and 23.6dB designates the highest average power among those of the subframes (1/6000 sec interval) of the system 1B. A value, 33.6dB, designates an NSLA $q_F$ of the system F. This value $q_F$ is obtained by adding the NSLAs $q_{1A}$, $q_{1B}$, $q_{1C}$ ($q_{1C}$ is 0 because Y of the system 1C is 0 in FIG. 11, and $q_{1C}$ is not shown in FIG. 9B) of the systems 1A, 1B, 1C obtained from equation (23) to the equivalent NSLAs $q_{CA}$, $q_{CB}$, $q_{CC}$ (similarly, $q_{CC}$ is 0 and not shown in FIG. 9B) obtained from the compressors $C_A$, $C_B$, $C_C$.

A value, 46.2dB on the horizontal axis designates a value obtained by adding the average power, 12.6dB, which is the highest among those of the subframes in the system 1A to the previously described level, 33.6dB; 56.2dB designates a value obtained by adding the average power, 23.6dB, which is the highest among those of the subframes in the system 1B to the previously described level, 33.6dB; and 67.2dB designates a value obtained by adding the average power, 33.6dB, which is the highest among those of the subframes in the system 1C to the previously described level, 33.6dB. These values indicate levels relative to the inputs to the compressors $C_A$, $C_B$, $C_C$.

Specifically, as long as the systems 1A, 1B, 1C are operated at points 12.6, 23.6, and 33.6dB on the horizontal axis, no compressor is required. However, the NSLAs obtained with such operation are so small that their deviation cannot be sufficiently increased. Thus, the levels have been increased to 46.2, 56.2, and 67.2dB. If no compressor is used, modulation is excessive as described before, but if a compressor is used, modulation becomes proper. As shown in FIG. 9B, a modulator input level, 33.6dB, (relative level) is provided at point 33.6dB on the horizontal axis which is a midpoint for the operation of the systems 1A, 1B, 1C. From this, it is expected that the operation points of the subframes whose average power is higher than 33.6dB among those of the subframes are 46.2, 56.2, 67.2dB. This is because the compressors $C_A$, $C_B$, $C_C$ disposed at the modulator inputs have compression rates of 2/12.6, 2/23.6, and 2/33.6 and these compressor characteristics only allow them to output 35.6dB which is 2dB higher than 33.6dB.

As a result, a signal whose level is so increased as to be commensurate with the NSLA, 33.6dB, will be applied to a low-level signal at the modulator input, thereby providing a large deviation.

Now, let it be assumed that a level-suppressed TCM signal is transmitted from the antenna of the radio base station, e.g., 30C, which has the above characteristic and that such transmitted signal is received by the mobile radio unit 100C. Having the configuration shown in FIG. 1E, the mobile radio unit 100C causes the received signal to go through the speed recovery circuit 138 and then to be applied to the expander 172. At the expander 172, the received signal is subjected to an inverse conversion process of the compander characteristics $C_A$, $C_B$, $C_C$ shown in FIG. 9B, thereby allowing the original signal to be reproduced faithfully.

While the case where the radio base station 30C is a transmitter and the mobile radio unit 100C is a receiver has been described above, the same will apply to the case where the mobile radio unit 100C is a transmitter and the radio base station 30C is a receiver. Accordingly, the compander allows the users to enjoy improvements in communication quality while keeping them substantially unaware of its presence in their upward and downward communications.

Although the thus described compander has an operation concept completely identical with that of generally used commercially available voice companders, a higher performance is required for the former than that for the voice companders (0.3 to 3kHz). As is apparent from the above description, the frequency range of input signals to the compressors 71, 171 is extremely wide because the voice signal in the input signal is both time-compressed and multiplexed. For example, in the case of a 148-multiplexed signal, its frequency range is 148 times 0.3 to 3kHz, i.e., 44.4 to 444kHz, and with respect to its signal level fluctuation, not only the amplitude deviation $\sigma$ of a 1-channel voice signal which extends around the average power but also an increase in the level fluctuation of the multiplexed signal (about 48dB) must be taken into account. Further, the expanders 72, 172 used at the receiver side must have characteristics which can satisfy the above operation conditions. Therefore, the compander to be used in a TCM-FM system must meet higher performance requirements than those of generally used companders for cordless telephones and automobile telephones.

The above compander is an ideal one adapted for use in the TCM-FM systems. Now, some embodiments to which a practical and economic compander can be applied will be described below. Possible application of commercially available companders to the invention will thus be discussed.

FIGS. 1E to 1J show exemplary configurations of the mobile radio unit 100C and the radio base station 30C under discussion. In FIG. 1J, the compressor group 71 (signal compression circuit group) is interposed between the signal processing section 31 and the signal speed conversion circuit group 51. Voice signals are compressed at this compressor group 71. For example, at the compressor 71-1, the voice signals are subjected to level conversion such as indicated by the compressor characteristics shown in FIG. 9B. Therefore, n voice signals pass through the compressor group 71 whose compression rate is Z, and by the time these signals arrive at the radio transmission circuit 32 after passing through the signal speed conversion circuit group 51 and the signal allotting circuit group 52, their amplitude distribution is reduced to 1/Z in decibel compared with that of signals which bypass the compressor group 71.

Since the compression rate of commercially available compressors comes in ½, ⅓, ¼, and the like, various compression rates can be obtained arbitrarily by combining them together.

While the case where the compression ratio between output levels is kept within 2dB has been described above, some systems may allow 3dB-compression and some may require a compression ratio of below 2dB. In the case of the system 1C shown in FIG. 11, in which the ratio of compression must be larger than its allowable ratio of about 1.5dB, requirements for its compressor performance may become stringent. In such a case, the output level at the middle of the compressor operation can be reduced by 2dB from 33.6dB to obtain 31.6dB. This causes the NSLA to be reduced slightly, but increases the compression rate 2/(X-Y) from 1.5/33.6 to 3.5/33.6, which is a favor for compressor design requirements. Conversely, depending on the system parameter design, it is possible to set the compressor rate to a value over 33.6dB, which is the above-described operation level. In such a case, however, a higher-performance compander must be used but its contribution is not so much as expected from the increase.

The instantaneous deviation suppressing circuit (IDC) will be described. In general SCPC signal-based analog mobile communications, an IDC is disposed at the modulator input to prevent deviation from exceeding a predetermined value. However, if the compressor of the invention is used, the role of the IDC to be played in the system will be reduced. It is because the compressor with a large compression rate serves as a substitute for the IDC. The performance requirements of an IDC, even if additionally provided, can be quite tolerant. Further, a transmission filter is usually introduced at the transmission output. This also removes excessive deviation satisfactorily. FIG. 9B shows an exemplary system in which an IDC which suppresses deviations at a modulator input relative level of 36.6dB is additionally provided.

Now, let us discuss the application of NSLAs to the design of amplifiers. The level of a TCM voice signal can be considered to be a level lower than a conventionally assumed level by its NSLA. This allows the amplification rate to be increased by the NSLA, or even if the output level is increased from the conventional value by a value equal to the NSLA, the distortion ratio and the like remain as conventionally estimated.

NSLAs are not only applied to such active circuits but may be applied to passive circuits as well. Specifically, when an NSLA is applied to a mixer circuit, the rated output of the mixer circuit can be increased by the NSLA while maintaining the conventional operating conditions. Thus, when applied to radio transmitters, NSLAs provide the following benefits. For example, a power amplifier is often inserted at the output of the transmission mixer 133 shown in FIG. 1B to increase wave transmission distance. In such a case, the introduction of an NSLA will allow a transmission output level to be increased by the amount equal to the NSLA compared with the conventionally estimated output level. Or, if the desired transmission level equals the conventional level, then an amplifier whose rated output is lower than the conventional level by the NSLA can be used.

The above concept of the rated power is applicable not only to the transmission mixer but also to all the resistors, capacitors, and inductors.

(9) Use of TCM signals in frequencies other than those dedicated thereto

As already described, when a communication signal is time-compressed, the frequency band dedicated to it is shifted to a higher frequency band. For example, the frequency band dedicated to a signal which is so time-compressed that 148 channels of voice signals are impressed on a single carrier is 44.4 to 444kHz, leaving frequencies from 0 to 44.4kHz unused. Now, utilization of such an unused frequency band will be described with reference to FIGS. 2C (a), (b) and FIG. 3D.

FIGS. 2C (a) and (b) show exemplary frame structures of the system to which the invention is applied. The frame structures shown in FIGS. 2C (a) and (b) are distinguished from those shown in FIGS. 2A (a) and (b) in that a group of synchronizing signals which are loaded in the respective time slots in the latter structures are loaded in two independent time slots SCD, SCU dedicated to them. Accordingly, the communication time slots (SD1 to SDn, SU1 to SUn) are dedicated to only communication signals except for control signals which must be loaded at communication start/end timings and at zone switching timings during a zone transition period. The frequency bands dedicated to the frame structures shown in FIGS. 2C (a) and (b) are as shown in FIG. 3D. That is, TCM communication signals and/or control signal (SD1 to SDn) and a synchronizing signal (SCD) are present at frequencies from 44.4 to 444kHz, not below 44.4kHz.

Now, let frequencies be utilized efficiently by loading other signals at frequencies below 44.4 kHz.

A system with channels 1 to 11 in FIG. 3D is an example. This system causes 11 channels of telephone signals to be carried on these frequencies as an FDM signal. Its hardware configurations will be described with reference to FIGS. 1F and 1K.

FIG. 1F shows an exemplary configuration of the mobile radio unit 100D. The telephone signals which are impressed on the FDM signal together with the TCM signals can be transmitted under this system shown in FIG. 1F in the following way. A call incoming signal transmitted from a radio base station 30D shown in FIG. 1K is received by the reception section 137. The control signal for this call incoming signal contains information about the transmission method, the information either instructing both the expander 172, i.e., a circuit for receiving the TCM signals, and the speed recovery circuit 138 to operate, or instructing the FDM communication line switching unit 174 to operate while leaving the expander 172 and the speed recovery circuit 138 inoperative. The control section 140 causes these circuits to operate in accordance with such instruction.

To transmit/receive the FDM signal, not only the FDM communication line switching unit 174 is operated but also the switches 118-1 and 118-2 are set to the FDM communication line switching units 174 and 173 positions. Then, upon reception of an instruction from the radio base station 30D about which communication line (channels 1 to 11 shown in FIG. 3D) should be used by the FDM communication line switching units 173, 174, the control section 140 directs the FDM communication line switching units 173, 174 to operate so that the FDM signal can be transmitted/received through the instructed channel.

In the meantime, the radio base station 30D instructs, the FDM communication line switching units 73, 74, among its circuits, to be operated with respect to the mobile radio unit 100D, thereby getting ready to use the same communication line (channel) as that assigned to the mobile radio unit 100D.

As a result, both the radio base station 30D and the mobile radio unit 100D are ready to communicate using the FDM signal (noncompressed signal communication), initiating the communication in a manner similar to that for the already described TCM signal.

Some mobile radio units 100 may be so constructed as to be dedicated to TCM signal communications only, or FDM signal communications only from the economic or mechanical design viewpoint.

Now, the NSLA of a composite signal having signal components shown in FIG. 3D will be described. The NSLA of a TCM signal is, as described above, 21dB if the frame length is 0.001 sec, and the NSLA of the 11-channel FDM signal is, as shown in FIG. 14, about 14dB. Therefore, deviations to be applied to the modulators included in the radio transmission circuits 32, 132 shown in FIGS. 1K and 1F are 14dB for frequencies from 0 to 43 kHz and 21dB for frequencies from 44.4 to 444kHz, respectively. And this indicates that no mutual interference occurs between adjacent channels even if the deviations are further increased; provided however, that no consideration is given to the effect of the synchronizing signal SCD shown in FIG. 3D on these deviations. In practical systems, the ratio of energy consumed by a control signal portion to energy consumed by the entire signal is so small that such effect could be deemed substantially negligible.

Figure 2D:
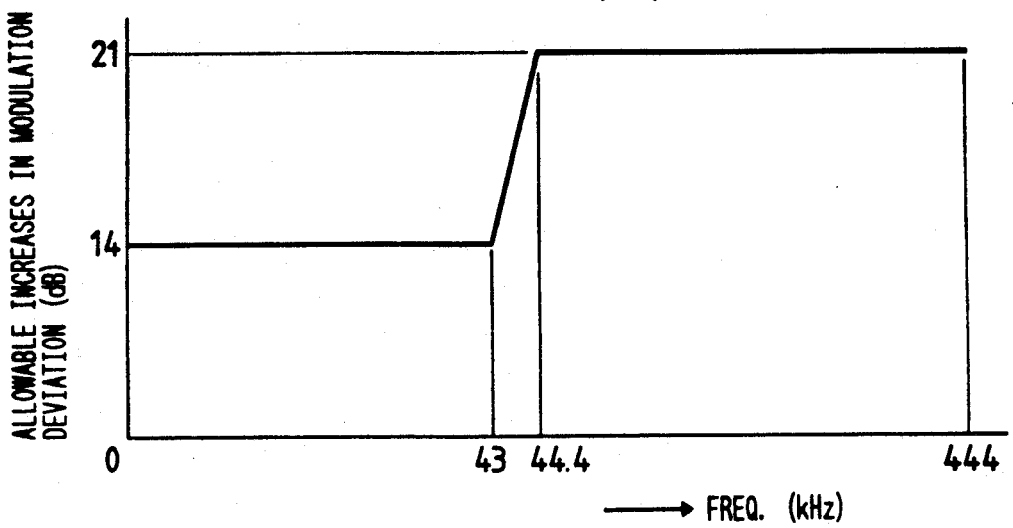
FIGS. 2D (a) and 2D(b) are diagrams showing allowable increases in modulation deviation to be applied to the system of the invention.
Figure 2D:
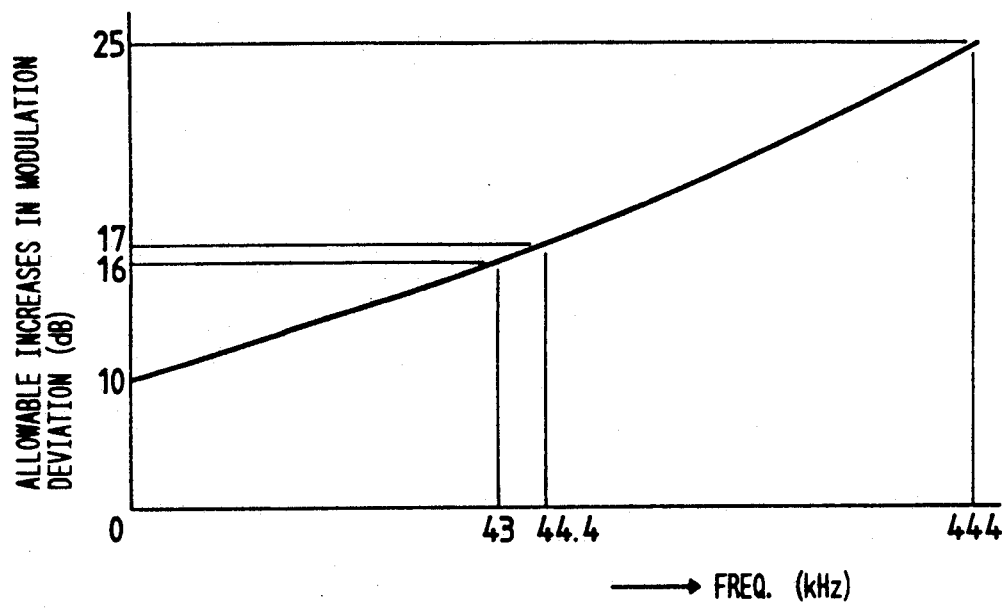
Figure 3D:
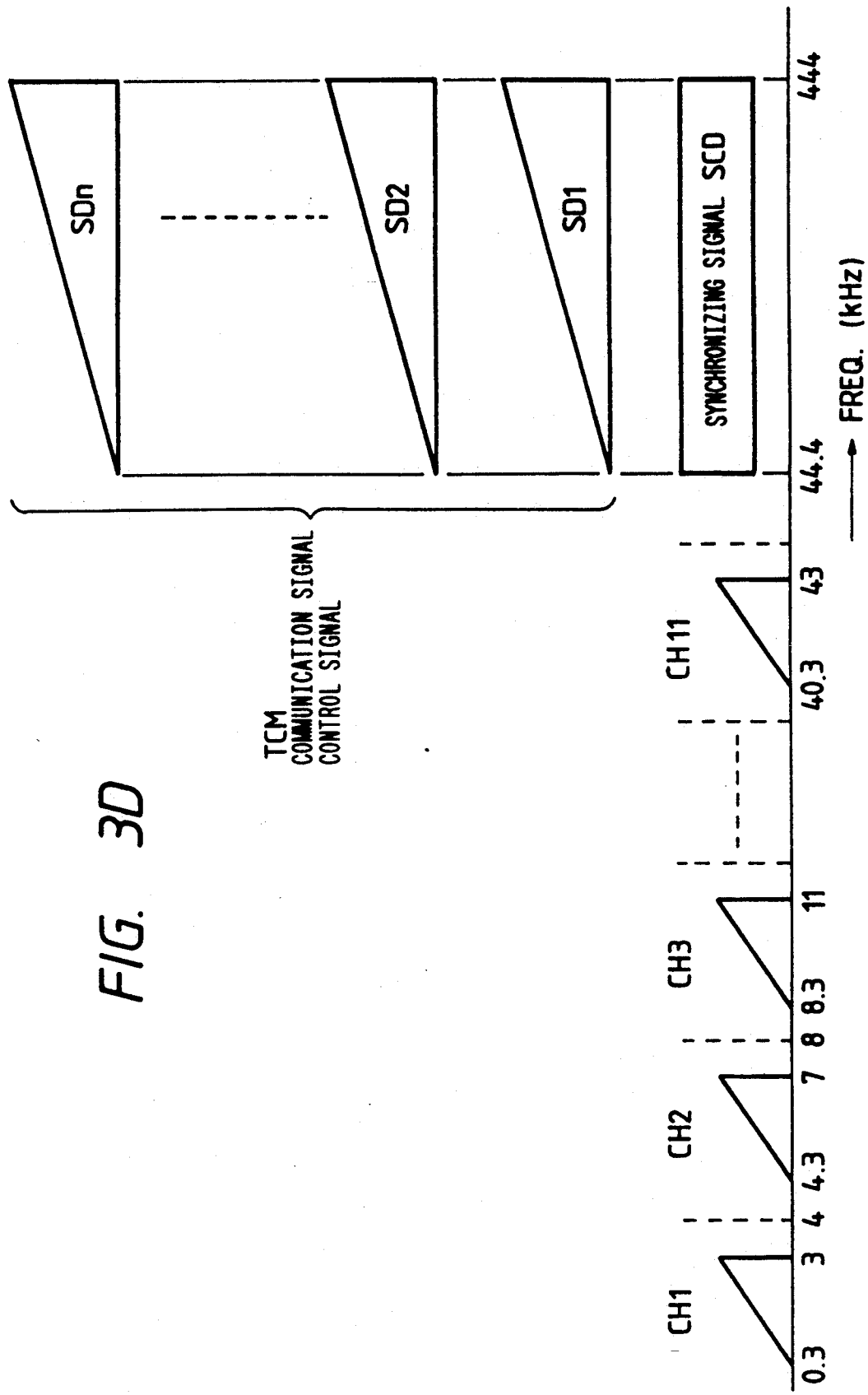

The frequency characteristics of allowable increases in deviation for modulators are as shown in FIGS. 2D (a) and (b). FIG. 2D (a) shows an example in which a 14dB flat characteristic is given to the FDM signal and a 21dB flat characteristic is given to the TCM signal. FIG. 2D (b) shows, on the other hand, an example in which a high-frequency band is subjected to emphasis. The effect of emphasis is as well known. Since FM waves are not resistant to a so-called triangle noise, a large deviation has been applied to signals in the high-frequency band to take care of such noise. To demodulate the signals by the receiver, the signals must of course be subjected to de-emphasis.

Now, the detailed operation of the radio transmission circuit 132 and the radio reception circuit 135, which play important roles in the mobile radio unit 100D using the above TCM-FDM composite signal, will be described with reference to FIG. 1G and 1H.

In FIG. 1G, the digital/analog signal mixer 217 simultaneously receive one or two of signals such as a control signal from the control section 140, a signal compressed by the compressor 171, and an output signal from the FDM communication line switching unit 173. These signals are mixed at the mixer 217 and a mixed signal is then fed to the modulator 216. At the modulator 216, the mixed signal is subjected to predetermined deviation to form an FM signal. The FM signal is then applied to the transmission mixer 133, where it is transformed into a predetermined radio frequency to be transmitted from the antenna section.

On the other hand, the signal sent from the radio base station 30D is received by the radio reception circuit 135 of the mobile radio unit 100D. The signal received by its antenna is first converted to a predetermined intermediate frequency at the reception mixer 136, the detailed configuration of which is as shown in FIG. 1H, then amplified to an appropriate level by the amplifier 211, and further supplied to the frequency discriminator 212. The output of the frequency discriminator 212 is separated by the digital/analog signal separator 213, and a separated digital signal goes through the clock regenerator 141 and the control section 140, while separated TCM and FDM signals is sent to the expander 172 and the FDM communication line switching unit 174, respectively, via the band-pass filter 214. The amplifier 211 is not needed if the level of the signal from the reception mixer 136 is adequately high.

While the foregoing is an exemplary operation of the mobile radio unit 100D, functions similar thereto are given to the radio reception circuit 35 and the radio transmission circuit 32 of the radio base station 30D. Unlike the control section 40 shown in FIG. 1C, the control section 40 of the radio base station 30 in this case (FIG. 1K) exchanges control signals with the signal processing section 31. It is because the signal processing section 31 cannot judge by itself which signal among the communication signals should be processed as a TCM signal or as an FDM signal. Thus, it is the control section 40 that determines the use of the signal, TCM or FDM, by considering not only the capacity of the counterpart mobile radio unit 100D—whether it can receive only the TCM signal, or it can receive the FDM signal as well—, but also current communication traffic conditions.

While the example in which the frequency band lower than that dedicated to the TCM signals carries the FDM signals has been described above, the lower frequency band may also carry signals other than the FDM signals. That is, arbitrary signals including data signals and image (analog) signals can be loaded on the lower frequency band. The TCM signal in which 11 channels of voice signals are multiplexed can of course be loaded. However, some signal produces no NSLA, and in such a case, the signal will be used without increasing its deviation.

As described above, the concept of NSLA of a TCM signal, a clear-cut description of which had long been called for, has now been clarified quantitatively with system parameters. As a result, even if the TCM signal is transmitted with its angle-modulation factor (deviation) increased by its NSLA, its influence on other channels can be confined within the conventional design value and the transmission output level per channel can be reduced compared with that of the conventional systems.

In addition, depending on TCM signal design parameters, the NSLA of a TCM signal may become lower than that of an FDM signal whose multiplexing degree is equal to that of the TCM signal. However, in such a case, the NSLA of the TCM signal can be increased to as high as a level which is equal to that of the FDM signal by inserting a compressor at the modulator input. Thus, the application of NSLAs to communication systems contributes also to the ease of system design requirements to an enormous extent.

In the above-described embodiment to which the compressor and expander are applied, its object is to make the NSLA of a TCM signal approach that of an FDM signal. However, by the application of the compressor and expander, it is possible to increase the NSLA of the TCM signal beyond that of the FDM signal. The reason is, as assumed from FIG. 9B, because the operation of the system is not particularly affected by the ratio of compression or expansion although the careful adjustment of a circuit is required.

What is claimed is:

1. A mobile body communication method using gateway exchanging means for exchanging communication between radio base station means and a plurality of mobile radio means, said radio base station means constituting a service area covering a plurality of zones, while each of said mobile radio means not only moves across said plurality of zones but also uses a radio channel to communicate with said radio base station means, said radio channel carrying time-division time-compressed signals in time slots constituting a frame, said method comprising the steps of:

determining a minimum required power for transmission of a radio signal to be used in said communication between said radio base station means and one of said mobile radio means in accordance with an NSLA determined from said time-division time-compressed signals;

transmitting said radio signal from said radio base station means while causing an amplitude distribution thereof to be compressed within a desired range by syllabic compressor means; and subjecting said transmitted radio signal to an amplitude distribution recovering processing by syllabic expander means included in said one of said mobile radio means.

2. A mobile radio communication system, comprising:

radio base station means which constitutes a service area covering a plurality of zones;

a plurality of mobile radio means each of which moves across said plurality of zones and uses a radio channel to communicate with said radio base station means, said radio channel carrying time-division time-compressed signals in time slots constituting a frame;

gateway exchanging means for exchanging communication between said radio base station means and said plurality of mobile radio means; and wherein said radio base station means and said mobile radio means have syllabic compressor means and syllabic expander means, said syllabic compressor means determining a minimum required power for transmission of a radio signal to be used in said communication between said radio base station means and said mobile radio means in accordance with an NSLA determined from said time-division time-compressed signals and compressing an amplitude distribution of a signal to be transmitted within a desired range, and said syllabic expander means subjecting a received signal to a process of recovering an amplitude distribution thereof to an original amplitude distribution.

3. A mobile body communication method using gateway exchanging means for exchanging communication between radio base station means and a plurality of mobile radio means, said radio base station means constituting a service area covering a plurality of zones, while each of said mobile radio means not only moves across said plurality of zones but also uses a radio channel to communicate with said radio base station means, said radio channel carrying time-division time-compressed multiplexed signals in time slots constituting a frame, said method comprising the steps of:

calculating a difference between an NSLA determined from said time-division time-compressed multiplexed signals and an NSLA of a frequency-division multiplexed signal whose multiplexing degree is equal to that of said time-division time-compressed multiplexed signals;

varying a level of a radio signal to be used in said communication between said radio base station means and said mobile radio means so that said communication between said radio base station means and said mobile radio means uses a minimum required power in transmission and reception of said radio signal; and modulating said level-varied signal and transmitting said modulated signal.

4. A mobile radio communication system, comprising:

radio base station means which constitutes a service area covering a plurality of zones;

a plurality of mobile radio means each of which moves across said plurality of zones and uses a radio channel to communicate with said radio base station means, said radio channel carrying time-division time-compressed signals in time slots constituting a frame;

gateway exchanging means for exchanging a communication between said radio base station means and said plurality of mobile radio means; and wherein said radio base station and said plurality of mobile radio means include syllabic compressor means and syllabic expander means, said syllabic compressor means determining a minimum required power for transmission of a radio signal to be used in said communication between said radio base station means and said mobile radio means to be transmitted within a desired range, and said syllabic expander means subjecting a received signal to a process of recovering an amplitude distribution thereof to an original amplitude distribution, said minimum power for transmission of said radio signal being determined in accordance with an NSLA determined from said time-division time-compressed signals.

5. A mobile body communication method using gateway exchanging means for exchanging communication between a radio base station means and a plurality of mobile radio means, said radio base station means constituting a service area covering a plurality of zones, while each of said mobile radio means moves across said plurality of zones and uses a radio channel to communicate with said radio base station means, said radio channel carrying time-division time-compressed signals in time slots constituting a frame, said method comprising the steps of:

determining a minimum required power for transmission of a radio signal to be used in said communication between said radio base station means and one of said mobile radio means in accordance with an NSLA determined from said time-division time-compressed signals;

transmitting and radio signal from one of said mobile radio means while causing an amplitude distribution thereof to be compressed with a desired range by syllabic compressor means; and subjecting said transmitted radio signal to an amplitude distribution recovering process by syllabic expander means included in said radio base station means.

* * * * *